United States Patent
Paladugu et al.

(10) Patent No.: US 11,856,623 B2
(45) Date of Patent: Dec. 26, 2023

(54) RELAY ADAPTATION LAYER CONFIGURATION FOR A SIDELINK INTERFACE

(71) Applicant: QUALCOMM Incorporated, San Diego, CA (US)

(72) Inventors: Karthika Paladugu, San Diego, CA (US); Peng Cheng, Beijing (CN); Soo Bum Lee, San Diego, CA (US); Hong Cheng, Basking Ridge, NJ (US); Gavin Bernard Horn, La Jolla, CA (US); Karl Georg Hampel, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/823,747

(22) Filed: Aug. 31, 2022

(65) Prior Publication Data
US 2022/0418015 A1 Dec. 29, 2022

Related U.S. Application Data

(63) Continuation of application No. PCT/CN2021/071456, filed on Jan. 13, 2021.

(51) Int. Cl.
*H04W 4/00* (2018.01)
*H04W 76/14* (2018.01)
(Continued)

(52) U.S. Cl.
CPC ........... *H04W 76/14* (2018.02); *H04L 5/0048* (2013.01); *H04W 76/15* (2018.02)

(58) Field of Classification Search
CPC .... H04W 76/14; H04W 76/15; H04L 5/0048; H04L 5/00
(Continued)

(56) References Cited

U.S. PATENT DOCUMENTS 11,057,791 B2 * 7/2021 Majmundar .......... H04W 40/12
2014/0301228 A1 * 10/2014 Kwak .................... H04W 24/10
370/252
(Continued)

FOREIGN PATENT DOCUMENTS

CN 108029148 A 5/2018
WO WO-2018143763 A1 * 8/2018 ............ H04W 76/15

OTHER PUBLICATIONS

Interdigital Inc: "Discussion on L2 Relay Architecture and QoS", 3GPP RAN WG2 Meeting #112-e, R2-2009206, Electronic, Nov. 2-Nov. 13, 2020, the whole document, pp. 1-7.
(Continued)

*Primary Examiner* — Marceau Milord
(74) *Attorney, Agent, or Firm* — Harrity & Harrity LLP / Qualcomm

(57) ABSTRACT

Various aspects of the present disclosure generally relate to wireless communication. In some aspects, a relay user equipment (UE) may establish a sidelink unicast link with a remote UE via a sidelink signaling interface. The relay UE may identify configuration information for an adaptation layer of the sidelink signaling interface, the configuration information including at least one of: a remote UE identifier associated with the sidelink unicast link for a relay service, bearer identifier information identifying one or more bearers between the remote UE and a network entity for the relay service, a radio link control (RLC) channel mapping between a bearer identifier and one or more RLC channels, or data routing information associated with the relay service. The relay UE may relay communications between the remote UE and the network entity based at least in part on the configuration information. Numerous other aspects are described.

30 Claims, 19 Drawing Sheets

(51) Int. Cl.
*H04W 76/15* (2018.01)
*H04L 5/00* (2006.01)

(58) Field of Classification Search
USPC .......................................................... 370/329
See application file for complete search history.

(56) References Cited

U.S. PATENT DOCUMENTS

| | | | |
|---|---|---|---|
| 2018/0020442 A1* | 1/2018 | Nair | H04B 7/15528 |
| 2018/0213577 A1* | 7/2018 | Burbidge | H04W 76/10 |
| 2018/0234524 A1* | 8/2018 | Cheng | H04W 76/15 |
| 2019/0394816 A1 | 12/2019 | Kim | |
| 2020/0100088 A1* | 3/2020 | Kim | H04W 48/16 |
| 2020/0100308 A1* | 3/2020 | Lee | H04W 76/25 |
| 2020/0221532 A1* | 7/2020 | Jung | H04W 76/10 |
| 2020/0396599 A1* | 12/2020 | Luo | H04L 5/16 |
| 2021/0037532 A1* | 2/2021 | Nam | H04W 72/042 |
| 2021/0058907 A1* | 2/2021 | Fakoorian | H04W 72/14 |
| 2021/0105054 A1* | 4/2021 | Gulati | H04L 5/0057 |
| 2021/0204274 A1* | 7/2021 | Paladugu | H04W 76/14 |
| 2021/0212053 A1* | 7/2021 | Ji | H04L 1/1887 |
| 2021/0251023 A1* | 8/2021 | Phan | H04W 4/40 |
| 2021/0251039 A1* | 8/2021 | Liang | H04W 76/23 |
| 2021/0282195 A1* | 9/2021 | Paladugu | H04W 4/90 |
| 2021/0289392 A1* | 9/2021 | Paladugu | H04W 28/0268 |
| 2021/0345356 A1* | 11/2021 | Fan | H04W 72/087 |
| 2022/0029694 A1* | 1/2022 | Ishii | H04W 48/12 |
| 2022/0095411 A1* | 3/2022 | Lin | H04W 76/27 |
| 2022/0167268 A1* | 5/2022 | Xu | H04W 72/12 |
| 2022/0295375 A1* | 9/2022 | Wang | H04W 40/22 |
| 2022/0312376 A1* | 9/2022 | Wu | H04W 68/02 |

OTHER PUBLICATIONS

International Search Report and Written Opinion—PCT/CN2021/071456—ISA/EPO—dated Sep. 28, 2021.
Mediatek Inc: "[AT111-e][605][Relay] L2 Relay Mechanism (MediaTek)", 3GPP TSG-RAN WG2 Meeting #111 electronic,R2-20nnnnn, Online, Aug. 17-28, 2020, the whole document, pp. 1-15.
Spreadtrum Communications: "Remaining Issues on the Adaptation Layer for Layer-2 Relay", 3GPP TSG-RAN WG2 Meeting #112-e, R2-2009144, Online, Nov. 2-Nov. 13, 2020, Sections 1-2, pp. 1-4.
Co-pending International Application No. PCT/CN2021/071456, filed on Jan. 13, 2021, 112 pages.

* cited by examiner

US 11,856,623 B2

1
RELAY ADAPTATION LAYER CONFIGURATION FOR A SIDELINK INTERFACE

CROSS-REFERENCE TO RELATED APPLICATION

This application is a continuation of Patent Cooperation Treaty (PCT) Patent Application No. PCT/CN2021/071456, filed Jan. 13, 2021, entitled "RELAY ADAPTATION LAYER CONFIGURATION FOR A SIDELINK INTERFACE", which is incorporated herein by reference in its entirety.

FIELD OF THE DISCLOSURE

Aspects of the present disclosure generally relate to wireless communication and to techniques and apparatuses for a relay adaptation layer configuration for a sidelink interface.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a relay user equipment (UE) includes establishing a sidelink unicast link with a remote UE via a sidelink signaling interface; identifying configuration information for an adaptation layer of the sidelink signaling interface, the configuration information including at least one of: a remote UE identifier for the remote UE identifying the sidelink unicast link between the remote UE and the relay UE for a relay service, bearer identifier information identifying one or more bearers between the remote UE and a network entity associated with the relay service, radio link control (RLC) channel mapping information, wherein the RLC channel mapping information includes a mapping between a bearer identifier and one or more RLC channels of the sidelink unicast link and one or more RLC channels of a link with the network entity, or data routing information associated with the relay service; and relaying communications between the remote UE and the network entity based at least in part on the configuration information for the adaptation layer of the sidelink signaling interface.

In some aspects, a method of wireless communication performed by a network entity includes communicating, with a relay UE and a remote UE, configuration information for an adaptation layer of a sidelink signaling interface between the relay UE and the remote UE, the configuration information including at least one of: a remote UE identifier for the remote UE identifying a sidelink unicast link between the remote UE and the relay UE for a relay service, bearer identifier information identifying one or more bearers between the remote UE and the network entity associated with the relay service, RLC channel mapping information, wherein the RLC channel mapping information includes a mapping between a bearer identifier and one or more RLC channels of a sidelink unicast link and one or more RLC channels of a link with the relay UE, or data routing information associated with the relay service; and communicating with the remote UE via the relay UE based at least in part on the configuration information.

In some aspects, a method of wireless communication performed by a remote UE includes establishing a sidelink unicast link with a relay UE via a sidelink signaling interface; receiving configuration information for an adaptation layer of the sidelink signaling interface, the configuration information including at least one of a remote UE identifier for the remote UE identifying the sidelink unicast link between the remote UE and the relay UE for a relay service, bearer identifier information identifying one or more bearers between the remote UE and a network entity associated with the relay service, or RLC channel mapping information, wherein the RLC channel mapping information includes a mapping between a bearer identifier and one or more RLC channels of the sidelink unicast link and one or more RLC channels of a link with the network entity; and communicating with the network entity via the relay UE based at least in part on the configuration information.

In some aspects, a relay UE for wireless communication includes a memory and one or more processors coupled to the memory, the one or more processors configured to: establish a sidelink unicast link with a remote UE via a sidelink signaling interface; identify configuration information for an adaptation layer of the sidelink signaling interface, the configuration information including at least one of a remote UE identifier for the remote UE identifying the sidelink unicast link between the remote UE and the relay UE for a relay service, bearer identifier information identifying one or more bearers between the remote UE and a network entity associated with the relay service, RLC channel mapping information, wherein the RLC channel mapping information includes a mapping between a bearer identifier and one or more RLC channels of the sidelink unicast link and one or more RLC channels of a link with the network entity, or data routing information associated with the relay service; and relay communications between the remote UE and the network entity based at least in part on the configuration information for the adaptation layer of the sidelink signaling interface.

In some aspects, a network entity for wireless communication includes a memory and one or more processors coupled to the memory, the one or more processors configured to: communicate, with a relay UE and a remote UE, configuration information for an adaptation layer of a sidelink signaling interface between the relay UE and the remote UE, the configuration information including at least one of a remote UE identifier for the remote UE identifying a sidelink unicast link between the remote UE and the relay UE for a relay service, bearer identifier information identifying one or more bearers between the remote UE and the network entity associated with the relay service, RLC channel mapping information, wherein the RLC channel mapping information includes a mapping between a bearer identifier and one or more RLC channels of a sidelink unicast link and one or more RLC channels of a link with the relay UE, or data routing information associated with the relay service; and communicate with the remote UE via the relay UE based at least in part on the configuration information.

In some aspects, a remote UE for wireless communication includes a memory and one or more processors coupled to the memory, the one or more processors configured to: establish a sidelink unicast link with a relay UE via a sidelink signaling interface; receive configuration information for an adaptation layer of the sidelink signaling interface, the configuration information including at least one of a remote UE identifier for the remote UE identifying the sidelink unicast link between the remote UE and the relay UE for a relay service, bearer identifier information identifying one or more bearers between the remote UE and a network entity associated with the relay service, or RLC channel mapping information, wherein the RLC channel mapping information includes a mapping between a bearer identifier and one or more RLC channels of the sidelink unicast link and one or more RLC channels of a link with the network entity; and communicate with the network entity via the relay UE based at least in part on the configuration information.

In some aspects, a non-transitory computer-readable medium storing a set of instructions for wireless communication includes one or more instructions that, when executed by one or more processors of a relay UE, cause the relay UE to: establish a sidelink unicast link with a remote UE via a sidelink signaling interface; identify configuration information for an adaptation layer of the sidelink signaling interface, the configuration information including at least one of a remote UE identifier for the remote UE identifying the sidelink unicast link between the remote UE and the relay UE for a relay service, bearer identifier information identifying one or more bearers between the remote UE and a network entity associated with the relay service, RLC channel mapping information, wherein the RLC channel mapping information includes a mapping between a bearer identifier and one or more RLC channels of the sidelink unicast link and one or more RLC channels of a link with the network entity, or data routing information associated with the relay service; and relay communications between the remote UE and the network entity based at least in part on the configuration information for the adaptation layer of the sidelink signaling interface.

In some aspects, a non-transitory computer-readable medium storing a set of instructions for wireless communication includes one or more instructions that, when executed by one or more processors of a network entity, cause the network entity to: communicate, with a relay UE and a remote UE, configuration information for an adaptation layer of a sidelink signaling interface between the relay UE and the remote UE, the configuration information including at least one of a remote UE identifier for the remote UE identifying a sidelink unicast link between the remote UE and the relay UE for a relay service, bearer identifier information identifying one or more bearers between the remote UE and the network entity associated with the relay service, RLC channel mapping information, wherein the RLC channel mapping information includes a mapping between a bearer identifier and one or more RLC channels of a sidelink unicast link and one or more RLC channels of a link with the relay UE, or data routing information associated with the relay service; and communicate with the remote UE via the relay UE based at least in part on the configuration information.

In some aspects, a non-transitory computer-readable medium storing a set of instructions for wireless communication includes one or more instructions that, when executed by one or more processors of a remote UE, cause the remote UE to: establish a sidelink unicast link with a relay UE via a sidelink signaling interface; receive configuration information for an adaptation layer of the sidelink signaling interface, the configuration information including at least one of: a remote UE identifier for the remote UE identifying the sidelink unicast link between the remote UE and the relay UE for a relay service, bearer identifier information identifying one or more bearers between the remote UE and a network entity associated with the relay service, or RLC channel mapping information, wherein the RLC channel mapping information includes a mapping between a bearer identifier and one or more RLC channels of the sidelink unicast link and one or more RLC channels of a link with the network entity; and communicate with the network entity via the relay UE based at least in part on the configuration information.

In some aspects, an apparatus for wireless communication includes means for establishing a sidelink unicast link with a remote UE via a sidelink signaling interface; means for identifying configuration information for an adaptation layer of the sidelink signaling interface, the configuration information including at least one of: a remote UE identifier for the remote UE identifying the sidelink unicast link between the remote UE and the apparatus for a relay service, bearer identifier information identifying one or more bearers between the remote UE and a network entity associated with the relay service, RLC channel mapping information, wherein the RLC channel mapping information includes a mapping between a bearer identifier and one or more RLC channels of the sidelink unicast link and one or more RLC channels of a link with the network entity, or data routing information associated with the relay service; and means for relaying communications between the remote UE and the network entity based at least in part on the configuration information for the adaptation layer of the sidelink signaling interface.

In some aspects, an apparatus for wireless communication includes means for communicating, with a relay UE and a remote UE, configuration information for an adaptation layer of a sidelink signaling interface between the relay UE and the remote UE, the configuration information including at least one of: a remote UE identifier for the remote UE identifying a sidelink unicast link between the remote UE and the relay UE for a relay service, bearer identifier information identifying one or more bearers between the remote UE and the apparatus associated with the relay service, RLC channel mapping information, wherein the RLC channel mapping information includes a mapping between a bearer identifier and one or more RLC channels of a sidelink unicast link and one or more RLC channels of a link with the relay UE, or data routing information associated with the relay service; and means for communicating with the remote UE via the relay UE based at least in part on the configuration information.

In some aspects, an apparatus for wireless communication includes means for establishing a sidelink unicast link with a relay UE via a sidelink signaling interface; means for receiving configuration information for an adaptation layer of the sidelink signaling interface, the configuration information including at least one of a remote UE identifier for the apparatus identifying the sidelink unicast link between the apparatus and the relay UE for a relay service, bearer identifier information identifying one or more bearers between the apparatus and a network entity associated with the relay service, or RLC channel mapping information, wherein the RLC channel mapping information includes a mapping between a bearer identifier and one or more RLC channels of the sidelink unicast link and one or more RLC channels of a link with the network entity; and means for communicating with the network entity via the relay UE based at least in part on the configuration information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
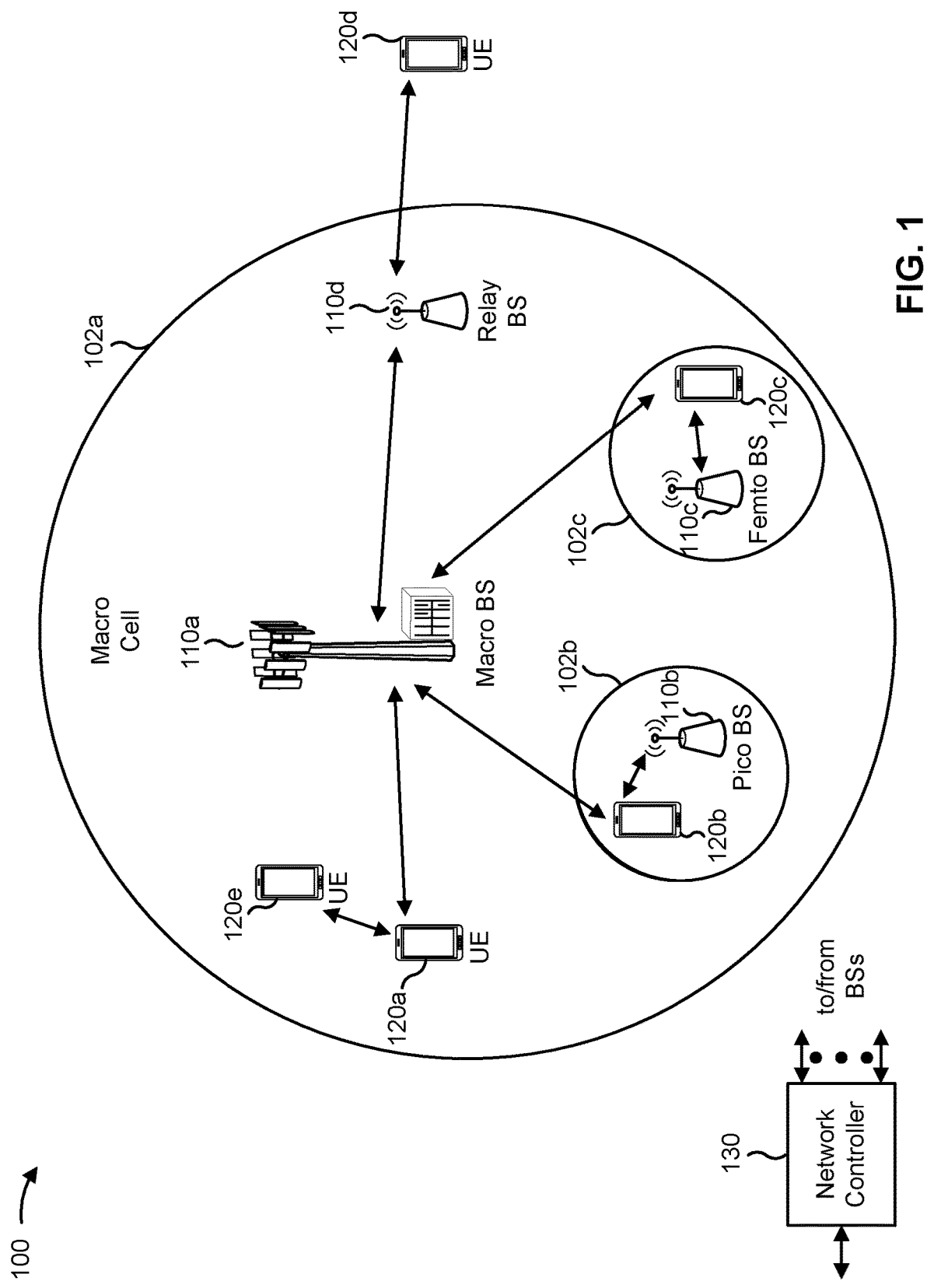
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
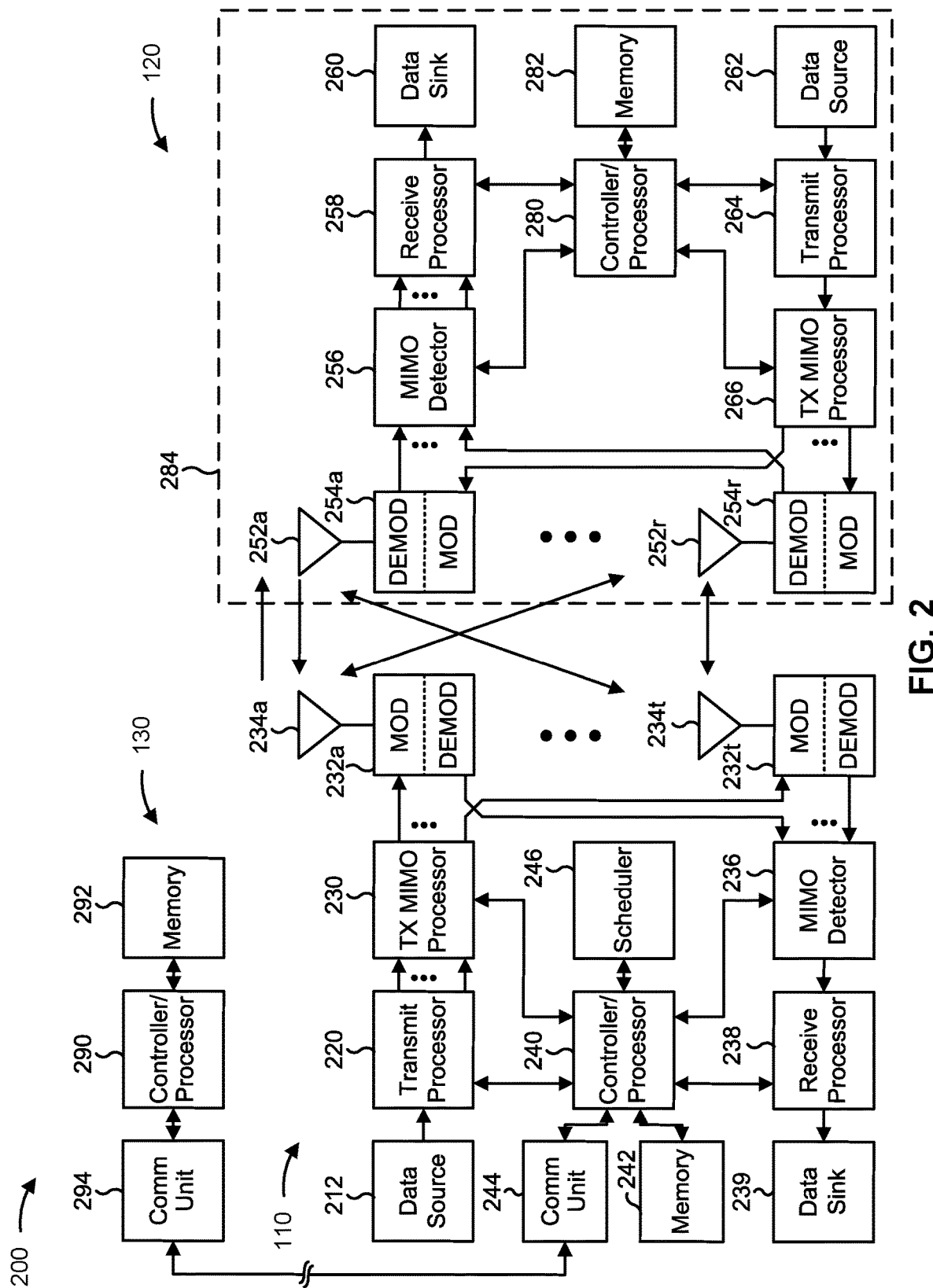
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 7, 8, 9, 10, 11, 12, 13, 14, 15, and/or 16.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 7, 8, 9, 10, 11, 12, 13, 14, 15, and/or 16.

Controller/processor 240 of base station 110, controller/processor 280 of UE 120, and/or any other component(s) of FIG. 2 may perform one or more techniques associated with relay adaptation layer configuration for a sidelink interface, as described in more detail elsewhere herein. In some aspects, the network entity described herein is the base station 110, is included in the base station 110, or includes one or more components of the base station 110 shown in FIG. 2. For example, controller/processor 240 of base station 110, controller/processor 280 of UE 120, and/or any other component(s) of FIG. 2 may perform or direct operations of, for example, process 1400 of FIG. 14, process 1500 of FIG. 15, process 1600 of FIG. 16, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1400 of FIG. 14, process 1500 of FIG. 15, process 1600 of FIG. 16, and/or other processes as described herein. In some aspects, executing instructions may include running the instructions, converting the instructions, compiling the instructions, and/or interpreting the instructions, among other examples.

In some aspects, the UE 120 (e.g., a relay UE) includes means for establishing a sidelink unicast link with a remote UE via a sidelink signaling interface; means for identifying configuration information for an adaptation layer of the sidelink signaling interface, the configuration information including at least one of: a remote UE identifier for the remote UE identifying the sidelink unicast link between the remote UE and the relay UE for a relay service, bearer identifier information identifying one or more bearers between the remote UE and a network entity associated with the relay service, radio link control (RLC) channel mapping information, wherein the RLC channel mapping information includes a mapping between a bearer identifier and one or more RLC channels of the sidelink unicast link and one or more RLC channels of a link with the network entity, or data routing information associated with the relay service; and/or means for relaying communications between the remote UE and the network entity based at least in part on the configuration information for the adaptation layer of the sidelink signaling interface. The means for the relay UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the relay UE 120 includes means for assigning remote UE identifiers to each remote UE, of a plurality of remote UEs, in communication with the relay UE.

In some aspects, the relay UE 120 includes means for assigning the remote UE identifier to the remote UE including a unique index associated with the sidelink unicast link; and/or means for transmitting, to the remote UE, an indication of the remote UE identifier via a sidelink signaling interface message.

In some aspects, the relay UE 120 includes means for assigning a unique index associated with the sidelink unicast link; and/or means for transmitting information indicating the unique index to the network entity via a radio resource control message.

In some aspects, the relay UE 120 includes means for receiving, from the network entity, a relaying configuration indicating at least part of the configuration information.

In some aspects, the relay UE 120 includes means for receiving, from the network entity, an indication of the remote UE identifier via a radio resource control message.

In some aspects, the relay UE 120 includes means for receiving, from the network entity, an indication of remote UE identifiers for each remote UE, of a plurality of remote UEs, in communication with the relay UE.

In some aspects, the relay UE 120 includes means for receiving, from the network entity, an indication of a cell radio network temporary identifier (C-RNTI) for each remote UE, of a plurality of remote UEs, in communication with the relay UE.

In some aspects, the relay UE 120 includes means for receiving, from the network entity, an indication of a temporary identifier for each remote UE, of a plurality of remote UEs, in communication with the relay UE, wherein the temporary identifier is unique among the plurality of remote UEs in communication with the relay UE.

In some aspects, the relay UE 120 includes means for receiving, from the network entity, the bearer identifier information including an indication of a bearer identifier identifying a bearer between the remote UE and the network entity associated with the relay service, wherein the bearer identifier is the same as a data radio bearer (DRB) identifier of a DRB between the remote UE and the network entity or the same as a signaling radio bearer (SRB) identifier of an SRB between the remote UE and the network entity.

In some aspects, the relay UE 120 includes means for receiving, from the network entity, the bearer identifier information including an indication of a bearer identifier identifying a bearer between the remote UE and the network entity associated with the relay service, wherein the bearer identifier is a unique identifier associated with the bearer between the remote UE and the network entity to be used with the relay service.

In some aspects, the relay UE 120 includes means for receiving, from the network entity, an indication of a default bearer identifier identifying an SRB associated with radio resource control messages.

In some aspects, the relay UE 120 includes means for receiving, from the remote UE via the sidelink unicast link, a radio resource control setup request message, wherein the radio resource control setup request message includes the default bearer identifier; means for determining that the radio resource control setup request message is to be transmitted using the SRB associated with radio resource control messages based at least in part on the default bearer identifier; and/or means for relaying the radio resource control setup request message to the network entity via an RLC channel for the SRB associated with radio resource control messages.

In some aspects, the relay UE 120 includes means for receiving, from the network entity, a relaying configuration via a radio resource control message indicating the bearer identifier based at least in part on relaying the radio resource control setup request message to the network entity; and/or means for relaying the radio resource control message indicating the bearer identifier to the remote UE based at least in part on the relaying configuration.

In some aspects, the relay UE 120 includes means for receiving, from the remote UE via the sidelink unicast link, a packet data convergence protocol (PDCP) packet data unit (PDU) that includes an adaptation layer header that indicates at least one of: the remote UE identifier associated with the remote UE, or a bearer identifier; means for identifying an RLC channel of the link with the network entity based at least in part on the RLC channel mapping information and the bearer identifier; means for generating a Uu PDCP PDU for the link with the network entity that includes an adaptation layer header that indicates at least one of: the remote UE identifier associated with the remote UE, or the bearer identifier; and/or means for transmitting, to the network entity via the RLC channel, the Uu PDCP PDU for the link with the network entity that includes the adaptation layer header.

In some aspects, the relay UE 120 includes means for receiving, from the network entity, a Uu PDCP PDU that includes an adaptation layer header that indicates at least one of: the remote UE identifier associated with the remote UE, or a bearer identifier; means for identifying an RLC channel of the sidelink unicast link based at least in part on the RLC channel mapping information and the bearer identifier; means for generating a PDCP PDU for the sidelink unicast link that includes an adaptation layer header that indicates at least one of: the remote UE identifier associated with the remote UE, or the bearer identifier; and/or means for transmitting, to the remote UE via the RLC channel, the PDCP PDU for the sidelink unicast link that includes the adaptation layer header.

In some aspects, the relay UE 120 includes means for performing a privacy update procedure with at least one of the remote UE or the network entity, wherein the privacy update procedure includes updating information included in configuration information. In some aspects, the relay UE 120 includes means for performing the privacy update procedure according to a periodic schedule. In some aspects, the relay UE 120 includes means for detecting a trigger event associated with a privacy update; and/or means for performing the privacy update procedure based at least in part on detecting the trigger event.

In some aspects, the relay UE 120 includes means for modifying the remote UE identifier for the remote UE to a modified remote UE identifier; means for communicating, with the remote UE via the sidelink unicast link, to indicate the modified remote UE identifier; and/or means for communicating, with the network entity, to indicate the modified remote UE identifier.

In some aspects, the relay UE 120 includes means for receiving, from the network entity, an indication of modified identifier information for at least one of the adaptation layer of the sidelink signaling interface or the adaption layer of the link with the network entity; means for modifying the configuration information based at least in part on the modified identifier information; means for communicating, with the remote UE via the sidelink unicast link, to indicate the modified identifier information; and/or means for communicating, with the network entity, to indicate that the configuration information for the sidelink signaling interface has been modified at the relay UE and the remote UE based at least in part on communicating with the remote UE to indicate the modified identifier information.

In some aspects, the relay UE 120 includes means for receiving, from the remote UE, a signal that includes a previous identifier, that is modified by the modified identifier information to a modified identifier, in an adaptation layer header of the signal after receiving the indication of the modified identifier information and prior to receiving a signal that includes an indication of the modified identifier; and/or means for relaying, to the network entity via an RLC channel, the signal based at least in part on the previous identifier.

In some aspects, the relay UE 120 includes means for receiving, from the remote UE or the network entity, a signal that includes an indication of a modified identifier, indicated in the modified identifier information, in an adaptation layer header of the signal; and/or means for refraining from relaying communications using a previous identifier based at least in part on receiving the signal that includes the indication of the modified identifier in the adaptation layer header of the signal.

In some aspects, a network entity (e.g., a base station 110 or another network entity) includes means for communicating, with a relay UE and a remote UE, configuration information for an adaptation layer of a sidelink signaling interface between the relay UE and the remote UE, the configuration information including at least one of a remote UE identifier for the remote UE identifying a sidelink unicast link between the remote UE and the relay UE for a relay service, bearer identifier information identifying one or more bearers between the remote UE and the network entity associated with the relay service, RLC channel mapping information, wherein the RLC channel mapping information includes a mapping between a bearer identifier and one or more RLC channels of a sidelink unicast link and one or more RLC channels of a link with the relay UE, or data routing information associated with the relay service; and/or means for communicating with the remote UE via the relay UE based at least in part on the configuration information. In some aspects, the means for the network entity to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the network entity includes means for receiving, from the relay UE, an indication of remote UE identifiers for each remote UE, of a plurality of remote UEs, in communication with the relay UE via a radio resource control message.

In some aspects, the network entity includes means for assigning remote UE identifiers to each remote UE, of a plurality of remote UEs, in communication with the relay UE.

In some aspects, the network entity includes means for assigning, for a remote UE of the plurality of remote UEs, the remote UE identifier as a C-RNTI identifying a sidelink unicast link between the remote UE and the relay UE.

In some aspects, the network entity includes means for assigning, for a remote UE of the plurality of remote UEs, a temporary identifier for the remote UE, wherein the temporary identifier is unique among the plurality of remote UEs in communication with the relay UE.

In some aspects, the network entity includes means for transmitting, to the remote UE via the relay UE, an indication of the remote UE identifier for the remote UE via a radio resource control message.

In some aspects, the network entity includes means for transmitting, to the relay UE, a relaying configuration via a radio resource control message, wherein the relaying configuration indicates the remote UE identifiers for each remote UE, of the plurality of remote UEs, in communication with the relay UE.

In some aspects, the network entity includes means for assigning a bearer identifier for each bearer of the one or more bearers between the remote UE and a network entity associated with the relay service.

In some aspects, the network entity includes means for transmitting, to the remote UE via the relay UE, the bearer identifier information via a radio resource control message, wherein the bearer identifier information indicates:

In some aspects, the network entity includes means for transmitting, to the relay UE, the bearer identifier information via a radio resource control message, wherein the bearer identifier information indicates:

In some aspects, the network entity includes means for transmitting, to the relay UE and the remote UE via the relay UE, an indication of a default bearer identifier identifying an SRB associated with radio resource control messages.

In some aspects, the network entity includes means for receiving, from the relay UE, an adaptation layer PDU; means for determining an SRB or a DRB associated with the remote UE based at least in part on a header of the adaptation layer PDU; means for removing the header of the adaptation layer PDU; and/or means for transferring a New Radio PDCP PDU of the adaptation layer PDU to an upper layer.

In some aspects, the network entity includes means for determining the remote UE identifier of the remote UE associated with a sidelink unicast link for the remote UE; means for determining a bearer identifier of the remote UE corresponding to a radio access bearer of the remote UE; means for determining a radio access RLC channel between the relay UE and the network entity corresponding to the bearer identifier; means for generating an adaptation layer header including at least one of the remote UE identifier, the bearer identifier, or a path identifier; and/or means for transmitting, to the relay UE, an adaptation layer PDU with the adaptation layer header on the radio access RLC channel between the relay UE and the network entity.

In some aspects, the network entity includes means for performing a privacy update procedure with at least one of the remote UE or the relay UE, wherein the privacy update procedure includes updating information included in configuration information. In some aspects, the network entity includes means for performing the privacy update procedure according to a periodic schedule. In some aspects, the network entity includes means for detecting a trigger event associated with a privacy update; and/or means for performing the privacy update procedure based at least in part on detecting the trigger event.

In some aspects, the network entity includes means for modifying one or more identifiers for an adaption layer header for the relay service; means for communicating, with the remote UE via the relay UE, to indicate modified identifier information that indicates the one or more modified identifiers; and/or means for communicating, with the relay UE, to indicate the modified identifier information that indicates the one or more modified identifiers.

In some aspects, the UE 120 (e.g., a remote UE) includes means for establishing a sidelink unicast link with a relay UE via a sidelink signaling interface; means for receiving configuration information for an adaptation layer of the sidelink signaling interface, the configuration information including at least one of a remote UE identifier for the remote UE identifying the sidelink unicast link between the remote UE and the relay UE for a relay service, bearer identifier information identifying one or more bearers between the remote UE and a network entity associated with the relay service, or RLC channel mapping information, wherein the RLC channel mapping information includes a mapping between a bearer identifier and one or more RLC channels of the sidelink unicast link and one or more RLC channels of a link with the network entity; and/or means for communicating with the network entity via the relay UE based at least in part on the configuration information. The means for the remote UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the remote UE 120 includes means for receiving, from the relay UE, an indication of the remote UE identifier for the remote UE.

In some aspects, the remote UE 120 includes means for receiving, from the network entity via the relay UE, an indication of the remote UE identifier for the remote UE via a radio resource control message.

In some aspects, the remote UE 120 includes means for assigning a bearer identifier for each bearer of the one or more bearers between the remote UE and a network entity associated with the relay service.

In some aspects, the remote UE 120 includes means for receiving, from the network entity via the relay UE, the bearer identifier information via a radio resource control message, wherein the bearer identifier information indicates:

In some aspects, the remote UE 120 includes means for receiving, from the network entity via the relay UE, an indication of a default bearer identifier identifying an SRB) associated with radio resource control messages.

In some aspects, the remote UE 120 includes means for transmitting, to the network entity via the relay UE, a resource control message including the default bearer identifier identifying the SRB associated with radio resource control messages.

In some aspects, the remote UE 120 includes means for receiving, from the relay UE, an adaptation layer PDU; means for determining an SRB or a DRB associated with the remote UE based at least in part on a header of the adaptation layer PDU; means for removing the header of the adaptation layer PDU; and/or means for transferring a New Radio PDCP PDU of the adaptation layer PDU to an upper layer.

In some aspects, the remote UE 120 includes means for determining the remote UE identifier of the remote UE associated with the sidelink unicast link for the remote UE; means for determining a bearer identifier of the remote UE corresponding to a radio access bearer of the remote UE; means for determining a sidelink RLC channel between the relay UE and the remote UE corresponding to the bearer identifier; means for generating an adaptation layer header including at least one of the remote UE identifier, the bearer identifier, or a path identifier; and/or means for transmitting, to the relay UE, an adaptation layer PDU with the adaptation layer header on the sidelink RLC channel between the relay UE and the remote UE.

In some aspects, the remote UE 120 includes means for performing a privacy update procedure with at least one of the network entity or the relay UE, wherein the privacy update procedure includes updating information included in configuration information. In some aspects, the remote UE 120 includes means for performing the privacy update procedure according to a periodic schedule. In some aspects, the remote UE 120 includes means for detecting a trigger event associated with a privacy update; and/or means for performing the privacy update procedure based at least in part on detecting the trigger event.

In some aspects, the remote UE 120 includes means for receiving, from the network entity via the relay UE or from the relay UE, an indication of modified identifier information indicating one or more modified identifiers for the adaptation layer; means for modifying the configuration information based at least in part on the modified identifier information; and/or means for communicating, with the relay UE, to indicate that the one or more modified identifiers for the adaptation layer been modified at the remote UE.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
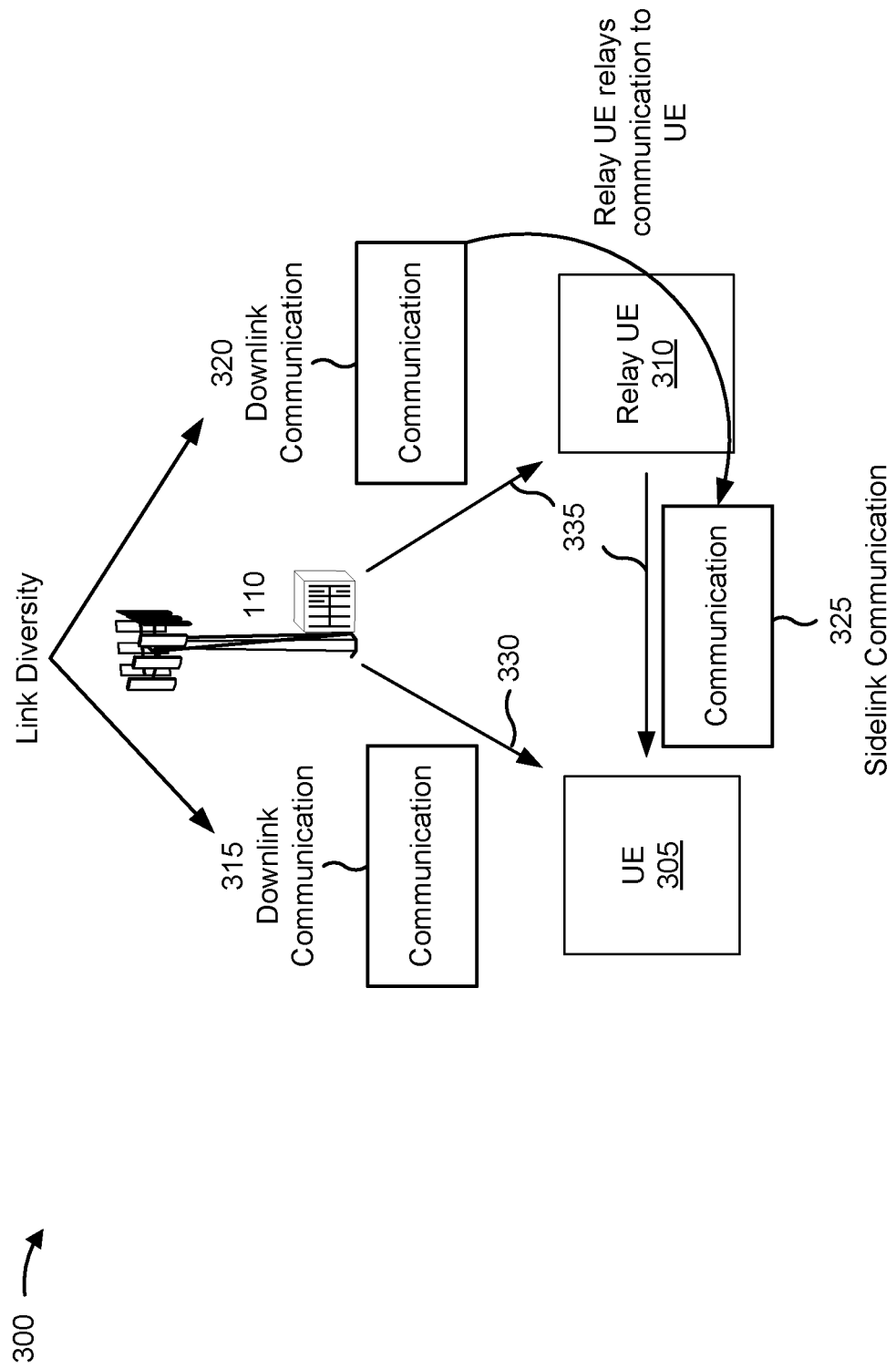
FIGS. 3 and 4 are diagrams illustrating examples of a relay user equipment (UE) that relays communications between a UE and a base station, in accordance with various aspects of the present disclosure.

FIG. 3 is a diagram illustrating an example 300 of a relay UE that relays communications between a UE and a base station. As shown, example 300 includes a UE 305, a relay UE 310, and a base station 110. In example 300, the UE 305 is an Rx UE, and the relay UE 310 is a Tx UE. In some aspects, the UE 305 is one UE 120, and the relay UE 310 is another UE 120. In some aspects, the UE 305 may be referred to as a remote UE.

As shown in FIG. 3, the UE 305 may receive a communication (e.g., data and/or control information) directly from the base station 110 as a downlink communication 315. Additionally, or alternatively, the UE 305 may receive a communication (e.g., data and/or control information) indirectly from the base station 110 via the relay UE 310. For example, the base station 110 may transmit the communication to the relay UE 310 as a downlink communication 320, and the relay UE 310 may relay (e.g., forward or transmit) the communication to the UE 305 as a sidelink communication 325.

In some aspects, the UE 305 may communicate directly with the base station 110 via a direct link 330. For example, the downlink communication 315 may be transmitted via the direct link 330. A communication transmitted via the direct link 330 between the UE 305 and the base station 110 (e.g., in the downlink communication 315) does not pass through and is not relayed by the relay UE 310. In some aspects, the UE 305 may communicate indirectly with the base station 110 via an indirect link 335. For example, the downlink communication 320 and the sidelink communication 325 may be transmitted via different segments of the indirect link 335. A communication transmitted via the indirect link 335 between the UE 305 and the base station 110 (e.g., in the downlink communication 320 and the sidelink communication 325) passes through and is relayed by the relay UE 310. Using the communication scheme shown in FIG. 3 may improve network performance and increase reliability by providing the UE 305 with link diversity for communicating with the base station 110.

In some cases, the UE 305 may receive a communication (e.g., the same communication) from the base station 110 via both the direct link 330 and the indirect link 335. In other cases, the base station 110 may select one of the links (e.g., either the direct link 330 or the indirect link 335), and may transmit a communication to the UE 305 using only the selected link. Alternatively, the base station 110 may receive an indication of one of the links (e.g., either the direct link 330 or the indirect link 335), and may transmit a communication to the UE 305 using only the indicated link. The indication may be transmitted by the UE 305 and/or the relay UE 310. In some aspects, such selection and/or indication may be based at least in part on channel conditions and/or link reliability.

As indicated above, FIG. 3 is provided as an example. Other examples may differ from what is described with respect to FIG. 3.

Figure 4:
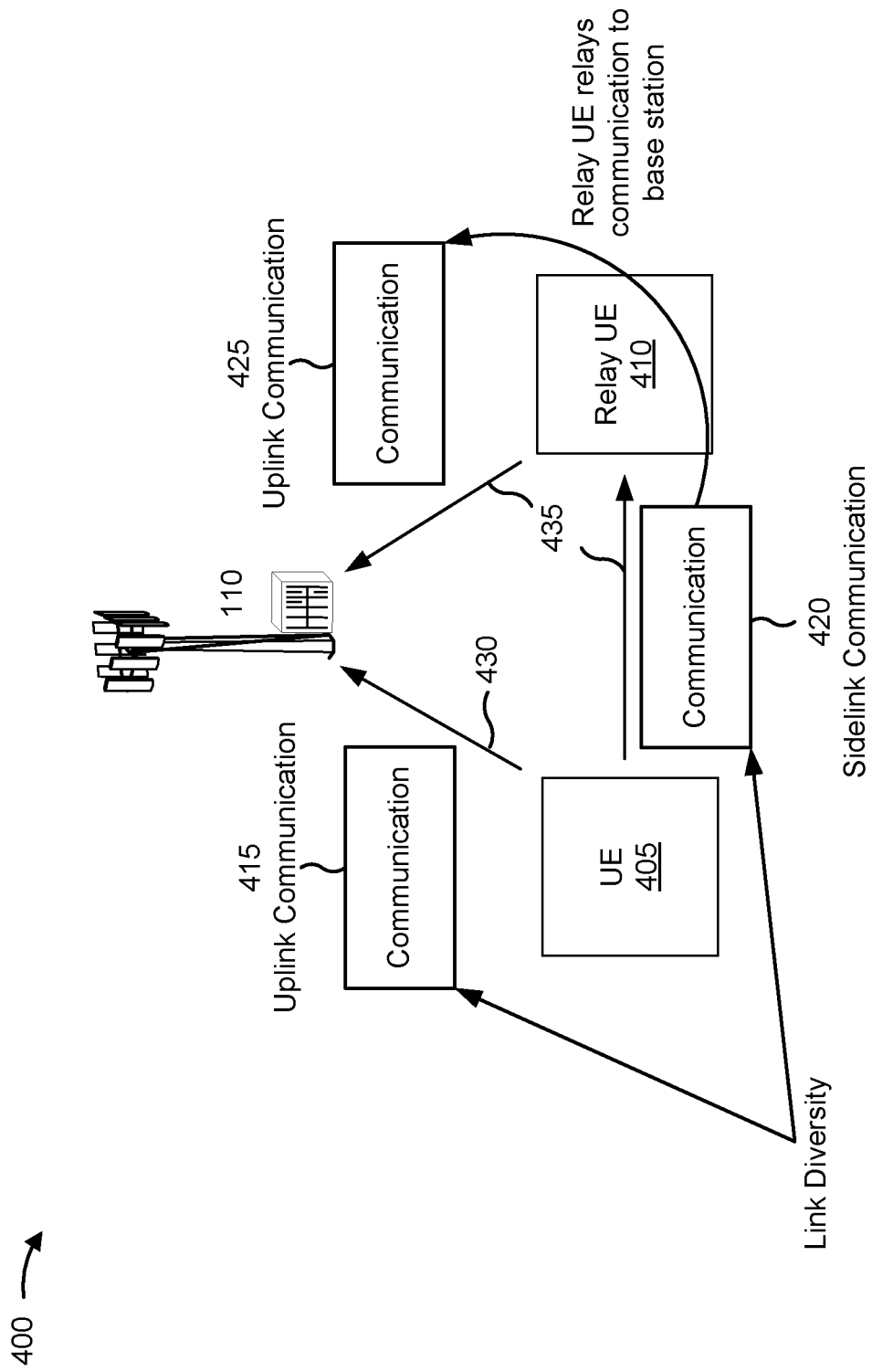

FIG. 4 is a diagram illustrating an example 400 of a relay UE that relays communications between a UE and a base station. As shown, example 400 includes a UE 405, a relay UE 410, and a base station 110. In example 400, the UE 405 is a Tx UE, and the relay UE 410 is an Rx UE. In some aspects, the UE 405 is one UE 120, and the relay UE 410 is another UE 120. In some aspects, the UE 405 may be referred to as a remote UE.

As shown in FIG. 4, the UE 405 may transmit a communication (e.g., data and/or control information) directly to the base station 110 as an uplink communication 415. Additionally, or alternatively, the UE 405 may transmit a communication (e.g., data and/or control information) indirectly to the base station 110 via the relay UE 410. For example, the UE 405 may transmit the communication to the relay UE 410 as a sidelink communication 420, and the relay UE 410 may relay (e.g., forward or transmit) the communication to the base station 110 as an uplink communication 425.

In some aspects, the UE 405 may communicate directly with the base station 110 via a direct link 430. For example, the uplink communication 415 may be transmitted via the direct link 430. A communication transmitted via the direct link 430 between the UE 405 and the base station 110 (e.g., in the uplink communication 415) does not pass through and is not relayed by the relay UE 410. In some aspects, the UE 405 may communicate indirectly with the base station 110 via an indirect link 435. For example, the sidelink communication 420 and the uplink communication 425 may be transmitted via different segments of the indirect link 435. A communication transmitted via the indirect link 435 between the UE 405 and the base station 110 (e.g., in the sidelink communication 420 and the uplink communication 425) passes through and is relayed by the relay UE 410.

Using the communication scheme shown in FIG. 4 may improve network performance and increase reliability by providing the UE 405 with link diversity for communicating with the base station 110. For millimeter wave (e.g., frequency range 2, or FR2) communications, which are susceptible to link blockage and link impairment, this link diversity may improve reliability and prevent multiple retransmissions of data that may otherwise be retransmitted in order to achieve a successful communication. However, techniques described herein are not limited to millimeter wave communications, and may be used for sub-6 gigahertz (e.g., frequency range 1, or FR1) communications.

In some cases, the UE 405 may transmit a communication (e.g., the same communication) to the base station 110 via both the direct link 430 and the indirect link 435. In other cases, the UE 405 may select one of the links (e.g., either the direct link 430 or the indirect link 435), and may transmit a communication to the base station 110 using only the selected link. Alternatively, the UE 405 may receive an indication of one of the links (e.g., either the direct link 430 or the indirect link 435), and may transmit a communication to the base station 110 using only the indicated link. The indication may be transmitted by the base station 110 and/or the relay UE 410. In some aspects, such selection and/or indication may be based at least in part on channel conditions and/or link reliability.

As indicated above, FIG. 4 is provided as an example. Other examples may differ from what is described with respect to FIG. 4.

Figure 5:
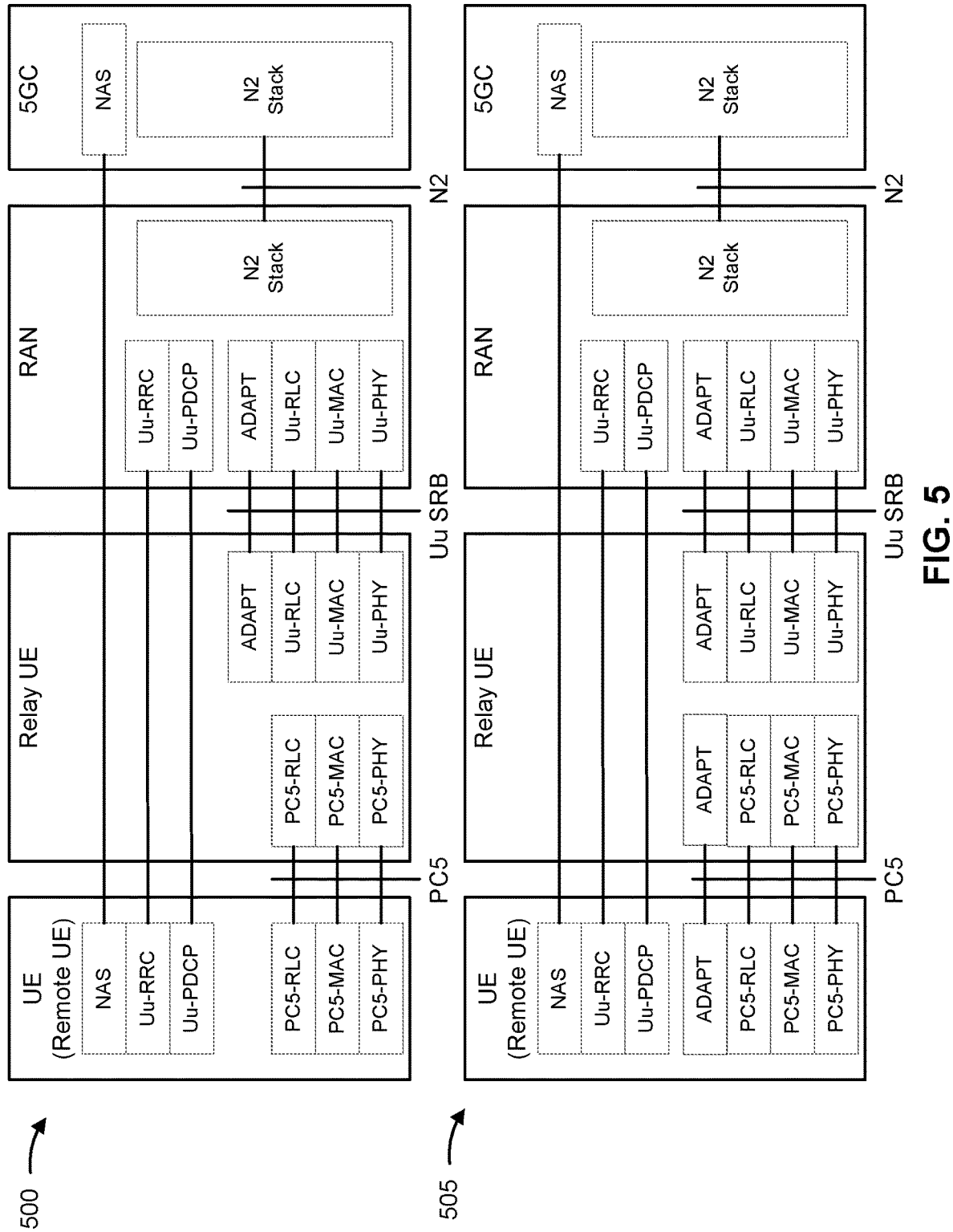
FIG. 5 is a diagram illustrating examples of control-plane protocol architecture for a UE-to-network relay, in accordance with various aspects of the present disclosure.

FIG. 5 is a diagram illustrating examples of control-plane protocol architecture 500 and 505 for a UE-to-network relay. As shown in FIG. 5, the control-plane protocol architecture 500 and 505 may correspond to a remote UE (e.g., UE 120) and a relay UE (e.g., UE 120).

As shown in FIG. 5, in the control-plane, there may be a ProSe Sidelink (PC5) interface (e.g., a sidelink interface) between the remote UE and the relay UE, a Uu interface between the relay UE and a radio access network (RAN) (also referred to herein as a 5G access network (5G-AN) or a next generation RAN (NG-RAN)), and an N2 interface between the RAN and a core network (e.g., a 5G core network (5GC)). The 5GC may include an access and mobility management function (AMF), a session management function (SMF), and/or a user-plane function (UPF).

The remote UE and the relay UE may be associated with respective PC5 protocol stacks enabling communication on the PC5 interface between the remote UE and the relay UE. The PC5 protocol stack may include a PC5 radio link control (RLC) component, a PC5 medium access control (MAC) component, a PC5 physical (PHY) component, and/or the like. "PC5" is generally referred to herein as "sidelink" (e.g., sidelink signaling interfaces, sidelink unicast link, sidelink RLC channels, and/or the like). Communications between the remote UE and the relay UE using the PC5 interface may be referred to as sidelink communications. In some aspects, the respective PC5 protocol stacks may be associated with one or more of PC5-signaling (PC5-S) entities, PC5-radio resource control (RRC) entities, or PC5-PDCP entities. The PC5-S entity may manage a sidelink signaling interface, such as a PC5-S interface. A UE that includes a PC5-S entity and/or a PC5-RRC entity may handle control signaling and configuration of a sidelink connection with another UE, such as the connection used for relaying between the remote UE and the relay UE. In some aspects, the PC5 protocol stacks may not include PC5-S entities or PC5-RRC entities. Also, in some cases, the RAN may handle control signaling and configuration of the sidelink connection.

As shown in FIG. 5, the remote UE is associated with a non-access stratum (NAS) stack, which may include an NAS session management (NAS-SM) component, and one or more radio access components (e.g., a Uu-RRC component and a Uu-PDCP component). The Uu-RRC component may be referred to herein as an NR-RRC component. Similarly, the Uu-PDCP component may be referred to as an NR-PDCP component.

The relay UE may be associated with a radio access stack, including a Uu-RLC component (e.g., an NR-RLC component), a Uu-MAC component (e.g., an NR-MAC component), and a Uu-PHY component (e.g., an NR-PHY component). Furthermore, the RAN is associated with a radio access interface stack, which may include a Uu-RRC entity, a Uu-PDCP entity, a Uu-RLC component, a Uu-MAC component, and a Uu-PHY component.

As shown by the lines in FIG. 5, control-plane traffic may be transported between the Uu-RRC components and the Uu-PDCP component of the remote UE and the RAN. Such control-plane traffic may be transported via one or more bearers, such as a signaling radio bearer (SRB). An SRB can also be referred to as a radio bearer, a radio access bearer, and/or an end-to-end bearer. Control-plane traffic may be transported between the PC5 protocol stacks of the remote UE and the relay UE via one or more RLC channels. Similarly, control-plane traffic may be transported between the radio access stack of the relay UE and the RAN via one or more RLC channels (e.g., using the Uu interface).

As shown in control-plane protocol architecture 500 and 505, the relay UE and the RAN may include a radio access adaptation layer entity (e.g., a Uu adaptation layer entity and/or an NR adaptation layer entity). The adaptation layer entity of the relay UE may handle relaying from the remote UE to the network or from the network to the remote UE. As used herein, "the network" may refer to any one or more of the RAN, the AMF, the SMF, the UPF, or the 5GC. The adaptation layer may be referred to herein as an adaptation layer entity. In some aspects, the adaptation layer entity may be a separate entity between an RLC entity and a packet data convergence entity. In some aspects, the adaptation layer entity may be logically part of the packet data convergence entity or the RLC entity.

As shown in control-plane protocol architecture 500, a sidelink interface adaptation layer entity (e.g., a PC5 adaptation layer entity or a sidelink adaptation layer entity) may not be supported at the relay UE and the remote UE. Therefore, in some aspects, the relay UE and the remote UE may not include a PC5 adaptation layer entity. As shown in control-plane protocol architecture 505, a sidelink interface adaptation layer entity (e.g., a PC5 adaptation layer entity or a sidelink adaptation layer entity) may be supported at the relay UE and the remote UE. Therefore, in some aspects, the relay UE and the remote UE may include a PC5 adaptation layer entity.

The stacks of the remote UE and/or the RAN may communicate with one another. For example, a message (e.g., an NR RRC message generated by the radio access protocol stack) may be communicated between the radio access stack of the remote UE and the PC5 stack of the remote UE (e.g., between the Uu-PDCP entity and/or the PC5-RLC entity or the PC5-adaptation layer entity).

As indicated above, FIG. 5 is provided as an example. Other examples may differ from what is described with respect to FIG. 5.

Figure 6:
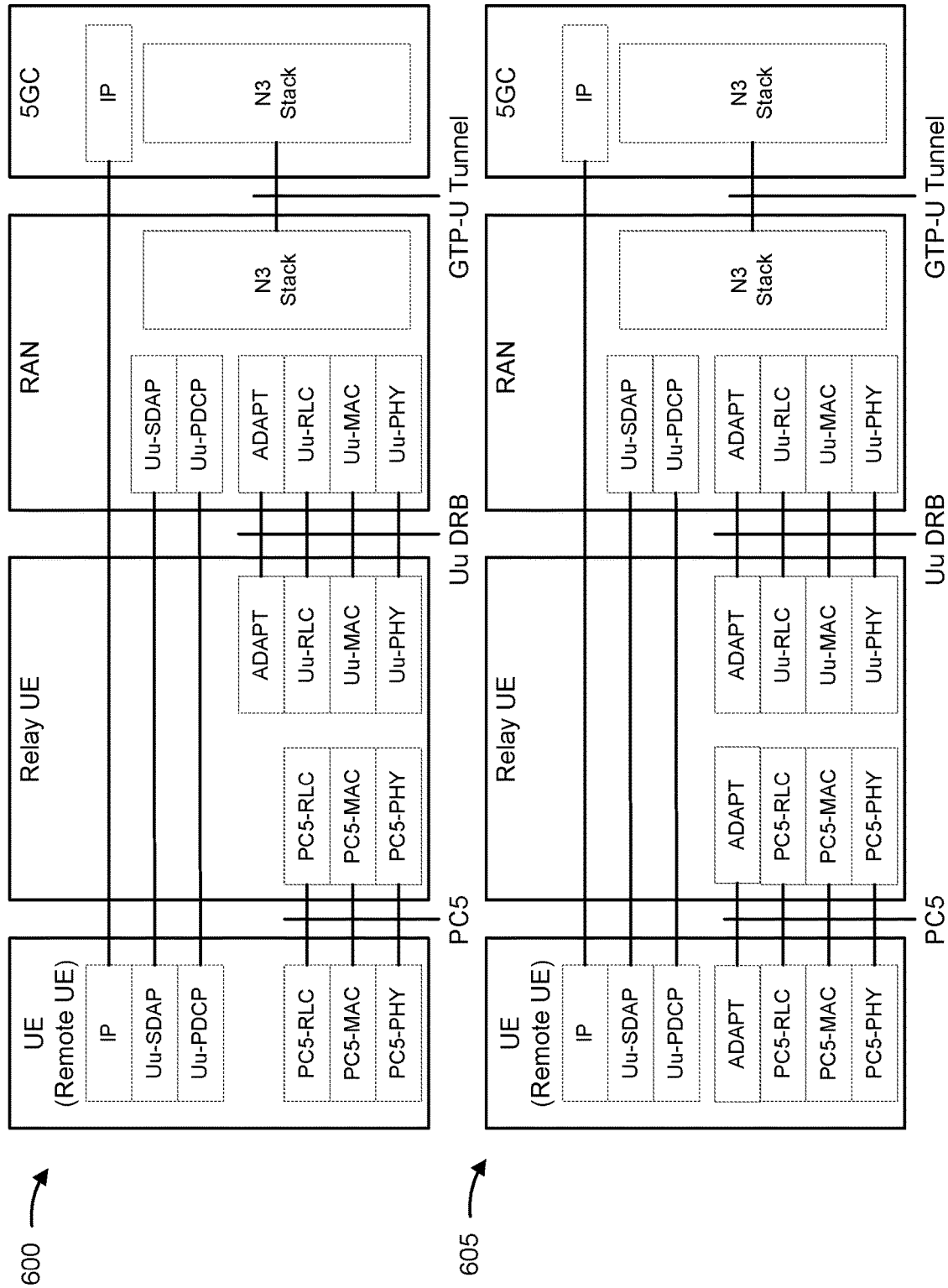
FIG. 6 is a diagram illustrating examples of user-plane protocol architecture for a UE-to-network relay, in accordance with various aspects of the present disclosure.

FIG. 6 is a diagram illustrating examples of user-plane protocol architecture 600 and 605 for a UE-to-network relay. As shown in FIG. 5, the user-plane protocol architecture 600 and 605 may correspond to a remote UE (e.g., UE 120) and a relay UE (e.g., UE 120).

As shown in FIG. 6, the user-plane protocol architecture 600 and 605 may include similar entities to the entities described above in connection with FIG. 5. For example, the remote UE may include a PC5 protocol stack (e.g., including a PC5-RLC component, a PC5-MAC component and a PC5-PHY component). The PC5 protocol stack of the remote UE may not include an adaptation layer entity as shown in user-plane protocol architecture 600. In some aspects, the PC5 protocol stack of the remote UE may include an adaptation layer entity as shown in user-plane protocol architecture 605.

The relay UE may include a PC5 protocol stack (e.g., including a PC5-RLC component, a PC5-MAC component and a PC5-PHY component). The PC5 protocol stack of the relay UE may not include an adaptation layer entity, as shown in user-plane protocol architecture 600. In some aspects, the PC5 protocol stack of the relay UE may include an adaptation layer entity, as shown in user-plane protocol architecture 605. The relay UE may include a radio access stack (e.g., including an adaptation layer entity, a Uu-RLC component, a Uu-MAC component, and a Uu-PHY component). Similarly, the RAN may include a radio access stack.

As shown in FIG. 6, the remote UE may be associated with a user-plane protocol stack, which may include an Internet protocol (IP) component, an application (APP) component (not shown in FIG. 6), a service data adaptation protocol (SDAP) component (e.g., a Uu SDAP component or an NR SDAP component), and/or a PDCP component (e.g., a Uu PDCP component or an NR PDCP component). The RAN may include a service data adaptation protocol (SDAP) component (e.g., a Uu SDAP component or an NR SDAP component), and a PDCP component (e.g., a Uu PDCP component or an NR PDCP component). As shown in FIG. 6, the RAN and the 5GC may include an N3 stack (e.g., which may include a UPF). The RAN and the 5GC may communicate via a general packet radio service (GPRS) tunneling protocol (GTP) for user data (collectively, a GTP-U) tunnel. The 5GC may include an IP component which may communicate with the IP component of the remote UE.

As shown by the lines in FIG. 6, user-plane traffic may be transported between the Uu-SDAP components and the Uu-PDCP component of the remote UE and the RAN. Such user-plane traffic may be transported via one or more bearers, such as a data radio bearer (DRB). Similar to an SRB for control-plane traffic, a DRB can also be referred to as a radio bearer, a radio access bearer, and/or an end-to-end bearer. User-plane traffic may be transported between the PC5 protocol stacks of the remote UE and the relay UE via one or more RLC channels. Similarly, user-plane traffic may be transported between the radio access stack of the relay UE and the RAN via one or more RLC channels (e.g., using the Uu interface).

The adaptation layer may handle the mapping of these types of flows, channels, and bearers to each other to facilitate relay services, as described elsewhere herein. The adaptation layer may be referred to herein as a relay adaptation layer. A radio access bearer may include an SRB and/or a DRB, among other examples. An RLC channel can also be referred to as an RLC bearer. In such a case, an RLC channel identifier associated with the RLC channel may be referred to as an RLC bearer identifier.

As indicated above, FIG. 6 is provided as an example. Other examples may differ from what is described with respect to FIG. 6.

A UE (referred to herein as a relay user equipment or relay UE) may relay communications from another UE (referred to herein as a remote user equipment or remote UE) to a network or from the network to the remote UE. In some aspects, the relay UE may perform Layer 2 UE-to-network relaying, in which an adaptation layer (e.g., a Uu adaptation layer) in the Layer 2 stack of the relay UE performs forwarding of the remote UE's communications, as compared to Layer 3 relaying which may occur in the IP layer. Communications between the relay UE and the remote UE may be referred to herein as sidelink communications. In some Layer 2 UE-to-network relaying applications, NAS and RRC messages may be transparently transferred between the remote UE and the network using PDCP end-to-end connections (e.g., using a dedicated end-to-end SRB or DRB).

The PC5 interface may provide a sidelink interface between UEs. For example, Vehicle-to-Anything (V2X) communications in accordance with NR Release 16 may be performed using a PC5 unicast control-plane stack, which may include a PC5-S interface and a PC5 access-stratum (AS) (PC5-AS) interface, such as a PC5-RRC interface. UEs communicating using the PC5 interface may configure a sidelink unicast link context and exchange AS information using the PC5-S interface and the PC5-RRC interface. The UEs may be associated with a PC5 user-plane stack, which may include, for example, a PC5-SDAP entity and/or a PC5-PDCP entity.

Traffic flows may be associated with various quality of service (QoS) requirements, relay services, and security settings. Furthermore, a relay UE may provide a Layer 2 relay service for one or more remote UEs, which may be associated with respective traffic flows, RLC channels, bearers, and so on. Therefore, challenges may arise in the relaying of communications between one or more remote UEs and the network, such as how to handle traffic with varying QoS requirements, how to map radio access RLC channels to sidelink RLC channels, how to handle radio access bearers such as signaling radio bearers and data radio bearers, how to handle relaying for multiple remote UEs, and so on, which may complicate the Layer 2 relay service.

As described above, a relay UE may use the Uu adaptation layer for supporting downlink bearer mapping and data multiplexing between multiple end-to-end radio bearers (e.g., SRBs and/or DRBs) of a remote UE (and/or multiple remote UEs) and a single Uu RLC channel over the relay UE Uu path. For example, identity information of a remote UE Uu radio bearer (e.g., an SRB or a DRB) may be included in the Uu adaptation layer in uplink scenarios to enable the RAN (e.g., a network entity of the RAN, such as a base station) to correlate the packets received from the relay UE to the correct end-to-end radio bearer of the remote UE. Additionally, identity information of a remote UE may be included in the Uu adaptation layer in uplink scenarios to enable the RAN (e.g., a base station) to correlate the packets received from the relay UE to the correct remote UE. Similarly, the identity information of a remote UE Uu radio bearer (e.g., an SRB or a DRB) may be included in the Uu adaptation layer in downlink scenarios (e.g., by a network entity of the RAN) to enable the relay UE to correlate or map the receive packets to a correct PC5 RLC channel between the relay UE and the remote UE that is associated with the remote UE Uu radio bearer. Additionally, the identity information of a remote UE may be included in the Uu adaptation layer in downlink scenarios (e.g., by a network entity of the RAN) to enable the relay UE to correlate or map the receive packets to a correct remote UE.

However, as described above, the relay UE and the remote UE may include a PC5 adaptation layer in some cases. Therefore, functions of the PC5 adaptation layer are and/or how the functions of PC5 adaptation layer effect or integrate with the functions of the Uu PC5 adaptation layer need to be clarified or defined. Moreover, the identity information included in the adaptation layer (e.g., the PC5 adaptation layer and/or the Uu adaptation layer) may not be protected as it is not included in a dedicated end-to-end radio bearer (e.g., an SRB or a DRB). Therefore, this identify information needs to be protected to ensure that the identify information cannot be obtained to identify or locate the remote UE (e.g., to satisfy security requirements of the remote UE or a sidelink communication network, such as a V2X network).

Some techniques and apparatuses described herein enable a configuration of a sidelink interface (e.g., PC5) adaptation layer. The PC5 adaptation layer may support data transfer, bearer mapping, and data routing associated with a Layer 2 relay service. For example, a remote UE may be associated with multiple radio bearers which may be multiplexed to a single PC5 RLC channel. The remote UE may include a remote UE bearer identifier (e.g., identifying the radio bearer associated with the traffic) in the PC5 adaptation layer. Therefore, the relay UE may be enabled to identify the remote UE bearer identifier and map the traffic to a correct Uu RLC channel to be transmitted to a network entity. The network entity may be enabled to identify the radio bearer associated with the traffic and pass the traffic to the correct radio bearer in an upper layer.

Some techniques and apparatuses described herein provide signaling for configuration of the adaptation layer (e.g., the PC5 adaptation layer and/or the Uu adaptation layer), configuration of radio bearer mappings, privacy and security support, and traffic routing. As a result, a Layer 2 relay service is configured to handle QoS requirements, one or more remote UEs, various service coverage and connection states, and mappings of radio bearers, RLC channels, and so on. In this way, efficiency of Layer 2 relaying is improved and conformance with QoS requirements and/or security requirements is improved.

Figure 7:
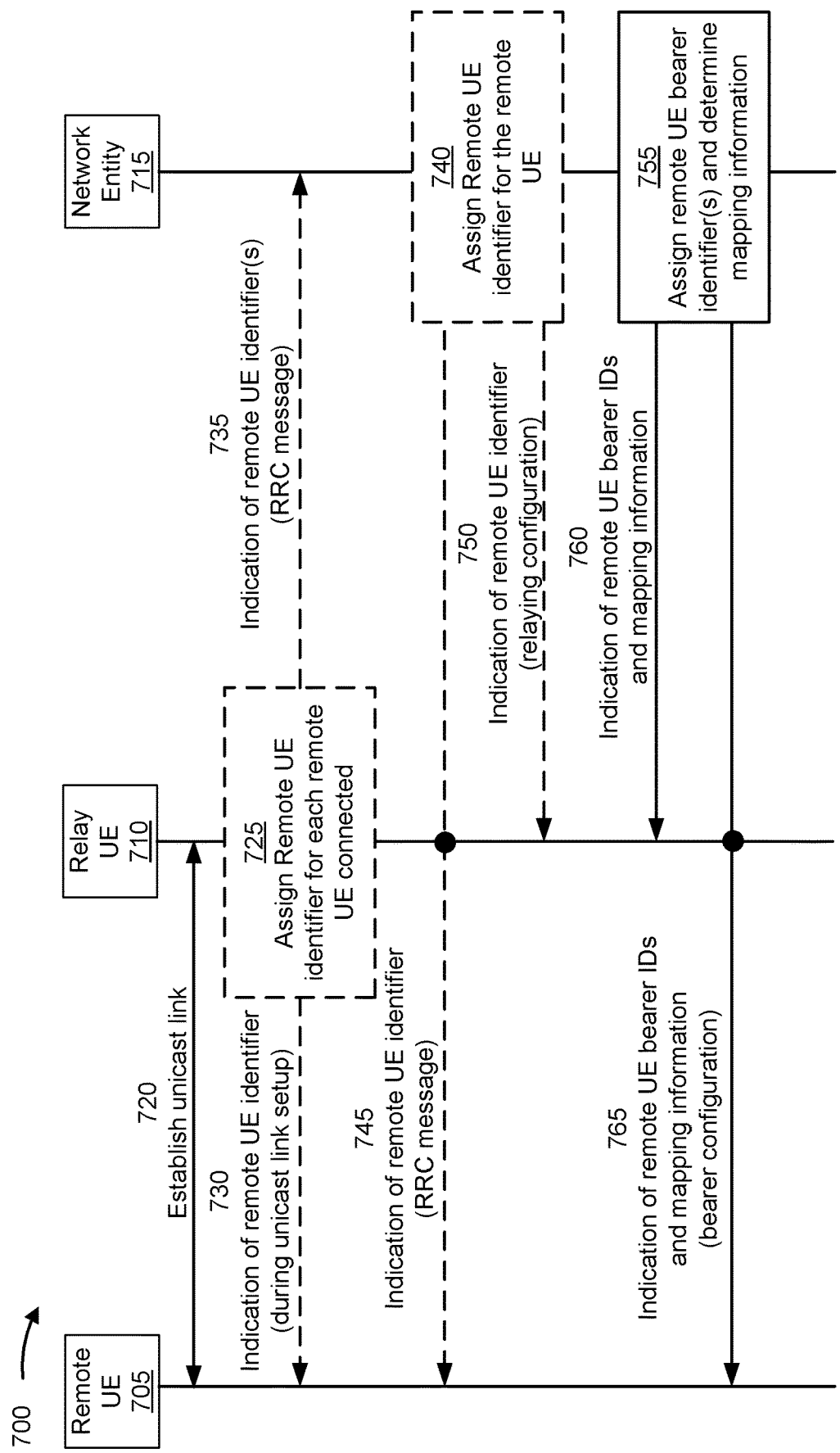
FIG. 7 is a diagram illustrating an example of configuring a sidelink interface adaptation layer for a relay service, in accordance with various aspects of the present disclosure, in accordance with various aspects of the present disclosure.

FIG. 7 is a diagram illustrating an example 700 of configuring a sidelink interface (e.g., PC5) adaptation layer for a relay service, in accordance with various aspects of the present disclosure. As shown, example 700 includes a remote UE 705, a relay UE 710, and a network entity 715. The network entity 715 may be a base station (e.g., base station 110), a gNB, and/or an NG-RAN, among other examples.

As shown by reference number 720, the relay UE 710 and the remote UE 705 may establish a sidelink unicast link via a sidelink signaling interface (e.g., a PC5-S interface). In some aspects, the sidelink unicast link may be associated with an identifier. For example, the sidelink unicast link may be identified by a combination of a source Layer 2 identifier and a destination Layer 2 identifier. One of the source Layer 2 identifier and the destination Layer 2 identifier may identify the remote UE 120, and the other may identify the relay UE 120. The identifier may be used to route traffic via the Layer 2 relay, as described elsewhere herein. The identifier may be referred to herein as a unique index.

A sidelink unicast link for a particular relay service may be configured with a corresponding security setting that is associated with the particular relay service and/or relay service code. In some aspects, sidelink control plane (e.g., PC5-CP) signaling may use the corresponding security setting for control-plane signaling specific to the particular relay service. In some aspects, all services associated with the relay service code (e.g., data radio bearers (DRBs) and/or signaling radio bearers (SRBs)) may use the same sidelink security.

In some aspects, the sidelink unicast link may support multiple sidelink RLC channels (e.g., N sidelink RLC channels, where N is an integer) for radio access SRBs and/or DRBs. In some aspects, the sidelink unicast link may support multiple radio access protocol data unit (PDU) sessions on a single link. In some aspects, the sidelink unicast link may support multiple sidelink RLC channels configured with the same QoS.

As described above, the remote UE 705 and the relay UE 710 may include a PC5 adaptation layer entity. The remote UE 705, the relay UE 710, and the network entity 715 may obtain (e.g., assign, transmit, and/or receive) configuration information for the PC5 adaptation layer. The configuration information may support the relaying of remote UE 120's traffic. The configuration information may include a remote UE identifier for the remote UE identifying the sidelink unicast link between the remote UE 705 and the relay UE 710 for a relay service (e.g., a RemoteUEIndex). The configuration information may include bearer identifier information identifying one or more remote UE bearers (e.g., SRBs and/or DRBs) between the remote UE 705 and the network entity 715 associated with the relay service. The bearer identifier information may identify, for a radio bearer of the remote UE, a remote bearer identifier (e.g., a RemoteUEBearerID) identifying the remote UE bearer (e.g., the Uu bearer) for relaying purposes.

The configuration information may include RLC channel mapping information that includes a mapping between a bearer identifier and one or more RLC channels of the sidelink unicast link (e.g., PC5 RLC channels) and one or more RLC channels of a link with the network entity 715 (e.g., Uu RLC channels). For example, the configuration information may include a configuration for one or more RLC channels. Such configuration information may include RLC channel identifier information, such as an information element that identifies RLC channel identifiers of a set of RLC channels (e.g., sidelink RLC channels and/or radio access RLC channels) associated with the relay service. Additionally, or alternatively, such information may include a set of parameters to configure corresponding RLC and MAC entities for an RLC channel. The RLC channel mapping information may map a remote UE bearer identifier to at least on PC5 RLC channel identifier and/or at least one Uu RLC channel identifier.

A radio access link between the relay UE 710 and network entity 715 may be referred to as a link with the network entity 715. The sidelink unicast link and the radio access link may be collectively referred to as a relaying connection.

In some aspects, the relay UE 710 may configure unicast links with multiple remote UEs 705 (e.g., M remote UEs 705, where M is an integer). In some aspects, the relay UE 710 may support multiple radio access RLC channels for relaying traffic to the multiple remote UEs 705. In some aspects, a single radio access RLC channel may be mapped to multiple sidelink RLC channels with the same QoS level. In some aspects, a single radio access RLC channel may be mapped to multiple sidelink RLC channels with different QoS levels. In this case, in some aspects, the radio access RLC channel may be assigned a highest QoS level of the different QoS levels. In other aspects, scheduling by the network entity 715 and link control protocol (LCP) operations at the relay UE 710 may consider each of the QoS levels associated with the multiple sidelink RLC channels when scheduling and relaying communications.

As shown by reference number 725, in some aspects, the relay UE 710 may assign a remote UE identifier for each remote UE 705 in communication with the relay UE 710. The remote UE identifier may be referred to herein as a remote UE index. As described above, the remote UE identifier may be a unique index identifying the sidelink unicast link between the remote UE 705 and the relay UE 710. In some aspects, the relay UE 710 may assign the remote UE identifier during the setup of the sidelink unicast link between the remote UE 705 and the relay UE 710 (e.g., as described above in connection with reference number 720). For example, as shown by reference number 730, the relay UE 710 may transmit, to the remote UE 705, an indication of the remote UE identifier during the sidelink unicast link setup. The relay UE 710 may transmit, to the remote UE 705, the indication of the remote UE identifier in an RRC message, such as a direct security mode command message or a direct communication accept message.

As shown by reference number 735, if the relay UE 710 assigns the remote UE identifier, then the relay UE 710 may indicate the remote UE identifier to the network entity 715. For example, the relay UE 710 may transmit, to the network entity 715, an indication of the remote UE identifier for the remote UE 705 (and/or remote UE identifier(s) for one or more other remote UEs 705 in communication with the relay UE 710) via an RRC message. The RRC message may be an NR RRC message, such as a sidelink UE information message (e.g., sidelinkUEInformationNR).

As shown by reference number 740, in some aspects, the network entity 715 may assign a remote UE identifier for the remote UE 705 (and/or one or more other remote UEs 705). For example, in an initial setup of the relay service between the remote UE 705, the relay UE 710, and the network entity 715, the remote UE 705 may transmit, to the network entity 715, an RRC setup request to establish the relay service. The network entity 715 may assign the remote UE identifier for the remote UE 705 when establishing, configuring, and/or setting up the relay service. In some aspects, the remote UE identifier assigned by the network entity 715 may be a cell radio network temporary identifier (C-RNTI) that identifies the sidelink unicast link between the remote UE 705 and the relay UE 710.

In some aspects, the remote UE identifier assigned by the network entity 715 may be a unique UE identifier or a temporary UE identifier that is assigned for each remote UE 705 in communication with the relay UE 710. In that case, the network entity 715 may assign and/or configure the remote UE identifiers on a per-relay UE basis. This means that the remote UE identifier may be unique among the remote UEs 705 in communication with the relay UE 710. In other words, rather than the remote UE identifier being unique among every UE 705, the remote UE identifier may only be required to be unique among the remote UEs 705 in communication with the relay UE 710. For example, if there are 5 remote UEs 705 in communication with the relay UE 710, then the remote UE identifiers may only be required to be unique among the 5 remote UEs 705. This may enable the remote UE identifier to be a shorter identifier, thereby reducing a payload size when communicating using the remote UE identifier (e.g., when the remote UE identifier in included in an adaptation layer header as described in more detail below).

As shown by reference number 745, the network entity 715 may transmit an indication of the remote UE identifier to the remote UE 705 via an RRC message (e.g., an NR RRC message). For example, the RRC message may be an RRC setup message, an RRC resume message, an RRC reestablishment message, and/or an RRC reconfiguration message, among other examples.

As shown by reference number 750, the network entity 715 may transmit an indication of the remote UE identifier to the relay UE 705. For example, the network entity 715 may transmit, to the relay UE 710, an RRC message indicating the remote UE identifier to the relay UE 705. In some aspects, the network entity may indicate the remote UE identifier to the relay UE 705 as part of a relaying configuration for the relay UE 710. For example, the network entity 715 may configure the relay service between the remote UE 705 and the network entity 715 and indicate an RLC channel configuration, RLC channel mapping information, bearer mapping information, and/or data routing information, among other examples. The network entity 715 may include the remote UE identifier in a field of the relaying configuration (e.g., in a RemoteUEIndex field of the relaying configuration). In this way, the network entity 715 may indicate the remote UE identifier of the remote UE 705 to the relay UE 710 and indicate that the relaying configuration is for that particular remote UE 705 (e.g., identified based at least in part on the remote UE identifier).

As shown by reference number 755, the network entity 715 may determine bearer identifier information for one or more remote UE bearers (e.g., DRBs and/or SRBs) between the remote UE 705 and a network entity 715. The one or more remote UE bearers may be end-to-end radio bearers between the remote UE 705 and the network entity 715. The bearer identifier information may include, for each remote UE bearer, a remote UE bearer identifier (e.g., a RemoteUE-BearerID) for the bearer that is to be used for relaying purposes. The remote UE bearer identifier may be associated with a remote UE Uu bearer (e.g., a DRB and/or an SRB).

In some aspects, the remote UE bearer identifier may be the same as an identifier of the radio bearer. For example, for an SRB of the remote UE, the remote UE bearer identifier may be the SRB identifier of the SRB. Similarly, for a DRB of the remote UE, the remote UE bearer identifier may be the DRB identifier of the DRB. In some aspects, the remote UE bearer identifier may be a unique identifier configured by the network entity for the radio bearer that is to be used when the relay connection (or relay path) is used in addition to the radio bearer. In this way, if the remote UE bearer identifier is updated (e.g., as described in more detail below in connection with FIG. 13), the remote UE 705 may not be required to release and reconfigure the radio bearer. For example, when the radio bearer identifier (e.g., the SRB identifier or the DRB identifier) is updated, the remote UE 705 may be required to release and reconfigure the radio bearer. By using a different unique identifier as the remote UE bearer identifier, the remote UE 705 may avoid releasing and reconfiguring the radio bearer when the remote UE bearer identifier for the radio bearer is updated or changed.

The network entity 705 may determine mapping information for the remote UE bearer identifier(s). The mapping information may be referred to herein as RLC channel mapping information and/or bearer identifier mapping information. The mapping information may map a remote UE bearer identifier to one or more PC5 RLC channels and/or one or more Uu RLC channels. For example, in a relaying configuration, there may be a mapping between a radio bearer (e.g., a DRB or SRB) and one or more RLC channels, radio access RLC channels, and/or remote UEs. For example, the mapping may be provided via a pre-configured relaying SRB configuration. As another example, the mapping may be provided by the network entity based at least in part on the relay UE 710 indicating support for the relay service. In this case, the relay UE 710 may transmit information indicating support for the relay service. As still another example, the network entity 715 may provide a mapping for a DRB based at least in part on a request from the relay UE 710 or based at least in part on a handover of the remote UE 705 to the sidelink unicast link (e.g., from a radio access link to the sidelink unicast link).

By using the remote UE bearer identifier, the relay UE 710 is enabled to identify a correct RLC channel for data routing based at least in part on the remote UE bearer identifier. As a result, the receiving device (e.g., the remote UE 705 and/or the network entity 715) may receive a signal on the correct RLC channel and may identify a radio bearer (e.g., a DRB or an SRB) associated with the signal (e.g., based at least in part on the remote UE bearer identifier). Therefore, the remote UE 705 and the network entity 715 may use a remote UE bearer identifier to route traffic to the appropriate bearers and/or RLC channels.

As shown by reference number 760, the network entity 715 may transmit, to the relay UE 710, an indication of the bearer identifier information (e.g., one or more remote UE bearer identifiers and mapping information for the remote UE bearer identifiers). The network entity 715 may transmit the bearer identifier information to the relay UE 710 via an RRC message. For example, the network entity 715 may transmit the bearer identifier information to the relay UE 710 as part of the relay configuration. The relay UE 710 may maintain the mapping of remote UE bearer identifiers to PC5 RLC channels and Uu RLC channels.

As shown by reference number 765, the network entity 715 may transmit, to the remote UE 705, an indication of the bearer identifier information. The network entity 715 may transmit the bearer identifier information to the remote UE 705 via an RRC message. For example, the network entity 715 may transmit the bearer identifier information to the remote UE 705 in one or more RRC reconfiguration messages. For example, the network entity 715 may transmit the bearer identifier information to the remote UE 705 as part of a bearer configuration for the corresponding DRBs and SRBs. A remote UE bearer identifier may be included in a field of an RRC message, such as a RemoteUEBearerID field, that configures the radio bearer associated with the remote UE bearer identifier.

The remote UE 705 may maintain a mapping of radio bearer identifier (e.g., SRB identifier or DRB identifier) to remote UE bearer identifier to enable the remote UE 705 to use the PC5 adaptation layer (e.g., by including the remote UE bearer identifier in a PC5 adaptation layer header or by identifying the remote UE bearer identifier in a PC5 adaptation layer header received from the relay UE 710) to route traffic to the appropriate radio bearer at the network entity 715 (e.g., in the uplink) and/or at the remote UE 705 (e.g., in the downlink). Similarly, the network entity 715 may maintain a mapping of radio bearer identifier (e.g., SRB identifier or DRB identifier) to remote UE bearer identifier to enable the network entity 715 to use the Uu adaptation layer (e.g., by including the remote UE bearer identifier in a Uu adaptation layer header or by identifying the remote UE bearer identifier in a Uu adaptation layer header received from the relay UE 710) to route traffic to the appropriate radio bearer at the network entity 715 (e.g., in the uplink) and/or at the remote UE 705 (e.g., in the downlink).

In some aspects, the remote UE 705 may be configured with a default remote UE bearer identifier associated with an SRB that is to be used for RRC messages using a common control channel. For example, one or more access stratum SRBs, such as SRB0 (which may be for RRC messages using a common control channel), SRB1 (which may be for RRC messages and NAS messages prior to establishment of SRB2), SRB2 (which may be for RRC messages that include logged measurement information as well as NAS messages after security activation), and/or SRB3 (which may be for RRC messages in dual connectivity such as over radio access and sidelink links) may be set up for an NR connection. However, prior to a relay connection being established, the remote UE 705 may be unaware of the remote UE identifiers for the different SRBs, for example, and the one or more SRBs may not be configured. Therefore, the remote UE 705 may transmit an RRC setup request message to the network entity 715 via the relay UE 710 to establish the relay connection. The remote UE 705 may transmit the RRC setup request message using the SRB that is to be used for RRC messages using a common control channel (e.g., SRB0). As the remote UE 705 may not be aware of, or may not be configured with, the bearer identifier information at this time, the remote UE 705 may use the default remote UE bearer identifier to route the traffic to the SRB that is to be used for RRC messages using a common control channel (e.g., SRB0). The default remote UE bearer identifier may be pre-configured at the remote UE 705 and/or may be a reserved remote UE bearer identifier for RRC messages transmitted over SRB0. The relay UE 710 may be configured (or pre-configured) with the default remote UE bearer identifier in a similar manner to enable the relay UE 710 to route traffic to the appropriate RLC channels when receiving traffic that uses the default remote UE bearer identifier (e.g., in a PC5 adaptation layer header).

The remote UE 705, the relay UE 710, and/or the network entity 715 may use the configuration of the identifiers and corresponding mapping information described above to communicate using an adaptation layer, as described in more detail below in connection with FIG. 9 (depicting an uplink scenario) and/or FIG. 10 (depicting a downlink scenario).

For example, the remote UE 705 may use the identifiers and corresponding mapping information to generate a PC5 adaptation layer header to route traffic to the appropriate radio bearers and/or RLC channels at the relay UE 710 and the network entity 715. Similarly, the remote UE 705 may use the identifiers and corresponding mapping information to route traffic to the appropriate radio bearers at an upper layer based at least in part on a PC5 adaptation layer header received from the relay UE 710. The relay UE 710 may use the identifiers and corresponding mapping information to generate a PC5 adaptation layer header from a Uu adaptation layer header received from the network entity 715 and to route traffic to the correct PC5 RLC channel. Similarly, the relay UE 710 may use the identifiers and corresponding mapping information to generate a Uu adaptation layer header from a PC5 adaptation layer header received from the remote UE 705 and to route traffic to the correct Uu RLC channel. The network entity 715 may use the identifiers and corresponding mapping information to generate a Uu adaptation layer header to route traffic to the appropriate radio bearers and/or RLC channels at the relay UE 710 and the remote UE 705. Similarly, the network entity 715 may use the identifiers and corresponding mapping information to route traffic to the appropriate radio bearers at an upper layer based at least in part on a Uu adaptation layer header received from the relay UE 710.

In some aspects, the remote UE 705, the relay UE 710, and/or the network entity 715 may perform one or more privacy update procedures to update the identifiers described above (e.g., the remote UE identifier and/or the remote UE bearer identifier). The one or more privacy update procedures are described in more detail below in connection with FIGS. 11, 12, and 13.

As indicated above, FIG. 7 is provided as an example. Other examples may differ from what is described with respect to FIG. 7.

Figure 8:
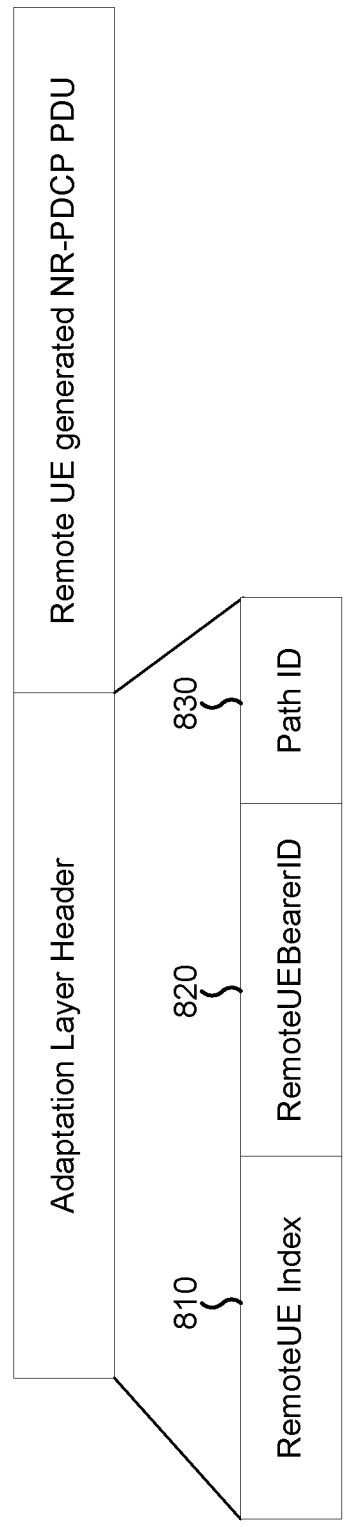
FIG. 8 is a diagram illustrating an example of a sidelink interface adaptation layer header, in accordance with various aspects of the present disclosure.

FIG. 8 is a diagram illustrating an example 800 of a sidelink interface (e.g., PC5) adaptation layer header, in accordance with various aspects of the present disclosure. The PC5 adaptation layer header (e.g., one or more fields of the PC5 adaptation layer header) may provide support for data routing and mapping of RLC channels to bearers associated with the remote UE (e.g., remote UE 705).

For example, the PC5 adaptation layer header may include a first field 810 that identifies an identifier associated with the remote UE (e.g., a remote UE identifier or a remote UE index), which may be a unique index identifying the remote UE's unicast link with the relay UE. In some aspects, the unique index may include the sidelink unicast link identifier described in connection with FIG. 7. As another example, the PC5 adaptation layer header may include a second field 820 that identifies a remote UE bearer identifier corresponding to a radio access bearer of the remote UE. As yet another example, the PC5 adaptation layer header may include a third field 830 that indicates a route over which the communication is to be relayed. For a single-hop relay or a single-relay connection, the third field 830 may not be present or may be set to a value indicating a single-hop relay or a single-relay connection (e.g., 1). As shown, the PC5 adaptation layer header may be appended by the remote UE to an NR-PDCP PDU generated by the remote UE 120. A similar (or the same) header (e.g., a Uu adaptation layer header) may be appended by a network entity to an NR-PDCP PDU generated for the remote UE 120 that includes one or more (or all) of the fields of the PC5 adaptation layer header.

As indicated above, FIG. 8 is provided as an example. Other examples may differ from what is described with respect to FIG. 8.

Figure 9:
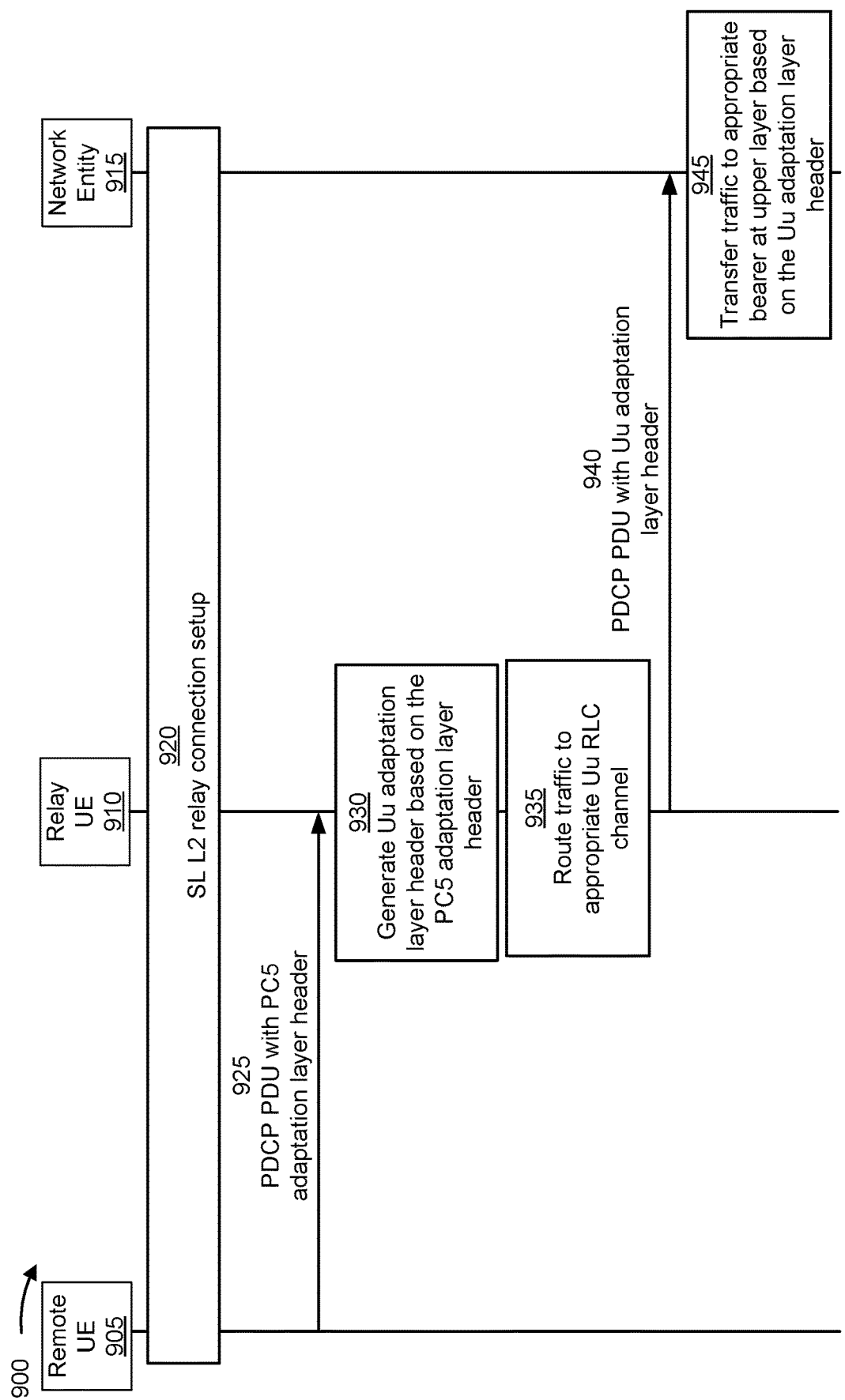
FIG. 9 is a diagram illustrating an example of uplink relay signaling, in accordance with various aspects of the present disclosure.

FIG. 9 is a diagram illustrating an example 900 of uplink relay signaling, in accordance with various aspects of the present disclosure. As shown, example 900 includes a remote UE 905, a relay UE 910, and a network entity 915. The network entity 915 may be a base station (e.g., base station 110), a gNB, and/or an NG-RAN, among other examples. As shown by reference number 920, the remote UE 905, the relay UE 910, and/or the network entity 915 may perform a relay connection setup (e.g., a sidelink layer 2 relay connection setup). The relay connection setup may be similar to, or the same as, example 700 described above in connection with FIG. 7. For example, the relay connection setup may include one or more (or all) of the steps described above in connection with FIG. 7.

As shown by reference number 925, the remote UE 905 may obtain or identify traffic that is to be transmitted to the network entity 915 via the relay UE 910. For example, the remote UE 905 may receive, from an upper layer, a PDCP PDU to be relayed to the network entity 915 via the relay UE 910. The remote UE 905 may identify a radio access (e.g., Uu) radio bearer (e.g., an SRB identifier or a DRB identifier) associated with the PDCP PDU. The remote UE 905 may identify a remote UE bearer identifier associated with the radio access radio bearer (e.g., based at least in part on the mapping information for the remote UE bearer identifier described above). The remote UE 905 may identify a remote UE identifier (e.g., a remote UE index) associated with the remote UE 905. The remote UE 905 may generate a PC5 adaptation layer header based at least in part on the remote UE bearer identifier and the remote UE identifier. For example, the PC5 adaptation layer header may be similar to (or the same as) the PC5 adaptation layer header described above in connection with FIG. 8. The remote UE 905 may append the PC5 adaptation layer header to the PDCP PDU. The remote UE 905 may transfer the PDCP PDU (with the PC5 adaptation layer header) to lower layer(s) for transmission to the relay UE 910 over the appropriate PC5 RLC channel. A PDCP PDU with an adaptation layer header may be referred to herein as an adaptation layer PDU.

As shown by reference number 930, the relay UE 910 may receive the PDCP PDU (with the PC5 adaptation layer header) from the remote UE 905 via the PC5 RLC channel. The relay UE 910 may identify the remote UE bearer identifier and/or the remote UE identifier (e.g., remote UE index) based at least in part on the PC5 adaptation layer header. The relay UE 910 may generate a Uu adaptation layer header based at least in part on the PC5 adaptation layer header. For example, the relay UE 910 may use the fields in the PC5 adaptation layer header (e.g., without modification) to generate corresponding fields in the Uu adaptation layer header. In some aspects, the relay UE 910 may remove the PC5 adaptation layer header from the PDCP PDU and append the Uu adaptation layer header to the PDCP PDU.

As shown by reference number 935, the relay UE 910 may identify an appropriate Uu RLC channel to transmit the PDCP PDU (e.g., with the Uu adaptation layer header) on. For example, the relay UE 910 may use the bearer identifier information (e.g., the mapping of remote UE bearer identifiers to PC5 RLC channels and Uu RLC channels) to identify a Uu RLC channel associated with the remote UE bearer identifier that was included in the PC5 adaptation layer header. As shown by reference number 940, the relay UE 910 may transmit, to the network entity 915, the PDCP PDU (e.g., with the Uu adaptation layer header) on the appropriate Uu RLC channel.

As shown by reference number 945, the network entity 915 may receive the PDCP PDU (e.g., with the Uu adaptation layer header) on the appropriate Uu RLC channel. The network entity 915 may identify the remote UE bearer identifier and/or the remote UE identifier (e.g., remote UE index) based at least in part on the Uu adaptation layer header. The network entity 915 may identify a radio access radio bearer (e.g., an SRB and/or a DRB) associated with the remote UE bearer identifier (e.g., based at least in part on the mapping information for the remote UE bearer identifier described above). The network entity 915 may remove the Uu adaptation layer header from the PDCP PDU. The network entity 915 may transfer the PDCP PDU (e.g., an NR PDCP PDU) to an upper layer based at least in part on the identified radio access radio bearer associated with the PDCP PDU. As a result, an end-to-end relay connection can be formed that enables the remote UE 905 to transfer traffic to the network entity 915 via the appropriate end-to-end radio bearer via the relay UE 910.

As indicated above, FIG. 9 is provided as an example. Other examples may differ from what is described with respect to FIG. 9.

Figure 10:
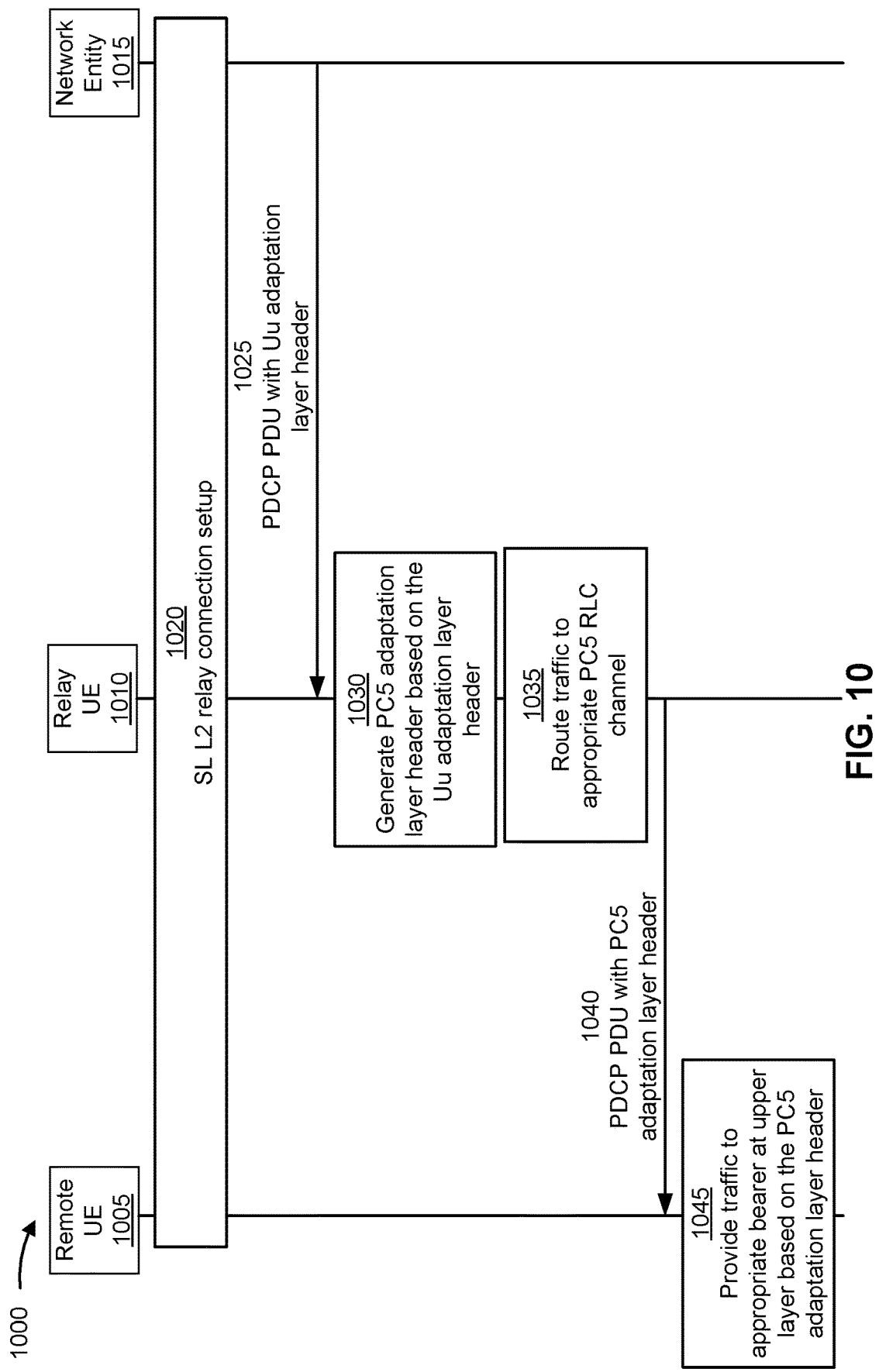
FIG. 10 is a diagram illustrating an example of downlink relay signaling, in accordance with various aspects of the present disclosure.

FIG. 10 is a diagram illustrating an example 1000 of downlink relay signaling, in accordance with various aspects of the present disclosure. As shown, example 1000 includes a remote UE 1005, a relay UE 1010, and a network entity 1015. The network entity 1015 may be a base station (e.g., base station 110), a gNB, and/or an NG-RAN, among other examples. As shown by reference number 1020, the remote UE 1005, the relay UE 1010, and/or the network entity 1015 may perform a relay connection setup (e.g., a sidelink layer 2 relay connection setup). The relay connection setup may be similar to, or the same as, example 700 described above in connection with FIG. 7.

As shown by reference number 1025, the network entity 1015 may obtain or identify traffic that is to be transmitted to the remote UE 1005 via the relay UE 1010. For example, the network entity 1015 may receive, from an upper layer, a PDCP PDU to be relayed to the remote UE 1005 via the relay UE 1010. The network entity 1015 may identify a radio access (e.g., Uu) radio bearer (e.g., an SRB identifier or a DRB identifier) associated with the PDCP PDU. The network entity 1015 may identify a remote UE bearer identifier associated with the radio access radio bearer (e.g., based at least in part on the mapping information for the remote UE bearer identifier described above). The network entity 1015 may identify a remote UE identifier (e.g., a remote UE index) associated with the remote UE 1005. The network entity 1015 may generate a Uu adaptation layer header based at least in part on the remote UE bearer identifier and the remote UE identifier. The network entity 1015 may append the Uu adaptation layer header to the PDCP PDU. The network entity 1015 may transfer the PDCP PDU (with the Uu adaptation layer header) to lower layer(s) for transmission to the relay UE 1010 over the appropriate Uu RLC channel.

As shown by reference number 1030, the relay UE 1010 may receive the PDCP PDU (with the Uu adaptation layer header) from the network entity 1015 via the Uu RLC channel. The relay UE 1010 may identify the remote UE bearer identifier and/or the remote UE identifier (e.g., remote UE index) based at least in part on the Uu adaptation layer header. The relay UE 1010 may generate a PC5 adaptation layer header based at least in part on the Uu adaptation layer header. For example, the relay UE 1010 may use the fields in the Uu adaptation layer header (e.g., without modification) to generate corresponding fields in the PC5 adaptation layer header. In some aspects, the relay UE 1010 may remove the Uu adaptation layer header from the PDCP PDU and append the PC5 adaptation layer header to the PDCP PDU.

As shown by reference number 1035, the relay UE 1010 may identify an appropriate PC5 RLC channel to transmit the PDCP PDU (e.g., with the PC5 adaptation layer header) on. For example, the relay UE 1010 may use the bearer identifier information (e.g., the mapping of remote UE bearer identifiers to PC5 RLC channels and Uu RLC channels) to identify a PC5 RLC channel associated with the remote UE bearer identifier that was included in the Uu adaptation layer header. As shown by reference number 1040, the relay UE 1010 may transmit, to the remote UE 1005, the PDCP PDU (e.g., with the PC5 adaptation layer header) on the appropriate PC5 RLC channel.

As shown by reference number 1045, the remote UE 1005 may receive the PDCP PDU (e.g., with the PC5 adaptation layer header) on the appropriate PC5 RLC channel. The remote UE 1005 may identify the remote UE bearer identifier and/or the remote UE identifier (e.g., remote UE index) based at least in part on the PC5 adaptation layer header. The remote UE 1005 may identify a radio access radio bearer (e.g., an SRB and/or a DRB) associated with the remote UE bearer identifier (e.g., based at least in part on the mapping information for the remote UE bearer identifier described above). The remote UE 1005 may remove the PC5 adaptation layer header from the PDCP PDU. The remote UE 1005 may transfer the PDCP PDU (e.g., an NR PDCP PDU) to an upper layer based at least in part on the identified radio access radio bearer associated with the PDCP PDU. As a result, an end-to-end relay connection can be formed that enables the network entity 1015 to transfer traffic to the remote UE 1005 via the appropriate end-to-end radio bearer via the relay UE 1010.

As indicated above, FIG. 10 is provided as an example. Other examples may differ from what is described with respect to FIG. 10.

Figure 11:
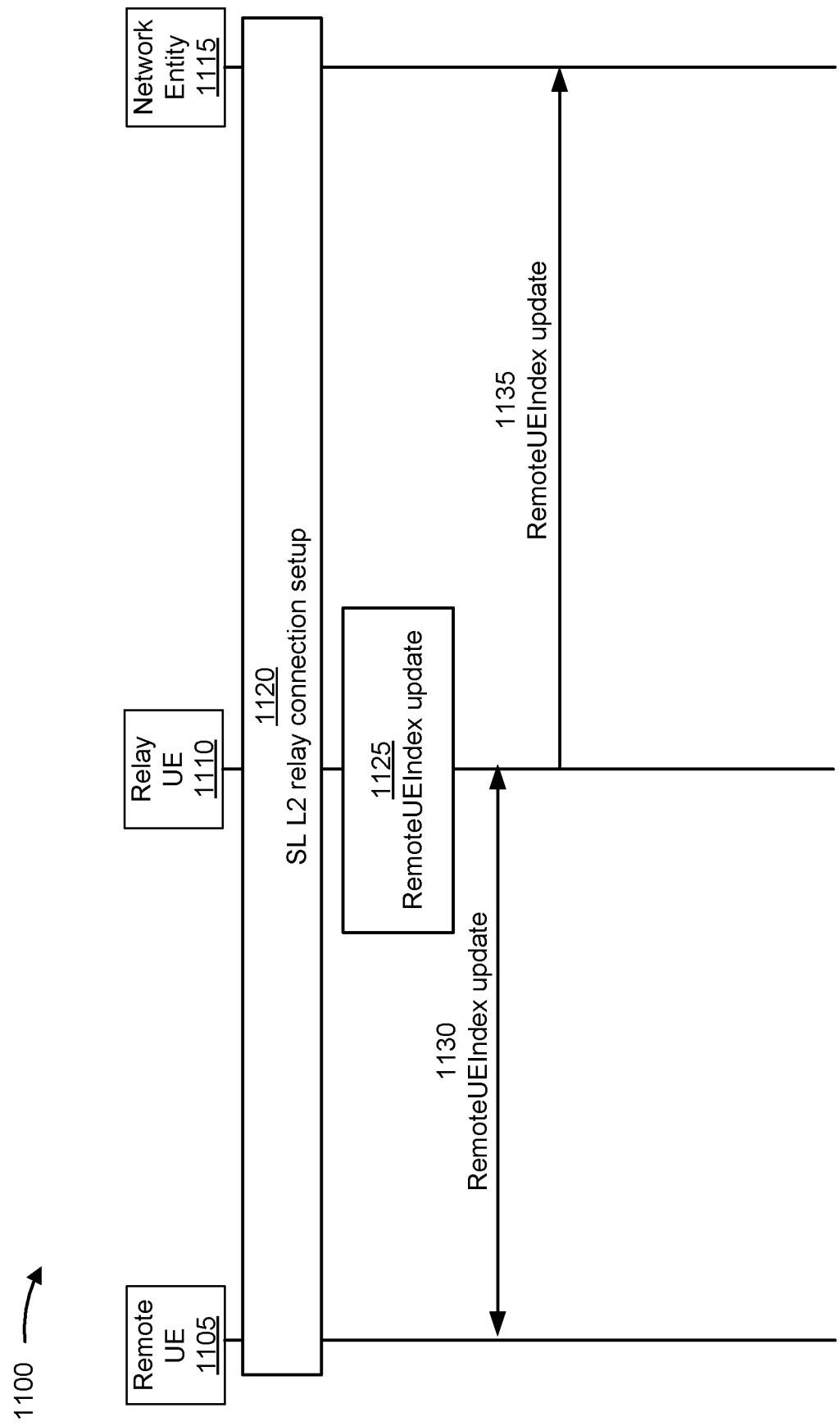
FIGS. 11-13 are diagrams illustrating examples of a privacy update procedure, in accordance with various aspects of the present disclosure.

FIG. 11 is a diagram illustrating an example 1100 of a privacy update procedure, in accordance with various aspects of the present disclosure. As shown, example 1100 includes a remote UE 1105, a relay UE 1110, and a network entity 1115. The network entity 1115 may be a base station (e.g., base station 110), a gNB, and/or an NG-RAN, among other examples. As shown by reference number 1120, the remote UE 1105, the relay UE 1110, and/or the network entity 1115 may perform a relay connection setup (e.g., a sidelink layer 2 relay connection setup). The relay connection setup may be similar to, or the same as, example 700 described above in connection with FIG. 7. The privacy update procedure depicted in FIG. 11 may be a remote UE identifier update initiated by the relay UE 1110. For example, if the relay UE 1110 assigns remote UE identifiers (e.g., as described above in connection with reference number 725 of FIG. 7), then the relay UE 1110 may update the remote UE identifiers for the remote UEs 1105 in communication with the relay UE 1110.

As shown by reference number 1125, the relay UE 1110 may initiate an update for a remote UE identifier of one or more remote UEs 1105 (e.g., a RemoteUEIndex update). In some aspects, the relay UE 1110 may initiate a RemoteUEIndex update periodically and/or randomly. For example, the relay UE 1110 may initiate a timer when the relay connection setup is completed and/or when a remote UE identifier is assigned to the remote UE 1105. The relay UE 1110 may initiate a RemoteUEIndex update based at least in part on an expiry of the timer. In some aspects, the relay UE 1110 may initiate a RemoteUEIndex update in order to satisfy a privacy or security requirement of a V2X wireless network (e.g., as defined, or otherwise fixed, by a wireless communication standard, such as a 3GPP Specification). In some aspects, the relay UE 1110 may initiate a RemoteUEIndex update based at least in part on detecting a trigger event. A trigger event may be an indication received from the network entity 1115 and/or from the remote UE 1105. In some aspects, a trigger event may be an indication to initiate a link identifier update (LIU) with the remote UE 1105. In some aspects, as described above, the relay UE 1110 may initiate a RemoteUEIndex update independently of a LIU trigger with the remote UE 1105. The RemoteUEIndex update may include the relay UE 1110 updating or modifying the remote UE identifier of the remote UE 1105 to an updated/modified remote UE identifier.

As shown by reference number 1130, the relay UE 1110 may transmit, to the remote UE 1105, an indication of the updated/modified remote UE identifier. In some aspects, the remote UE 1110 may transmit modified identifier information that indicates the updated/modified remote UE identifier. For example, the relay UE 1110 may transmit the updated/modified remote UE identifier to the remote UE 1105 via an RRC message. In some aspects, the relay UE 1110 may transmit the updated/modified remote UE identifier to the remote UE 1105 via a link modification request message. The remote UE 1105 may receive the indication of the updated/modified remote UE identifier and may update or modify the remote UE identifier for the remote UE to the updated/modified remote UE identifier (e.g., from a previous remote UE identifier). The remote UE 1105 may transmit, to the relay UE 1110, an indication that the remote UE identifier has been successfully completed at the remote UE 1105.

As shown by reference number 1135, the relay UE 1110 may transmit, to the network entity 1115, an indication of the updated/modified remote UE identifier for the remote UE 1105. In some aspects, the remote UE 1110 may transmit modified identifier information that indicates the updated/modified remote UE identifier for the remote UE 1105 (and/or one or more other remote UEs 1105). For example, the relay UE 1110 may transmit the indication of the updated/modified remote UE identifier for the remote UE 1105 in an RRC message, such as a sidelink UE information (SUI) message. The network entity 1115 may receive the indication of the updated/modified remote UE identifier for the remote UE 1105. The network entity 1115 may update or modify the remote UE identifier for the remote UE 1105 to the updated/modified remote UE identifier (e.g., from the previous remote UE identifier for the remote UE 1105).

The relay UE 1110 may update the remote UE identifier in the manner described above when the control-plane protocol architecture and/or the user-plane protocol architecture of the relay UE 1110 does not include a PC5 adaptation layer (e.g., control-plane protocol architecture 500 and/or the user-plane protocol architecture 600 described above). Alternatively, the relay UE 1110 may update the remote UE identifier in the manner described above when the control-plane protocol architecture and/or the user-plane protocol architecture of the relay UE 1110 does include a PC5 adaptation layer (e.g., control-plane protocol architecture 505 and/or the user-plane protocol architecture 505 described above).

In this way, the relay UE 1110 may update the remote UE identifier of the remote UE 1105 to ensure that a security or privacy requirement of the remote UE 1105 and/or of the V2X network is satisfied. The relay UE 1110 may communicate with the remote UE 1105 and/or the network entity 1115 to ensure that the remote UE identifier of the remote UE 1105 is successfully updated at each device in the relay path.

As indicated above, FIG. 11 is provided as an example. Other examples may differ from what is described with respect to FIG. 11.

Figure 12:
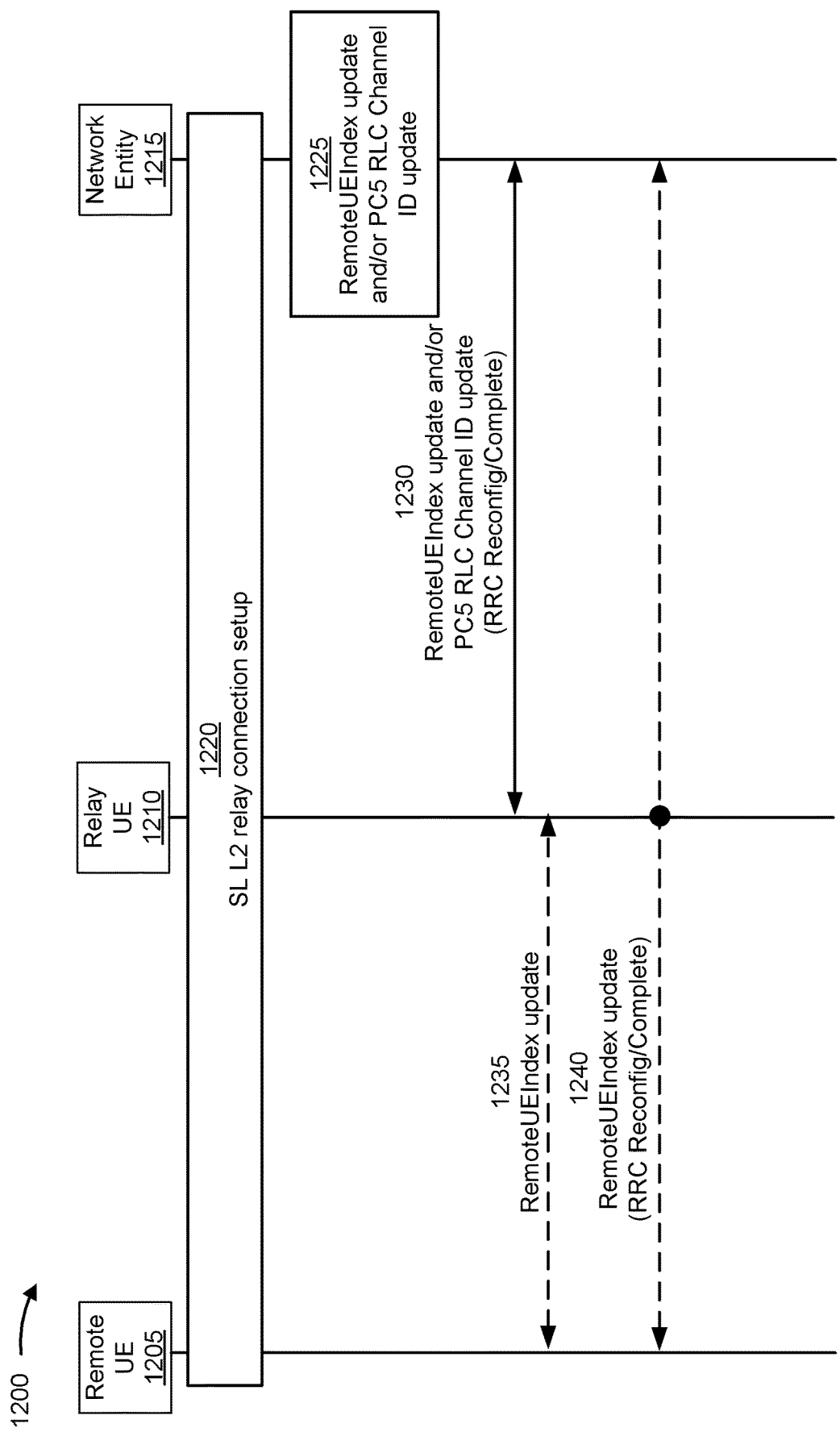

FIG. 12 is a diagram illustrating an example 1200 of a privacy update procedure, in accordance with various aspects of the present disclosure. As shown, example 1200 includes a remote UE 1205, a relay UE 1210, and a network entity 1215. The network entity 1215 may be a base station (e.g., base station 110), a gNB, and/or an NG-RAN, among other examples. As shown by reference number 1220, the remote UE 1205, the relay UE 1210, and/or the network entity 1215 may perform a relay connection setup (e.g., a sidelink layer 2 relay connection setup). The relay connection setup may be similar to, or the same as, example 700 described above in connection with FIG. 7. For example, the relay connection setup may include one or more (or all) of the steps described above in connection with FIG. 7. The privacy update procedure depicted in FIG. 12 may be a remote UE identifier update and/or a PC5 RLC channel identifier update initiated by the network entity 1215. For example, if the network entity 1215 assigns remote UE identifiers (e.g., as described above in connection with reference number 740 of FIG. 7), then the network entity 1215 may update the remote UE identifiers for the remote UEs 1205 in communication with the relay UE 1210.

In some aspects, such as where the control-plane protocol architecture and/or the user-plane protocol architecture of the relay UE 1210 does not include a PC5 adaptation layer (e.g., control-plane protocol architecture 500 and/or the user-plane protocol architecture 600 described above), the network entity 1215 may use a PC5 RLC channel identifier to identifier a radio access (e.g., Uu) radio bearer (e.g., an SRB or a DRB) associated with traffic. Therefore, the PC5 RLC channel identifier needs to be updated to satisfy a security or privacy requirement of the remote UE 1205 and/or of the V2X network.

As shown by reference number 1225, the network entity 1215 may initiate an update for a remote UE identifier of one or more remote UEs 1205 (e.g., a RemoteUEIndex update). In some aspects, the network entity 1215 may initiate a RemoteUEIndex update periodically and/or randomly. For example, the network entity 1215 may initiate a RemoteUEIndex update in a similar (or the same) manner as the privacy update procedure described above. The RemoteUEIndex update may include the network entity 1215 updating or modifying the remote UE identifier of the remote UE 1205 to an updated/modified remote UE identifier.

Similarly, the network entity 1215 may update a PC5 RLC channel identifier for a PC5 RLC channel between the remote UE 1205 and the relay UE 1210 at the same time as, or independently of, initiating the RemoteUEIndex update. The PC5 RLC channel identifier update may include the network entity 1215 updating or modifying the PC5 RLC channel identifier for a PC5 RLC channel between the remote UE 1205 and the relay UE 1210 to an updated/modified PC5 RLC channel identifier.

As shown by reference number 1230, the network entity 1215 may transmit, to the relay UE 1210, an indication of the updated/modified remote UE identifier and/or of the updated/modified PC5 RLC channel identifier. In some aspects, the network entity 1215 may transmit modified identifier information that indicates the updated/modified remote UE identifier and/or of the updated/modified PC5 RLC channel identifier. For example, the network entity 1215 may perform an RRC reconfiguration procedure with the relay UE 1210 to update or modify the remote UE identifier and/or the PC5 RLC channel identifier. The relay UE 1210 may update or modify the remote UE identifier for the remote UE 1205 to the updated/modified remote UE identifier (e.g., from a previous remote UE identifier). Similarly, the relay UE 1210 may update or modify the PC5 RLC channel identifier for the PC5 RLC channel between the remote UE 1205 and the relay UE 1210 to the updated/modified PC5 RLC channel identifier (e.g., from a previous PC5 RLC channel identifier). The relay UE 1210 may transmit, to the network entity 1215, an indication that the remote UE identifier and/or the PC5 RLC channel identifier have been successfully updated at the relay UE 1210 (e.g., in an RRC reconfiguration complete message). The relay UE 1210 may continue to support the previous remote UE identifier for the remote UE 1305 after receiving the indication of the updated/modified remote UE identifier. For example, the relay UE 1210 may relay communications in accordance with the previous remote UE identifier for the remote UE 1305 until the relay UE 1210 receives a communication (e.g., from the remote UE 1205 or the network entity 1215) that includes the updated/modified remote UE identifier in an adaptation layer header.

As shown by reference number 1235, in some aspects, the relay UE 1210 may communicate with the remote UE 1205 to update the remote UE identifier for the remote UE 1205. For example, after updating the remote UE identifier at the relay UE 1210, the relay UE 1210 may initiate a link modification with the relay UE 1210 to update the remote UE identifier for the remote UE 1205 at the remote UE 1205. For example, the relay UE 1210 may transmit, to the remote UE 1205, an indication of the updated/modified remote UE identifier. The remote UE 1205 may update or modify the remote UE identifier for the remote UE 1205 to the updated/modified remote UE identifier (e.g., from a previous remote UE identifier). The remote UE 1205 may transmit, to the relay UE 1210, an indication that the remote UE identifier has been successfully updated at the remote UE 1205 (e.g., in an RRC message). In some aspects, the relay UE 1210 may transmit the RRC reconfiguration complete message, to the network entity 1215, after receiving the indication that the remote UE identifier has been successfully updated at the remote UE 1205.

Alternatively, as shown by reference number 1240, the network entity 1215 may communicate with the remote UE 1205, via the relay UE 1210, to update the remote UE identifier for the remote UE 1205. In some aspects, the network entity 1215 may transmit modified identifier information that indicates the updated/modified remote UE identifier. For example, the network entity 1215 may perform an RRC reconfiguration procedure with the remote UE 1205 to update or modify the remote UE identifier at the remote UE 1205. The remote UE 1205 may update or modify the remote UE identifier for the remote UE 1205 to the updated/modified remote UE identifier (e.g., from a previous remote UE identifier). The remote UE 1205 may transmit, to the network entity 1215, an indication that the remote UE identifier and/or the PC5 RLC channel identifier have been successfully updated at the remote UE 1205 (e.g., in an RRC reconfiguration complete message).

The network entity 1215 may update the remote UE identifier in the manner described above when the control-plane protocol architecture and/or the user-plane protocol architecture of the relay UE 1210 does not include a PC5 adaptation layer (e.g., control-plane protocol architecture 500 and/or the user-plane protocol architecture 600 described above). Alternatively, the network entity 1215 may update the remote UE identifier in the manner described above when the control-plane protocol architecture and/or the user-plane protocol architecture of the relay UE 1210 does include a PC5 adaptation layer (e.g., control-plane protocol architecture 505 and/or the user-plane protocol architecture 505 described above).

In this way, the network entity 1215 may update the remote UE identifier of the remote UE 1205 to ensure that a security or privacy requirement of the remote UE 1205 and/or of the V2X network is satisfied. The network entity 1215 may communicate with the remote UE 1205 and/or the relay UE 1210 to ensure that the remote UE identifier of the remote UE 1205 is successfully updated at each device in the relay path.

As indicated above, FIG. 12 is provided as an example. Other examples may differ from what is described with respect to FIG. 12.

Figure 13:
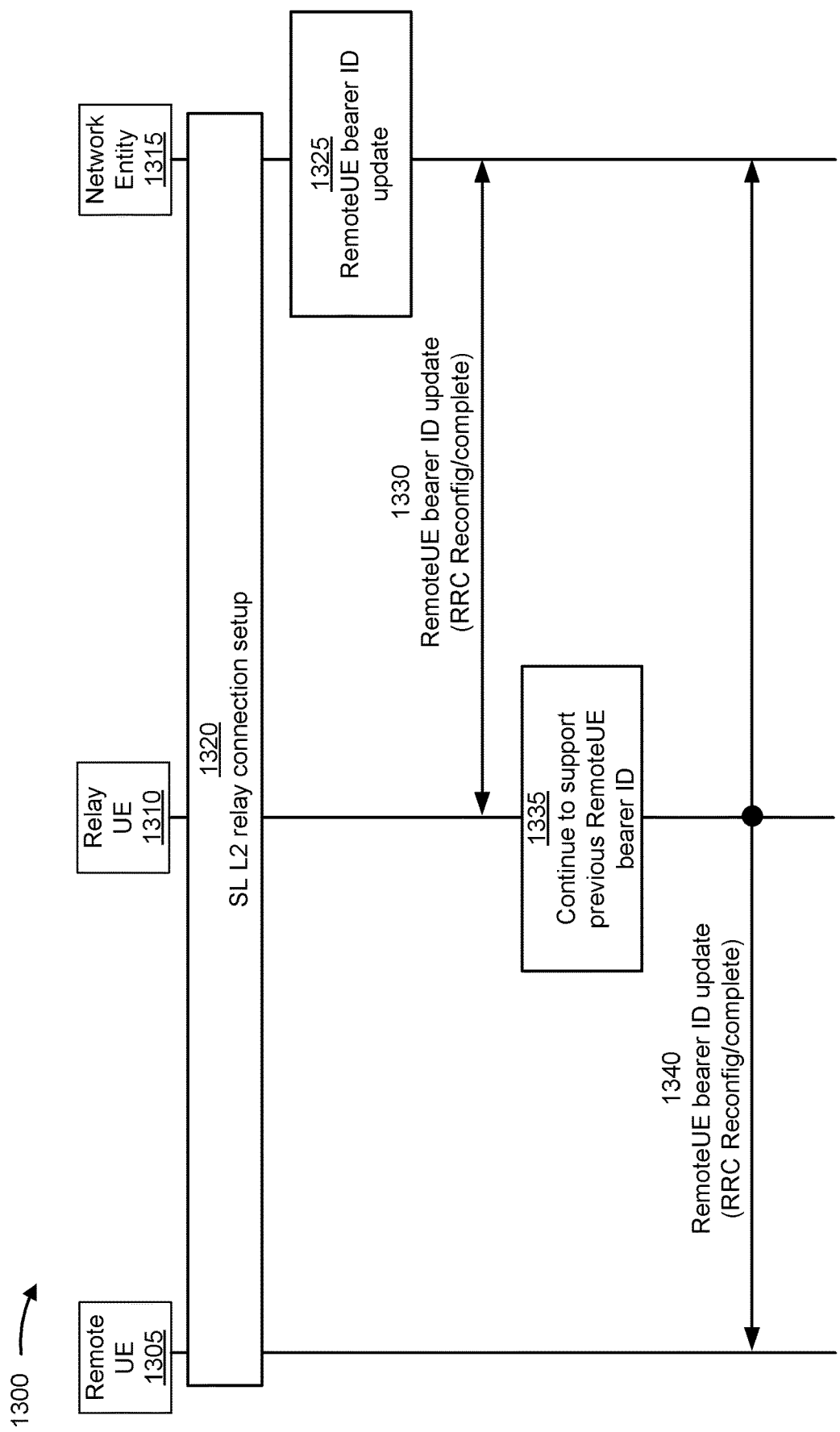

FIG. 13 is a diagram illustrating an example 1300 of a privacy update procedure, in accordance with various aspects of the present disclosure. As shown, example 1300 includes a remote UE 1305, a relay UE 1310, and a network entity 1315. The network entity 1315 may be a base station (e.g., base station 110), a gNB, and/or an NG-RAN, among other examples. The privacy update procedure depicted in FIG. 13 may be a remote UE bearer identifier update procedure initiated by the network entity 1315. As shown by reference number 1320, the remote UE 1305, the relay UE 1310, and/or the network entity 1315 may perform a relay connection setup (e.g., a sidelink layer 2 relay connection setup). The relay connection setup may be similar to, or the same as, example 700 described above in connection with FIG. 7.

As shown by reference number 1325, the network entity 1315 may initiate an update for a remote UE bearer identifier of one or more radio access (e.g., Uu) radio bearers of the remote UE 1305 (e.g., a RemoteUE bearer ID update). In some aspects, the network entity 1315 may initiate a RemoteUE bearer ID update periodically and/or randomly. For example, the network entity 1315 may initiate a RemoteUE bearer ID update in a similar (or the same) manner as the privacy update procedures described above.

The RemoteUE bearer ID update may include the network entity 1315 updating or modifying the remote UE bearer identifier of a DRB or SRB of the remote UE 1305 to an updated/modified remote UE bearer identifier (e.g., a new C-RNTI for the DRB/SRB or a new temporary identifier). In some aspects, the network entity 1315 may perform the RemoteUE bearer ID update at the same time as a remote UE identifier for the remote UE 1305 is updated (e.g., as described above in connection with FIGS. 11 and/or 12). In some aspects, the network entity 1315 may perform the RemoteUE bearer ID update independently from the remote UE identifier update for the remote UE 1305.

As shown by reference number 1330, the network entity 1315 may transmit, to the relay UE 1310, an indication of the updated/modified remote UE bearer identifier. In some aspects, the network entity 1315 may transmit modified identifier information that indicates the updated/modified remote UE identifier and/or of the updated/modified remote UE bearer identifier. For example, the network entity 1315 may perform an RRC reconfiguration procedure with the relay UE 1310 to update or modify the remote UE bearer identifier. The relay UE 1310 may update or modify the remote UE bearer identifier for the radio bearer of the remote UE 1305 (e.g., from a previous remote UE bearer identifier). The relay UE 1310 may transmit, to the network entity 1315, an indication that the remote UE bearer identifier has been successfully updated at the relay UE 1310 (e.g., in an RRC reconfiguration complete message).

As shown by reference number 1335, the relay UE 1310 may continue to support the previous remote UE bearer identifier for the radio bearer of the remote UE 1305 after receiving the indication of the updated/modified remote UE bearer identifier. For example, the relay UE 1310 may continue to support the previous remote UE bearer identifier for the radio bearer of the remote UE 1305 to enable the remote UE bearer identifier for the radio bearer to be updated at the remote UE 1305. For example, the relay UE 1310 may transmit traffic to the relay UE 1310 after the relay UE 1310 has received the indication of the updated/modified remote UE bearer identifier, but before the remote UE bearer identifier for the radio bearer has been updated at the remote UE 1305 (e.g., as described below). Therefore, the traffic may include (e.g., in a PC5 adaptation layer header) an indication of the previous remote UE bearer identifier for the radio bearer. The relay UE 1310 may route the traffic according to the mapping information for the previous remote UE bearer identifier for the radio bearer (e.g., to a correct Uu RLC channel) to ensure that the traffic is successfully relayed to the network entity 1315. This may ensure that traffic is not dropped or lost in a scenario where the relay UE 1310 has been updated with the updated/modified remote UE bearer identifier, but the remote UE 1305 has not been updated with the updated/modified remote UE bearer identifier. The relay UE 1310 may continue to support the previous remote UE bearer identifier for the radio bearer of the remote UE 1305 until the relay UE 1310 receives traffic from the remote UE 1305 (or the network entity 1315) that includes (e.g., in an adaptation layer header) an indication of the updated/modified remote UE bearer identifier.

As shown by reference number 1340, the network entity 1315 may communicate with the remote UE 1305, via the relay UE 1310, to update the remote UE bearer identifier for radio bearer of the remote UE 1305. In some aspects, the network entity 1315 may transmit modified identifier information that indicates the updated/modified remote UE identifier and/or of the updated/modified remote UE bearer identifier. For example, the network entity 1315 may perform an RRC reconfiguration procedure with the remote UE 1305 to update or modify the remote UE bearer identifier at the remote UE 1305. The remote UE 1305 may update or modify the remote UE bearer identifier for the radio bearer to the updated/modified remote UE bearer identifier (e.g., from the previous remote UE bearer identifier). The remote UE 1305 may transmit, to the network entity 1315, an indication that the remote UE bearer identifier has been successfully updated at the remote UE 1305 (e.g., in an RRC reconfiguration complete message).

In this way, the network entity 1315 may update the remote UE bearer identifier of radio bearers of the remote UE 1305 to ensure that a security or privacy requirement of the remote UE 1305 and/or of the V2X network is satisfied. The network entity 1315 may communicate with the remote UE 1305 and/or the relay UE 1310 to ensure that the remote UE bearer identifier is successfully updated at each device in the relay path.

As indicated above, FIG. 13 is provided as an example. Other examples may differ from what is described with respect to FIG. 13.

Figure 14:
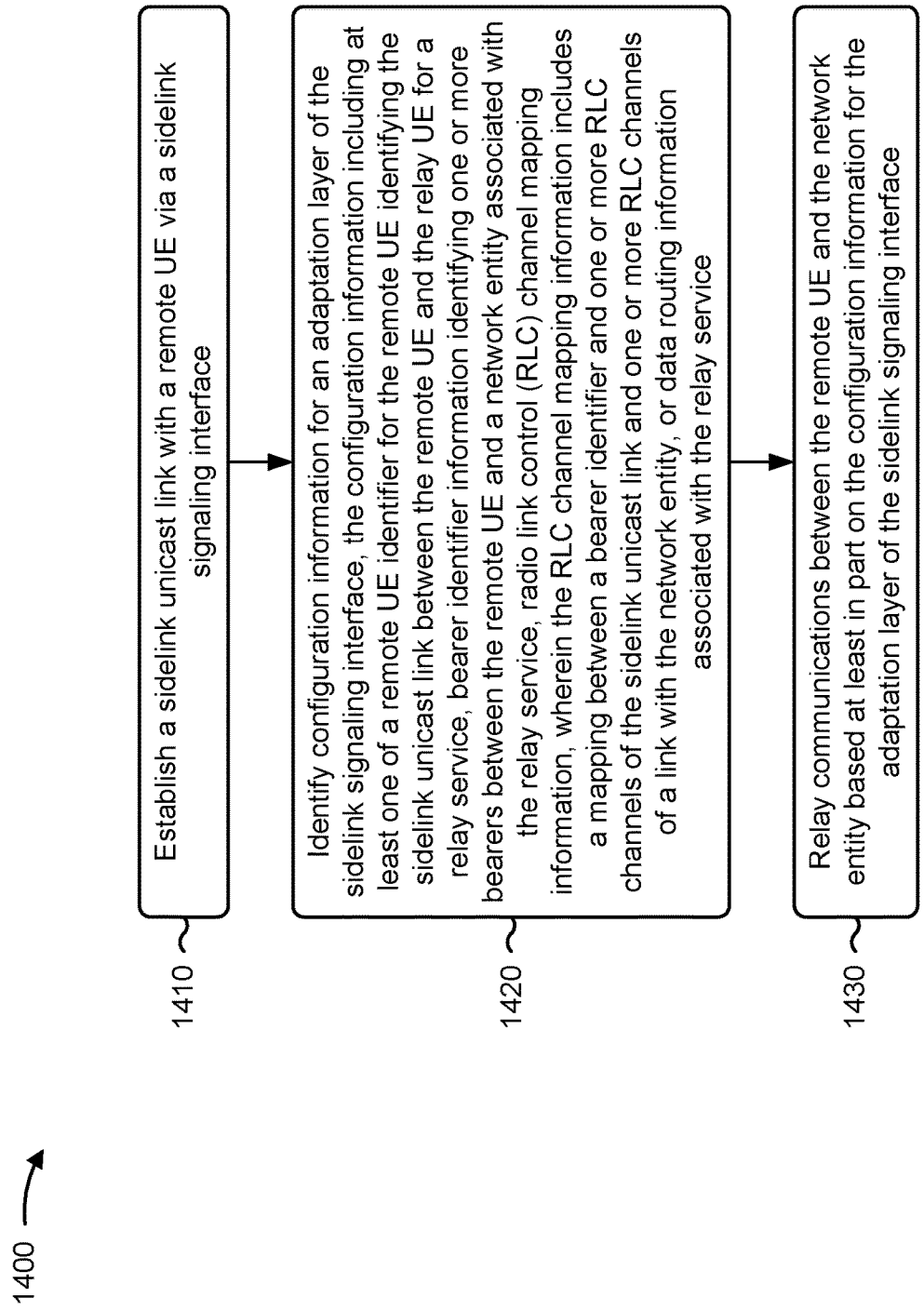
FIGS. 14-16 are diagrams illustrating example processes associated with a relay adaptation layer configuration for a sidelink interface, in accordance with various aspects of the present disclosure.

FIG. 14 is a diagram illustrating an example process 1400 performed, for example, by a relay UE, in accordance with various aspects of the present disclosure. Example process 1400 is an example where the relay UE (e.g., UE 120, relay UE 710, relay UE 910, relay UE 1010, relay UE 1110, relay UE 1210, and/or relay UE 1310) performs operations associated with a relay adaptation layer configuration for a sidelink interface.

As shown in FIG. 14, in some aspects, process 1400 may include establishing a sidelink unicast link with a remote UE via a sidelink signaling interface (block 1410). For example, the relay UE (e.g., using reception component 1702 and/or transmission component 1704, depicted in FIG. 17) may establish a sidelink unicast link with a remote UE via a sidelink signaling interface, as described above.

As further shown in FIG. 14, in some aspects, process 1400 may include identifying configuration information for an adaptation layer of the sidelink signaling interface, the configuration information including at least one of: a remote UE identifier for the remote UE identifying the sidelink unicast link between the remote UE and the relay UE for a relay service, bearer identifier information identifying one or more bearers between the remote UE and a network entity associated with the relay service, RLC channel mapping information, wherein the RLC channel mapping information includes a mapping between a bearer identifier and one or more RLC channels of the sidelink unicast link and one or more RLC channels of a link with the network entity, or data routing information associated with the relay service (block 1420). For example, the relay UE (e.g., using reception component 1702 and/or determination component 1708, depicted in FIG. 17) may identify configuration information for an adaptation layer of the sidelink signaling interface, the configuration information including at least one of: a remote UE identifier for the remote UE identifying the sidelink unicast link between the remote UE and the relay UE for a relay service, bearer identifier information identifying one or more bearers between the remote UE and a network entity associated with the relay service, RLC channel mapping information, wherein the RLC channel mapping information includes a mapping between a bearer identifier and one or more RLC channels of the sidelink unicast link and one or more RLC channels of a link with the network entity, or data routing information associated with the relay service, as described above.

As further shown in FIG. 14, in some aspects, process 1400 may include relaying communications between the remote UE and the network entity based at least in part on the configuration information for the adaptation layer of the sidelink signaling interface (block 1430). For example, the relay UE (e.g., using reception component 1702 and/or transmission component 1704, depicted in FIG. 17) may relay communications between the remote UE and the network entity based at least in part on the configuration information for the adaptation layer of the sidelink signaling interface, as described above.

Process 1400 may include additional aspects, such as any single aspect or any combination of aspects described below and/or in connection with one or more other processes described elsewhere herein.

In a first aspect, the sidelink signaling interface is a PC5 interface and the link with the network entity is via a Uu interface.

In a second aspect, alone or in combination with the first aspect, relaying communications between the remote UE and the network entity is based at least in part on a sidelink signaling interface adaptation layer header, wherein the sidelink signaling interface adaptation layer header indicates at least one of the remote UE identifier of the remote UE, a bearer identifier of a bearer between the remote UE and a network entity associated with the relay service, or a path identifier for the data routing associated with the relay service.

In a third aspect, alone or in combination with one or more of the first and second aspects, the remote UE identifier corresponds to a unique index assigned to each remote UE, of a plurality of remote UEs, in communication with the relay UE via respective sidelink unicast links.

In a fourth aspect, alone or in combination with one or more of the first through third aspects, process 1400 includes assigning remote UE identifiers to each remote UE, of a plurality of remote UEs, in communication with the relay UE.

In a fifth aspect, alone or in combination with one or more of the first through fourth aspects, establishing the sidelink unicast link with the remote UE comprises assigning the remote UE identifier to the remote UE including a unique index associated with the sidelink unicast link, and transmitting, to the remote UE, an indication of the remote UE identifier via a sidelink signaling interface message.

In a sixth aspect, alone or in combination with one or more of the first through fifth aspects, process 1400 includes assigning a unique index associated with the sidelink unicast link, and transmitting information indicating the unique index to the network entity via a radio resource control message.

In a seventh aspect, alone or in combination with one or more of the first through sixth aspects, identifying the configuration information comprises receiving, from the network entity, a relaying configuration indicating at least part of the configuration information.

In an eighth aspect, alone or in combination with one or more of the first through third aspects, identifying the configuration information comprises receiving, from the network entity, an indication of the remote UE identifier via a radio resource control message.

In a ninth aspect, alone or in combination with the eighth aspect, receiving, from the network entity, the indication of the remote UE identifier comprises receiving, from the network entity, an indication of remote UE identifiers for each remote UE, of a plurality of remote UEs, in communication with the relay UE.

In a tenth aspect, alone or in combination with one or more of the eighth through ninth aspects, receiving, from the network entity, the indication of the remote UE identifier comprises receiving, from the network entity, an indication of a C-RNTI for each remote UE, of a plurality of remote UEs, in communication with the relay UE.

In an eleventh aspect, alone or in combination with one or more of the eighth through ninth aspects, receiving, from the network entity, the indication of the remote UE identifier comprises receiving, from the network entity, an indication of a temporary identifier for each remote UE, of a plurality of remote UEs, in communication with the relay UE, wherein the temporary identifier is unique among the plurality of remote UEs in communication with the relay UE.

In a twelfth aspect, alone or in combination with one or more of the first through eleventh aspects, identifying the configuration information comprises receiving, from the network entity, the bearer identifier information including an indication of a bearer identifier identifying a bearer between the remote UE and the network entity associated with the relay service, wherein the bearer identifier is the same as a DRB identifier of a DRB between the remote UE and the network entity or the same as an SRB identifier of an SRB between the remote UE and the network entity.

In a thirteenth aspect, alone or in combination with one or more of the first through eleventh aspects, identifying the configuration information comprises receiving, from the network entity, the bearer identifier information including an indication of a bearer identifier identifying a bearer between the remote UE and the network entity associated with the relay service, wherein the bearer identifier is a unique identifier associated with the bearer between the remote UE and the network entity to be used with the relay service.

In a fourteenth aspect, alone or in combination with one or more of the first through thirteenth aspects, identifying the configuration information comprises receiving, from the network entity, an indication of a default bearer identifier identifying an SRB associated with radio resource control messages.

In a fifteenth aspect, alone or in combination with the fourteenth aspect, process 1400 includes receiving, from the remote UE via the sidelink unicast link, a radio resource control setup request message, wherein the radio resource control setup request message includes the default bearer identifier, determining that the radio resource control setup request message is to be transmitted using the SRB associated with radio resource control messages based at least in part on the default bearer identifier, and relaying the radio resource control setup request message to the network entity via an RLC channel for the SRB associated with radio resource control messages.

In a sixteenth aspect, alone or in combination with the fifteenth aspect, process 1400 includes receiving, from the network entity, a relaying configuration via a radio resource control message indicating the bearer identifier based at least in part on relaying the radio resource control setup request message to the network entity, and relaying the radio resource control message indicating the bearer identifier to the remote UE based at least in part on the relaying configuration.

In a seventeenth aspect, alone or in combination with one or more of the first through sixteenth aspects, relaying communications between the remote UE and the network entity comprises receiving, from the remote UE via the sidelink unicast link, a PDCP PDU that includes an adaptation layer header that indicates at least one of the remote UE identifier associated with the remote UE, or a bearer identifier, identifying an RLC channel of the link with the network entity based at least in part on the RLC channel mapping information and the bearer identifier, generating a Uu PDCP PDU for the link with the network entity that includes an adaptation layer header that indicates at least one of the remote UE identifier associated with the remote UE, or the bearer identifier, and transmitting, to the network entity via the RLC channel, the Uu PDCP PDU for the link with the network entity that includes the adaptation layer header.

In an eighteenth aspect, alone or in combination with one or more of the first through seventeenth aspects, relaying communications between the remote UE and the network entity comprises receiving, from the network entity, a Uu PDCP PDU that includes an adaptation layer header that indicates at least one of the remote UE identifier associated with the remote UE, or a bearer identifier, identifying an RLC channel of the sidelink unicast link based at least in part on the RLC channel mapping information and the bearer identifier, generating a PDCP PDU for the sidelink unicast link that includes an adaptation layer header that indicates at least one of: the remote UE identifier associated with the remote UE, or the bearer identifier, and transmitting, to the remote UE via the RLC channel, the PDCP PDU for the sidelink unicast link that includes the adaptation layer header.

In a nineteenth aspect, alone or in combination with one or more of the first through eighteenth aspects, process 1400 includes performing a privacy update procedure with at least one of the remote UE or the network entity, wherein the privacy update procedure includes updating information included in configuration information.

In a twentieth aspect, alone or in combination with the nineteenth aspect, performing the privacy update procedure comprises performing the privacy update procedure according to a periodic schedule.

In a twenty-first aspect, alone or in combination with one or more of the nineteenth through twentieth aspects, performing the privacy update procedure comprises detecting a trigger event associated with a privacy update, and performing the privacy update procedure based at least in part on detecting the trigger event.

In a twenty-second aspect, alone or in combination with one or more of the nineteenth through twenty-first aspects, performing the privacy update procedure comprises modifying the remote UE identifier for the remote UE to a modified remote UE identifier, communicating, with the remote UE via the sidelink unicast link, to indicate the modified remote UE identifier, and communicating, with the network entity, to indicate the modified remote UE identifier.

In a twenty-third aspect, alone or in combination with one or more of the nineteenth through twenty-second aspects, performing the privacy update procedure comprises receiving, from the network entity, an indication of modified identifier information for at least one of the adaptation layer of the sidelink signaling interface or the adaption layer of the link with the network entity, modifying the configuration information based at least in part on the modified identifier information, communicating, with the remote UE via the sidelink unicast link, to indicate the modified identifier information, and communicating, with the network entity, to indicate that the configuration information for the sidelink signaling interface has been modified at the relay UE and the remote UE based at least in part on communicating with the remote UE to indicate the modified identifier information.

In a twenty-fourth aspect, alone or in combination with the twenty-third aspect, process 1400 includes receiving, from the remote UE, a signal that includes a previous identifier, that is modified by the modified identifier information to a modified identifier, in an adaptation layer header of the signal after receiving the indication of the modified identifier information and prior to receiving a signal that includes an indication of the modified identifier, and relaying, to the network entity via an RLC channel, the signal based at least in part on the previous identifier.

In a twenty-fifth aspect, alone or in combination with one or more of the twenty-third through twenty-fourth aspects, process 1400 includes receiving, from the remote UE or the network entity, a signal that includes an indication of a modified identifier, indicated in the modified identifier information, in an adaptation layer header of the signal, and refraining from relaying communications using a previous identifier based at least in part on receiving the signal that includes the indication of the modified identifier in the adaptation layer header of the signal.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
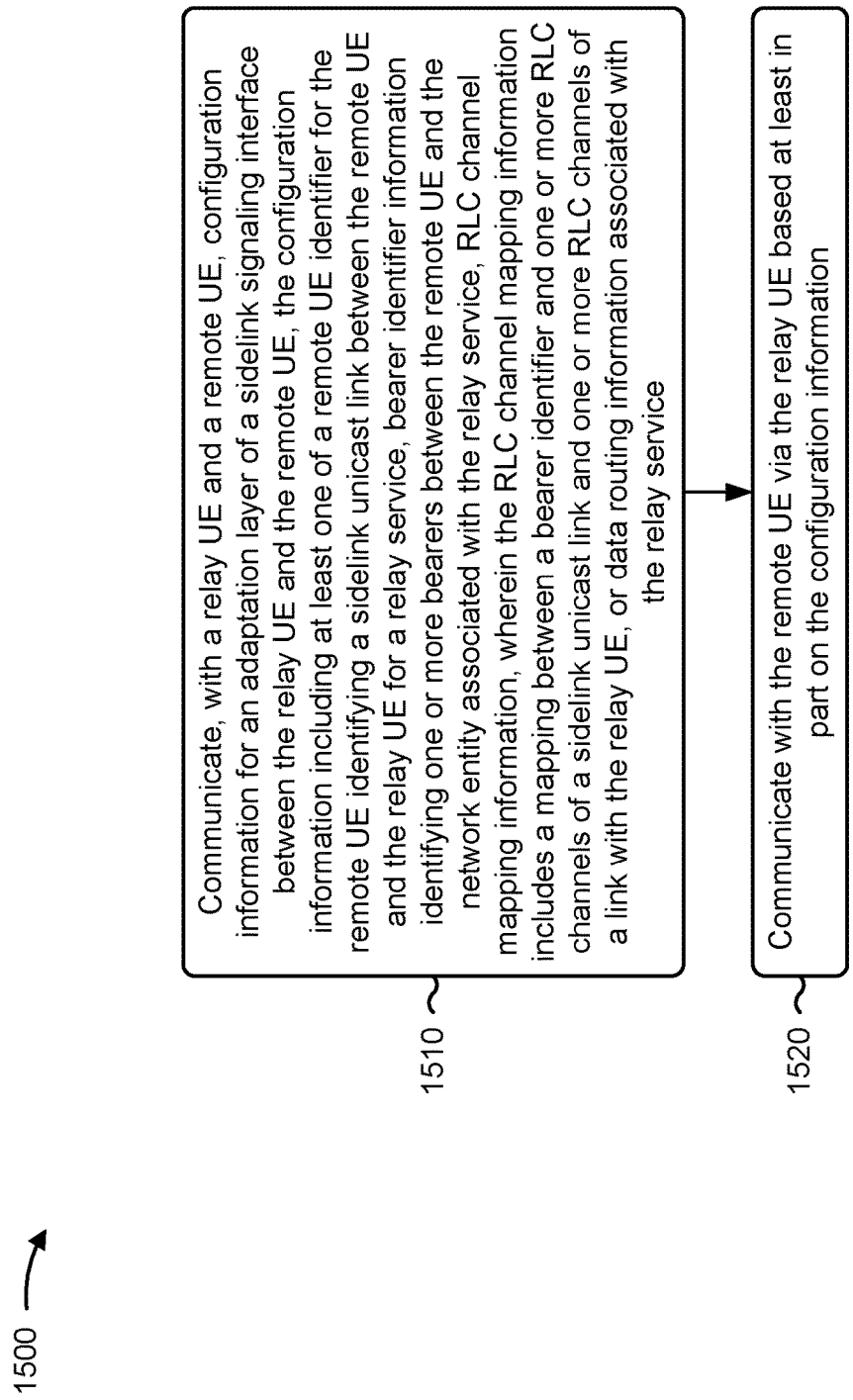

FIG. 15 is a diagram illustrating an example process 1500 performed, for example, by a network entity, in accordance with various aspects of the present disclosure. Example process 1500 is an example where the network entity (e.g., a base station 110 or another network entity described herein) performs operations associated with a relay adaptation layer configuration for a sidelink interface.

As shown in FIG. 15, in some aspects, process 1500 may include communicating, with a relay UE and a remote UE, configuration information for an adaptation layer of a sidelink signaling interface between the relay UE and the remote UE, the configuration information including at least one of: a remote UE identifier for the remote UE identifying a sidelink unicast link between the remote UE and the relay UE for a relay service, bearer identifier information identifying one or more bearers between the remote UE and the network entity associated with the relay service, RLC channel mapping information, wherein the RLC channel mapping information includes a mapping between a bearer identifier and one or more RLC channels of a sidelink unicast link and one or more RLC channels of a link with the relay UE, or data routing information associated with the relay service (block 1510). For example, the network entity (e.g., using reception component 1802 and/or transmission component 1804, depicted in FIG. 18) may communicate, with a relay UE and a remote UE, configuration information for an adaptation layer of a sidelink signaling interface between the relay UE and the remote UE, the configuration information including at least one of: a remote UE identifier for the remote UE identifying a sidelink unicast link between the remote UE and the relay UE for a relay service, bearer identifier information identifying one or more bearers between the remote UE and the network entity associated with the relay service, RLC channel mapping information, wherein the RLC channel mapping information includes a mapping between a bearer identifier and one or more RLC channels of a sidelink unicast link and one or more RLC channels of a link with the relay UE, or data routing information associated with the relay service, as described above.

As further shown in FIG. 15, in some aspects, process 1500 may include communicating with the remote UE via the relay UE based at least in part on the configuration information (block 1520). For example, the network entity (e.g., using reception component 1802 and/or transmission component 1804, depicted in FIG. 18) may communicate with the remote UE via the relay UE based at least in part on the configuration information, as described above.

Process 1500 may include additional aspects, such as any single aspect or any combination of aspects described below and/or in connection with one or more other processes described elsewhere herein.

In a first aspect, the sidelink signaling interface is a PC5 interface and the link with the relay UE is via a Uu interface.

In a second aspect, alone or in combination with the first aspect, the remote UE identifier corresponds to a unique index assigned to each remote UE, of a plurality of remote UEs, in communication with the relay UE via respective sidelink unicast links.

In a third aspect, alone or in combination with one or more of the first and second aspects, communicating the configuration information comprises receiving, from the relay UE, an indication of remote UE identifiers for each remote UE, of a plurality of remote UEs, in communication with the relay UE via a radio resource control message.

In a fourth aspect, alone or in combination with one or more of the first and second aspects, process 1500 includes assigning remote UE identifiers to each remote UE, of a plurality of remote UEs, in communication with the relay UE.

In a fifth aspect, alone or in combination with the fourth aspect, assigning remote UE identifiers to each remote UE, of the plurality of remote UEs, in communication with the relay UE comprises assigning, for a remote UE of the plurality of remote UEs, the remote UE identifier as a C-RNTI identifying a sidelink unicast link between the remote UE and the relay UE.

In a sixth aspect, alone or in combination with the fourth aspect, assigning remote UE identifiers to each remote UE, of the plurality of remote UEs, in communication with the relay UE comprises assigning, for a remote UE of the plurality of remote UEs, a temporary identifier for the remote UE, wherein the temporary identifier is unique among the plurality of remote UEs in communication with the relay UE.

In a seventh aspect, alone or in combination with one or more of the fourth through sixth aspects, process 1500 includes transmitting, to the remote UE via the relay UE, an indication of the remote UE identifier for the remote UE via a radio resource control message.

In an eighth aspect, alone or in combination with one or more of the fourth through seventh aspects, communicating the configuration information comprises transmitting, to the relay UE, a relaying configuration via a radio resource control message, wherein the relaying configuration indicates the remote UE identifiers for each remote UE, of the plurality of remote UEs, in communication with the relay UE.

In a ninth aspect, alone or in combination with one or more of the first through eighth aspects, process 1500 includes assigning a bearer identifier for each bearer of the one or more bearers between the remote UE and a network entity associated with the relay service.

In a tenth aspect, alone or in combination with the ninth aspect, a bearer identifier for a bearer, of the one or more bearers, is same as a DRB identifier of a DRB between the remote UE and the network entity or the same as an SRB identifier of an SRB between the remote UE and the network entity.

In an eleventh aspect, alone or in combination with the ninth aspect, a bearer identifier for a bearer, of the one or more bearers, is a unique identifier associated with the bearer between the remote UE and the network entity to be used with the relay service.

In a twelfth aspect, alone or in combination with one or more of the ninth through eleventh aspects, process 1500 includes transmitting, to the remote UE via the relay UE, the bearer identifier information via a radio resource control message, wherein the bearer identifier information indicates the bearer identifier for each bearer of the one or more bearers between the remote UE and a network entity associated with the relay service, and for each bearer identifier, an indication of a DRB or an SRB associated with the bearer identifier.

In a thirteenth aspect, alone or in combination with one or more of the ninth through twelfth aspects, communicating the configuration information comprises transmitting, to the relay UE, the bearer identifier information via a radio resource control message, wherein the bearer identifier information indicates the bearer identifier for each bearer of the one or more bearers between the remote UE and a network entity associated with the relay service, and for each bearer identifier, an indication of a DRB or an SRB associated with the bearer identifier.

In a fourteenth aspect, alone or in combination with one or more of the first through thirteenth aspects, communicating the configuration information comprises transmitting, to the relay UE and the remote UE via the relay UE, an indication of a default bearer identifier identifying an SRB associated with radio resource control messages.

In a fifteenth aspect, alone or in combination with the fourteenth aspect, the SRB associated with radio resource control messages is SRB0.

In a sixteenth aspect, alone or in combination with one or more of the first through fifteenth aspects, communicating with the remote UE via the relay UE comprises receiving, from the relay UE, an adaptation layer PDU, determining an SRB or a DRB associated with the remote UE based at least in part on a header of the adaptation layer PDU, removing the header of the adaptation layer PDU, and transferring a New Radio PDCP PDU of the adaptation layer PDU to an upper layer.

In a seventeenth aspect, alone or in combination with one or more of the first through sixteenth aspects, communicating with the remote UE via the relay UE comprises determining the remote UE identifier of the remote UE associated with a sidelink unicast link for the remote UE, determining a bearer identifier of the remote UE corresponding to a radio access bearer of the remote UE, determining a radio access RLC channel between the relay UE and the network entity corresponding to the bearer identifier, generating an adaptation layer header including at least one of the remote UE identifier, the bearer identifier, or a path identifier, and transmitting, to the relay UE, an adaptation layer PDU with the adaptation layer header on the radio access RLC channel between the relay UE and the network entity.

In an eighteenth aspect, alone or in combination with one or more of the first through seventeenth aspects, process 1500 includes performing a privacy update procedure with at least one of the remote UE or the relay UE, wherein the privacy update procedure includes updating information included in configuration information.

In a nineteenth aspect, alone or in combination with the eighteenth aspect, performing the privacy update procedure comprises performing the privacy update procedure according to a periodic schedule.

In a twentieth aspect, alone or in combination with one or more of the eighteenth through nineteenth aspects, performing the privacy update procedure comprises detecting a trigger event associated with a privacy update, and performing the privacy update procedure based at least in part on detecting the trigger event.

In a twenty-first aspect, alone or in combination with one or more of the eighteenth through twentieth aspects, performing the privacy update procedure comprises modifying one or more identifiers for an adaption layer header for the relay service, communicating, with the remote UE via the relay UE, to indicate modified identifier information that indicates the one or more modified identifiers, and communicating, with the relay UE, to indicate the modified identifier information that indicates the one or more modified identifiers.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
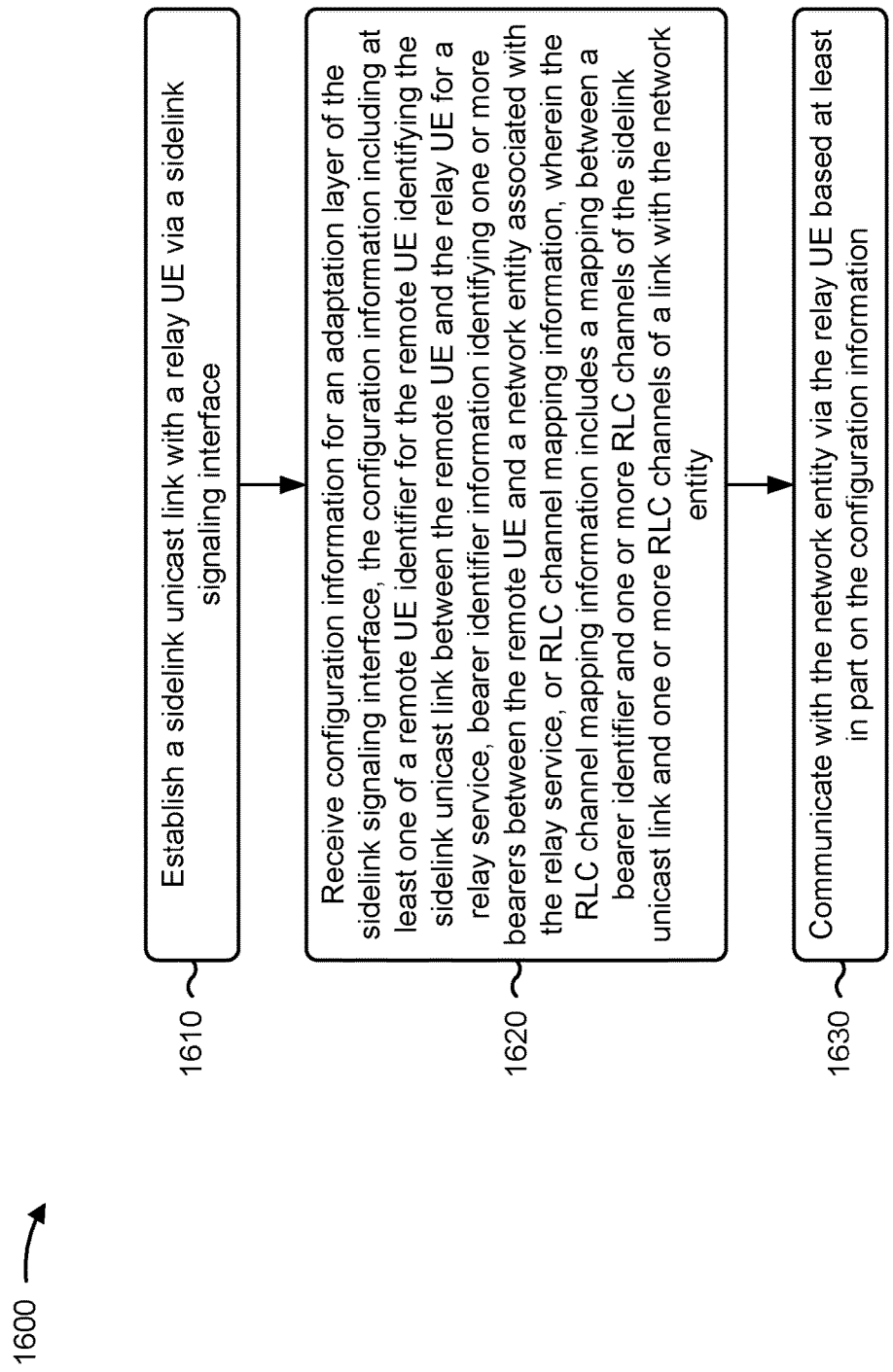

FIG. 16 is a diagram illustrating an example process 1600 performed, for example, by a remote UE, in accordance with various aspects of the present disclosure. Example process 1600 is an example where the remote UE (e.g., UE 120) performs operations associated with a relay adaptation layer configuration for a sidelink interface.

As shown in FIG. 16, in some aspects, process 1600 may include establishing a sidelink unicast link with a relay UE via a sidelink signaling interface (block 1610). For example, the remote UE (e.g., using reception component 1902 and/or transmission component 1904, depicted in FIG. 19) may establish a sidelink unicast link with a relay UE via a sidelink signaling interface, as described above.

As further shown in FIG. 16, in some aspects, process 1600 may include receiving configuration information for an adaptation layer of the sidelink signaling interface, the configuration information including at least one of: a remote UE identifier for the remote UE identifying the sidelink unicast link between the remote UE and the relay UE for a relay service, bearer identifier information identifying one or more bearers between the remote UE and a network entity associated with the relay service, or RLC channel mapping information, wherein the RLC channel mapping information includes a mapping between a bearer identifier and one or more RLC channels of the sidelink unicast link and one or more RLC channels of a link with the network entity (block 1620). For example, the remote UE (e.g., using reception component 1902, depicted in FIG. 19) may receive configuration information for an adaptation layer of the sidelink signaling interface, the configuration information including at least one of a remote UE identifier for the remote UE identifying the sidelink unicast link between the remote UE and the relay UE for a relay service, bearer identifier information identifying one or more bearers between the remote UE and a network entity associated with the relay service, or RLC channel mapping information, wherein the RLC channel mapping information includes a mapping between a bearer identifier and one or more RLC channels of the sidelink unicast link and one or more RLC channels of a link with the network entity, as described above.

As further shown in FIG. 16, in some aspects, process 1600 may include communicating with the network entity via the relay UE based at least in part on the configuration information (block 1630). For example, the remote UE (e.g., using reception component 1902 and/or transmission component 1904, depicted in FIG. 19) may communicate with the network entity via the relay UE based at least in part on the configuration information, as described above.

Process 1600 may include additional aspects, such as any single aspect or any combination of aspects described below and/or in connection with one or more other processes described elsewhere herein.

In a first aspect, the sidelink signaling interface is a PC5 interface and the link with the network entity is via a Uu interface.

In a second aspect, alone or in combination with the first aspect, the remote UE identifier corresponds to a unique index assigned to the remote UE.

In a third aspect, alone or in combination with one or more of the first and second aspects, receiving the configuration information comprises receiving, from the relay UE, an indication of the remote UE identifier for the remote UE.

In a fourth aspect, alone or in combination with one or more of the first and second aspects, receiving the configuration information comprises receiving, from the network entity via the relay UE, an indication of the remote UE identifier for the remote UE via a radio resource control message.

In a fifth aspect, alone or in combination with the fourth aspect, the remote UE identifier is the same as a C-RNTI identifying the sidelink unicast link between the remote UE and the relay UE.

In a sixth aspect, alone or in combination with the fourth aspect, the remote UE identifier is a temporary identifier for the remote UE, wherein the temporary identifier is unique among a plurality of remote UEs in communication with the relay UE.

In a seventh aspect, alone or in combination with one or more of the first through sixth aspects, process 1600 includes receiving, from the network entity via the relay UE, the bearer identifier information via a radio resource control message, wherein the bearer identifier information indicates the bearer identifier for each bearer of the one or more bearers between the remote UE and a network entity associated with the relay service, and for each bearer identifier, an indication of a DRB or an SRB associated with the bearer identifier.

In an eighth aspect, alone or in combination with one or more of the first through seventh aspects, receiving the configuration information comprises receiving, from the network entity via the relay UE, an indication of a default bearer identifier identifying an SRB associated with radio resource control messages.

In a ninth aspect, alone or in combination with the eighth aspect, the SRB associated with radio resource control messages is SRB0.

In a tenth aspect, alone or in combination with one or more of the eighth and ninth aspects, process 1600 includes transmitting, to the network entity via the relay UE, a resource control message including the default bearer identifier identifying the SRB associated with radio resource control messages.

In an eleventh aspect, alone or in combination with one or more of the first through tenth aspects, communicating with the network entity via the relay UE comprises receiving, from the relay UE, an adaptation layer PDU, determining an SRB or a DRB associated with the remote UE based at least in part on a header of the adaptation layer PDU, removing the header of the adaptation layer PDU, and transferring a New Radio PDCP PDU of the adaptation layer PDU to an upper layer.

In a twelfth aspect, alone or in combination with one or more of the first through eleventh aspects, communicating with the network entity via the relay UE comprises determining the remote UE identifier of the remote UE associated with the sidelink unicast link for the remote UE, determining a bearer identifier of the remote UE corresponding to a radio access bearer of the remote UE, determining a sidelink RLC channel between the relay UE and the remote UE corresponding to the bearer identifier, generating an adaptation layer header including at least one of the remote UE identifier, the bearer identifier, or a path identifier, and transmitting, to the relay UE, an adaptation layer PDU with the adaptation layer header on the sidelink RLC channel between the relay UE and the remote UE.

In a thirteenth aspect, alone or in combination with one or more of the first through twelfth aspects, process 1600 includes performing a privacy update procedure with at least one of the network entity or the relay UE, wherein the privacy update procedure includes updating information included in configuration information.

In a fourteenth aspect, alone or in combination with the thirteenth aspect, performing the privacy update procedure comprises performing the privacy update procedure according to a periodic schedule.

In a fifteenth aspect, alone or in combination with one or more of the thirteenth through fourteenth aspects, performing the privacy update procedure comprises detecting a trigger event associated with a privacy update, and performing the privacy update procedure based at least in part on detecting the trigger event.

In a sixteenth aspect, alone or in combination with one or more of the thirteenth through fifteenth aspects, performing the privacy update procedure comprises receiving, from the network entity via the relay UE or from the relay UE, an indication of modified identifier information indicating one or more modified identifiers for the adaptation layer, modifying the configuration information based at least in part on the modified identifier information, and communicating, with the relay UE, to indicate that the one or more modified identifiers for the adaptation layer been modified at the remote UE.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
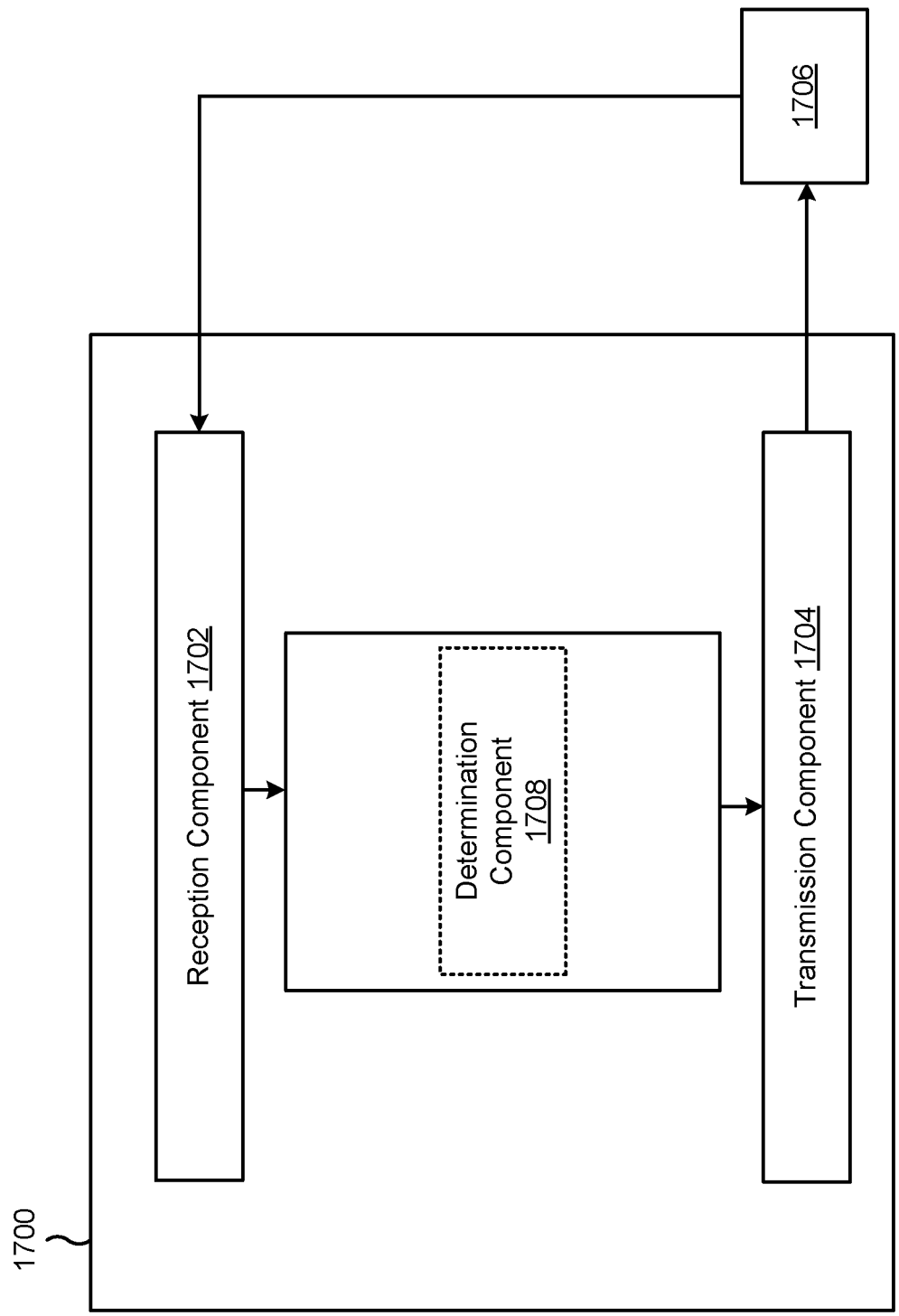
FIGS. 17-19 are block diagrams of example apparatuses for wireless communication, in accordance with various aspects of the present disclosure.

FIG. 17 is a block diagram of an example apparatus 1700 for wireless communication. The apparatus 1700 may be a relay UE, or a relay UE may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include a determination component 1708, among other examples.

In some aspects, the apparatus 1700 may be configured to perform one or more operations described herein in connection with FIGS. 7-13. Additionally, or alternatively, the apparatus 1700 may be configured to perform one or more processes described herein, such as process 1400 of FIG. 14, or a combination thereof. In some aspects, the apparatus 1700 and/or one or more components shown in FIG. 17 may include one or more components of the UE described above in connection with FIG. 2. Additionally, or alternatively, one or more components shown in FIG. 17 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a demodulator, a MIMO detector, a receive processor, a controller/processor, a memory, or a combination thereof, of the UE described above in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the UE described above in connection with FIG. 2. In some aspects, the transmission component 1704 may be co-located with the reception component 1702 in a transceiver.

The reception component 1702 and/or the transmission component 1704 may establish a sidelink unicast link with a remote UE via a sidelink signaling interface. The reception component 1702 and/or the determination component 1708 may identify configuration information for an adaptation layer of the sidelink signaling interface, the configuration information including at least one of a remote UE identifier for the remote UE identifying the sidelink unicast link between the remote UE and the relay UE for a relay service, bearer identifier information identifying one or more bearers between the remote UE and a network entity associated with the relay service, RLC channel mapping information, wherein the RLC channel mapping information includes a mapping between a bearer identifier and one or more RLC channels of the sidelink unicast link and one or more RLC channels of a link with the network entity, or data routing information associated with the relay service. The reception component 1702 and/or the transmission component 1704 may relay communications between the remote UE and the network entity based at least in part on the configuration information for the adaptation layer of the sidelink signaling interface.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

Figure 18:
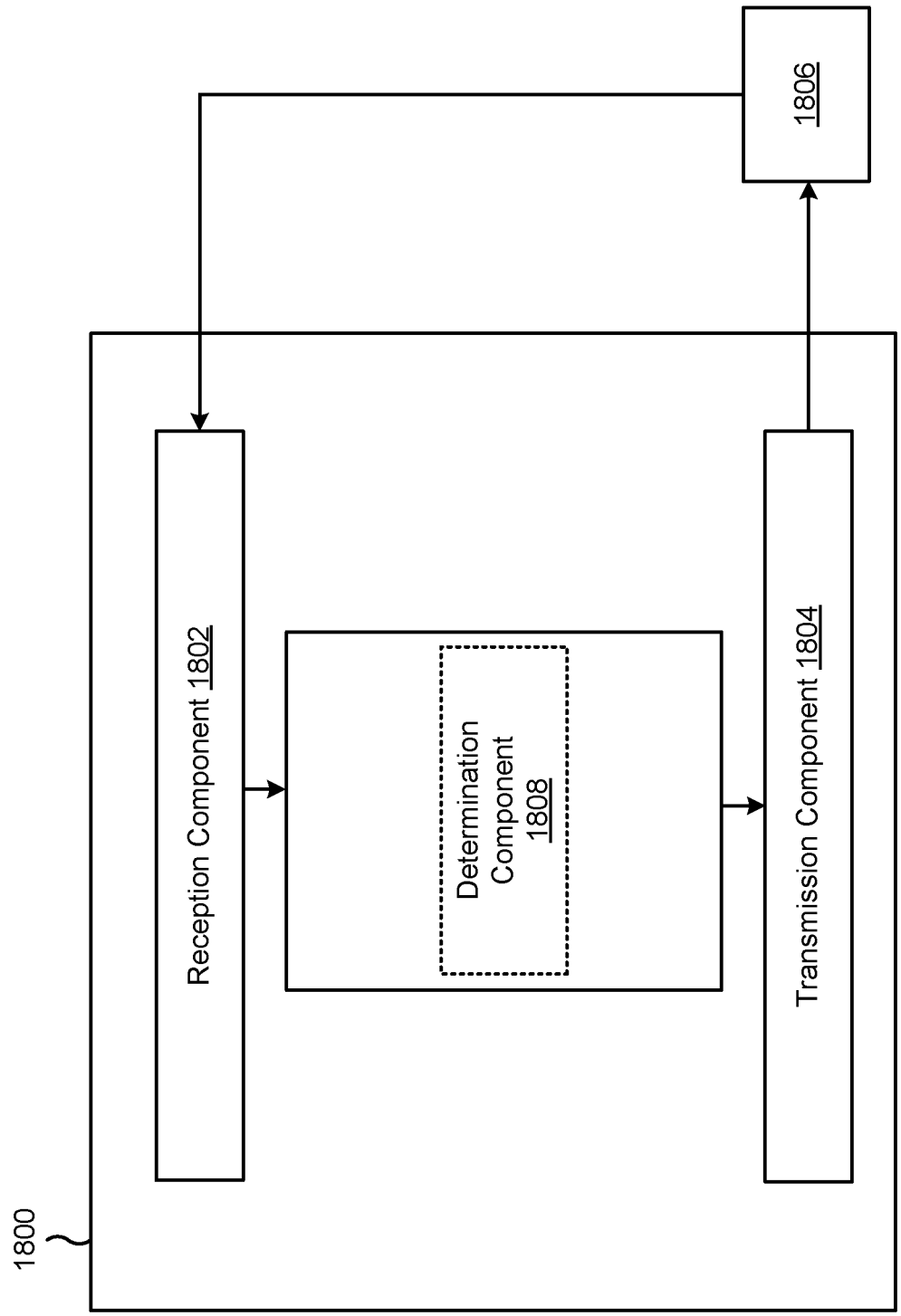

FIG. 18 is a block diagram of an example apparatus 1800 for wireless communication. The apparatus 1800 may be a base station (or a network entity), or a base station (or a network entity) may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may a determination component 1808, among other examples.

In some aspects, the apparatus 1800 may be configured to perform one or more operations described herein in connection with FIGS. 7-13. Additionally, or alternatively, the apparatus 1800 may be configured to perform one or more processes described herein, such as process 1500 of FIG. 15, or a combination thereof. In some aspects, the apparatus 1800 and/or one or more components shown in FIG. 18 may include one or more components of the base station described above in connection with FIG. 2. Additionally, or alternatively, one or more components shown in FIG. 18 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1806. In some aspects, the reception component 1802 may include one or more antennas, a demodulator, a MIMO detector, a receive processor, a controller/processor, a memory, or a combination thereof, of the base station described above in connection with FIG. 2.

The transmission component 1804 may transmit communications, such as reference signals, control information, data communications, or a combination thereof, to the apparatus 1806. In some aspects, one or more other components of the apparatus 1806 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modulator, a transmit MIMO processor, a transmit processor, a controller/processor, a memory, or a combination thereof, of the base station described above in connection with FIG. 2. In some aspects, the transmission component 1804 may be co-located with the reception component 1802 in a transceiver.

The reception component 1802 and/or the transmission component 1804 may communicate, with a relay UE and a remote UE, configuration information for an adaptation layer of a sidelink signaling interface between the relay UE and the remote UE, the configuration information including at least one of a remote UE identifier for the remote UE identifying a sidelink unicast link between the remote UE and the relay UE for a relay service, bearer identifier information identifying one or more bearers between the remote UE and the network entity associated with the relay service, RLC channel mapping information, wherein the RLC channel mapping information includes a mapping between a bearer identifier and one or more RLC channels of a sidelink unicast link and one or more RLC channels of a link with the relay UE, or data routing information associated with the relay service. The reception component 1802 and/or the transmission component 1804 may communicate with the remote UE via the relay UE based at least in part on the configuration information.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

Figure 19:
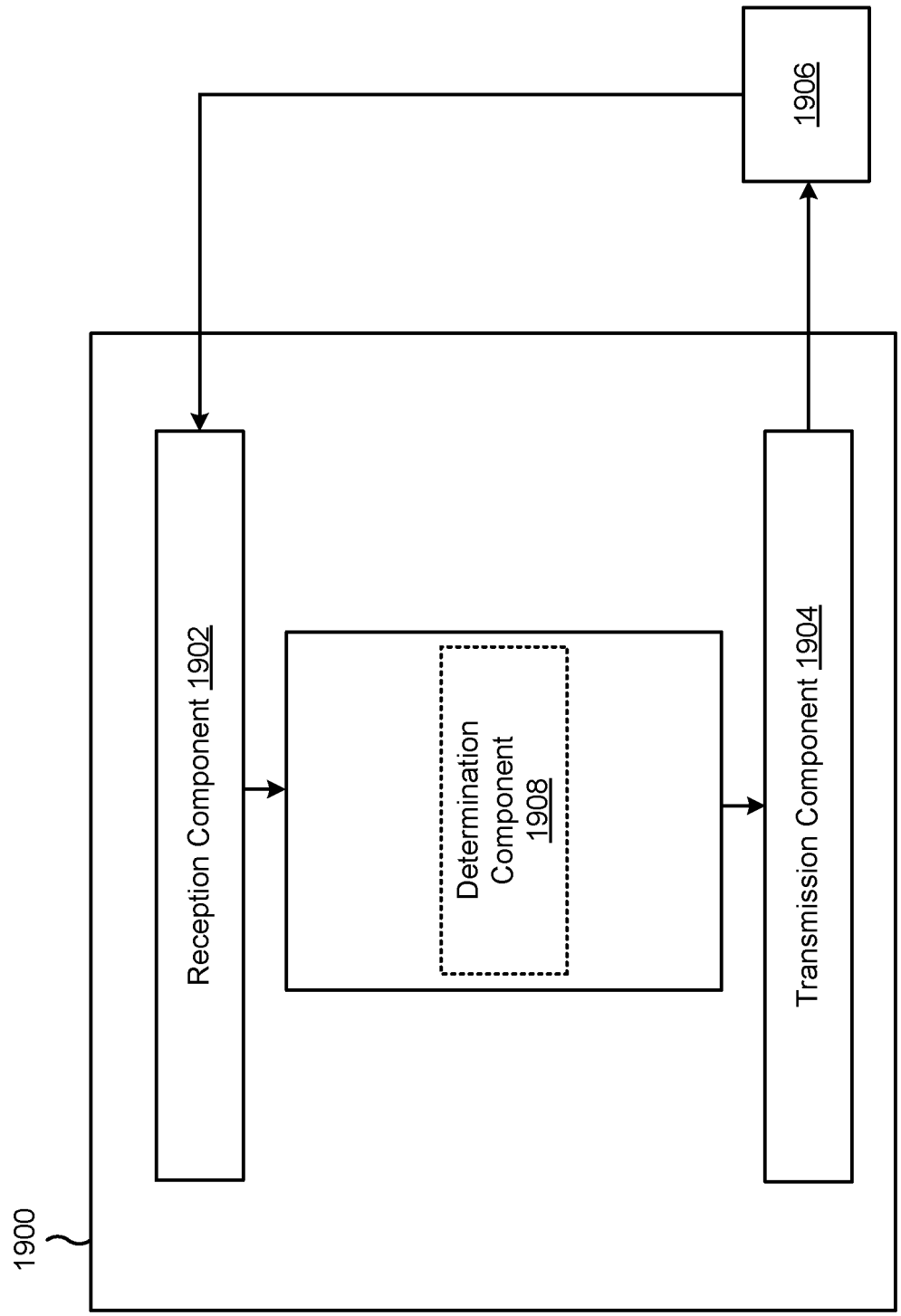

FIG. 19 is a block diagram of an example apparatus 1900 for wireless communication. The apparatus 1900 may be a remote UE, or a remote UE may include the apparatus 1900. In some aspects, the apparatus 1900 includes a reception component 1902 and a transmission component 1904, which may be in communication with one another (for example, via one or more buses and/or one or more other components). As shown, the apparatus 1900 may communicate with another apparatus 1906 (such as a UE, a base station, or another wireless communication device) using the reception component 1902 and the transmission component 1904. As further shown, the apparatus 1900 may include a determination component 1908, among other examples.

In some aspects, the apparatus 1900 may be configured to perform one or more operations described herein in connection with FIGS. 7-13. Additionally, or alternatively, the apparatus 1900 may be configured to perform one or more processes described herein, such as process 1600 of FIG. 16, or a combination thereof. In some aspects, the apparatus 1900 and/or one or more components shown in FIG. 19 may include one or more components of the UE described above in connection with FIG. 2. Additionally, or alternatively, one or more components shown in FIG. 19 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1906. In some aspects, the reception component 1902 may include one or more antennas, a demodulator, a MIMO detector, a receive processor, a controller/processor, a memory, or a combination thereof, of the UE described above in connection with FIG. 2.

The transmission component 1904 may transmit communications, such as reference signals, control information, data communications, or a combination thereof, to the apparatus 1906. In some aspects, one or more other components of the apparatus 1906 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modulator, a transmit MIMO processor, a transmit processor, a controller/processor, a memory, or a combination thereof, of the UE described above in connection with FIG. 2. In some aspects, the transmission component 1904 may be co-located with the reception component 1902 in a transceiver.

The reception component 1902 and/or the transmission component 1904 may establish a sidelink unicast link with a relay UE via a sidelink signaling interface. The reception component 1902 may receive configuration information for an adaptation layer of the sidelink signaling interface, the configuration information including at least one of a remote UE identifier for the remote UE identifying the sidelink unicast link between the remote UE and the relay UE for a relay service, bearer identifier information identifying one or more bearers between the remote UE and a network entity associated with the relay service, or RLC channel mapping information, wherein the RLC channel mapping information includes a mapping between a bearer identifier and one or more RLC channels of the sidelink unicast link and one or more RLC channels of a link with the network entity. The reception component 1902 and/or the transmission component 1904 may communicate with the network entity via the relay UE based at least in part on the configuration information.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

The following provides an overview of some aspects of the present disclosure:

Aspect 1: A method of wireless communication performed by a relay user equipment (UE), comprising: establishing a sidelink unicast link with a remote UE via a sidelink signaling interface; identifying configuration information for an adaptation layer of the sidelink signaling interface, the configuration information including at least one of: a remote UE identifier for the remote UE identifying the sidelink unicast link between the remote UE and the relay UE for a relay service, bearer identifier information identifying one or more bearers between the remote UE and a network entity associated with the relay service, radio link control (RLC) channel mapping information, wherein the RLC channel mapping information includes a mapping between a bearer identifier and one or more RLC channels of the sidelink unicast link and one or more RLC channels of a link with the network entity, or data routing information associated with the relay service; and relaying communications between the remote UE and the network entity based at least in part on the configuration information for the adaptation layer of the sidelink signaling interface.

Aspect 2: The method of aspect 1, wherein the sidelink signaling interface is a ProSe sidelink (PC5) interface and the link with the network entity is via a Uu interface.

Aspect 3: The method of any of aspects 1-2, wherein relaying communications between the remote UE and the network entity is based at least in part on a sidelink signaling interface adaptation layer header, wherein the sidelink signaling interface adaptation layer header indicates at least one of: the remote UE identifier of the remote UE, a bearer identifier of a bearer between the remote UE and a network entity associated with the relay service, or a path identifier for the data routing associated with the relay service.

Aspect 4: The method of any of aspects 1-3, wherein the remote UE identifier corresponds to a unique index assigned to each remote UE, of a plurality of remote UEs, in communication with the relay UE via respective sidelink unicast links.

Aspect 5: The method of any of aspects 1-4, further comprising: assigning remote UE identifiers to each remote UE, of a plurality of remote UEs, in communication with the relay UE.

Aspect 6: The method of any of aspects 1-5, wherein establishing the sidelink unicast link with the remote UE comprises: assigning the remote UE identifier to the remote UE including a unique index associated with the sidelink unicast link; and transmitting, to the remote UE, an indication of the remote UE identifier via a sidelink signaling interface message.

Aspect 7: The method of any of aspects 1-6, further comprising: assigning a unique index associated with the sidelink unicast link; and transmitting information indicating the unique index to the network entity via a radio resource control message.

Aspect 8: The method of any of aspects 1-7, wherein identifying the configuration information comprises: receiving, from the network entity, a relaying configuration indicating at least part of the configuration information.

Aspect 9: The method of any of aspects 1-4, wherein identifying the configuration information comprises: receiving, from the network entity, an indication of the remote UE identifier via a radio resource control message.

Aspect 10: The method of aspect 9, wherein receiving, from the network entity, the indication of the remote UE identifier comprises: receiving, from the network entity, an indication of remote UE identifiers for each remote UE, of a plurality of remote UEs, in communication with the relay UE.

Aspect 11: The method of any of aspects 9-10, wherein receiving, from the network entity, the indication of the remote UE identifier comprises: receiving, from the network entity, an indication of a cell radio network temporary identifier (C-RNTI) for each remote UE, of a plurality of remote UEs, in communication with the relay UE.

Aspect 12: The method of any of aspects 9-10, wherein receiving, from the network entity, the indication of the remote UE identifier comprises: receiving, from the network entity, an indication of a temporary identifier for each remote UE, of a plurality of remote UEs, in communication with the relay UE, wherein the temporary identifier is unique among the plurality of remote UEs in communication with the relay UE.

Aspect 13: The method of any of aspects 1-12, wherein identifying the configuration information comprises: receiving, from the network entity, the bearer identifier information including an indication of a bearer identifier identifying a bearer between the remote UE and the network entity associated with the relay service, wherein the bearer identifier is the same as a data radio bearer (DRB) identifier of a DRB between the remote UE and the network entity or the same as a signaling radio bearer (SRB) identifier of an SRB between the remote UE and the network entity.

Aspect 14: The method of any of aspects 1-12, wherein identifying the configuration information comprises: receiving, from the network entity, the bearer identifier information including an indication of a bearer identifier identifying a bearer between the remote UE and the network entity associated with the relay service, wherein the bearer identifier is a unique identifier associated with the bearer between the remote UE and the network entity to be used with the relay service.

Aspect 15: The method of any of aspects 1-14, wherein identifying the configuration information comprises: receiving, from the network entity, an indication of a default bearer identifier identifying a signaling radio bearer (SRB) associated with radio resource control messages.

Aspect 16: The method of aspect 15, further comprising: receiving, from the remote UE via the sidelink unicast link, a radio resource control setup request message, wherein the radio resource control setup request message includes the default bearer identifier; determining that the radio resource control setup request message is to be transmitted using the SRB associated with radio resource control messages based at least in part on the default bearer identifier; and relaying the radio resource control setup request message to the network entity via an RLC channel for the SRB associated with radio resource control messages.

Aspect 17: The method of aspect 16, further comprising: receiving, from the network entity, a relaying configuration via a radio resource control message indicating the bearer identifier based at least in part on relaying the radio resource control setup request message to the network entity; and relaying the radio resource control message indicating the bearer identifier to the remote UE based at least in part on the relaying configuration.

Aspect 18: The method of any of aspects 1-17, wherein relaying communications between the remote UE and the network entity comprises: receiving, from the remote UE via the sidelink unicast link, a packet data convergence protocol (PDCP) packet data unit (PDU) that includes an adaptation layer header that indicates at least one of: the remote UE identifier associated with the remote UE, or a bearer identifier; identifying an RLC channel of the link with the network entity based at least in part on the RLC channel mapping information and the bearer identifier; generating a Uu PDCP PDU for the link with the network entity that includes an adaptation layer header that indicates at least one of: the remote UE identifier associated with the remote UE, or the bearer identifier; and transmitting, to the network entity via the RLC channel, the Uu PDCP PDU for the link with the network entity that includes the adaptation layer header.

Aspect 19: The method of any of aspects 1-18, wherein relaying communications between the remote UE and the network entity comprises: receiving, from the network entity, a Uu packet data convergence protocol (PDCP) packet data unit (PDU) that includes an adaptation layer header that indicates at least one of: the remote UE identifier associated with the remote UE, or a bearer identifier; identifying an RLC channel of the sidelink unicast link based at least in part on the RLC channel mapping information and the bearer identifier; generating a PDCP PDU for the sidelink unicast link that includes an adaptation layer header that indicates at least one of: the remote UE identifier associated with the remote UE, or the bearer identifier; and transmitting, to the remote UE via the RLC channel, the PDCP PDU for the sidelink unicast link that includes the adaptation layer header.

Aspect 20: The method of any of aspects 1-19, further comprising: performing a privacy update procedure with at least one of the remote UE or the network entity, wherein the privacy update procedure includes updating information included in configuration information.

Aspect 21: The method of aspect 20, wherein performing the privacy update procedure comprises: performing the privacy update procedure according to a periodic schedule.

Aspect 22: The method of any of aspects 20-21, wherein performing the privacy update procedure comprises: detecting a trigger event associated with a privacy update; and performing the privacy update procedure based at least in part on detecting the trigger event.

Aspect 23: The method of any of aspects 20-22, wherein performing the privacy update procedure comprises: modifying the remote UE identifier for the remote UE to a modified remote UE identifier; communicating, with the remote UE via the sidelink unicast link, to indicate the modified remote UE identifier; and communicating, with the network entity, to indicate the modified remote UE identifier.

Aspect 24: The method of any of aspects 20-23, wherein performing the privacy update procedure comprises: receiving, from the network entity, an indication of a modified RLC channel identifier for the sidelink signaling interface via a radio resource control message; modifying a previous RLC channel identifier for the sidelink signaling interface to the modified RLC channel identifier; communicating, with the remote UE via the sidelink unicast link, to indicate the modified RLC channel identifier; and communicating, with the network entity, to indicate that the RLC channel identifier for the sidelink signaling interface has been modified at the relay UE and the remote UE based at least in part on communicating with the remote UE to indicate the modified RLC channel identifier.

Aspect 25: The method of any of aspects 20-22, wherein performing the privacy update procedure comprises: receiving, from the network entity, an indication of a modified remote UE identifier for the remote UE; modifying the remote UE identifier for the remote UE to the modified remote UE identifier; communicating, with the remote UE via the sidelink unicast link, to indicate the modified remote UE identifier; and communicating, with the network entity, to indicate that the remote UE identifier has been modified at the relay UE and the remote UE based at least in part on communicating with the remote UE to indicate the modified remote UE identifier.

Aspect 26: The method of any of aspects 20-25, wherein performing the privacy update procedure comprises: receiving, from the network entity, an indication of a modified bearer identifier for a bearer between the remote UE and a network entity associated with the relay service; modifying a previous bearer identifier for the bearer to the modified bearer identifier; and relaying, from the network entity and to the remote UE, an indication of the modified bearer identifier.

Aspect 27: The method of aspect 26, further comprising: receiving, from the remote UE, a signal that includes an indication of the previous bearer identifier for the bearer in an adaptation layer header of the signal after receiving the indication of the modified bearer identifier and prior to receiving a signal that include an indication of the modified bearer identifier; identifying an RLC channel of the link with the network entity based at least in part on the RLC channel mapping information and the previous bearer identifier; generating a signal for the link with the network entity that includes an indication of the previous bearer identifier; and transmitting, to the network entity via the RLC channel, the signal for the link with the network entity that includes the indication of the previous bearer identifier.

Aspect 28: The method of any of aspects 26-27, further comprising: receiving, from the remote UE or the network entity, a signal that includes an indication of the modified bearer identifier in an adaptation layer header of the signal; and refraining from relaying communications using the previous bearer identifier based at least in part on receiving the signal that includes the indication of the modified bearer identifier in the adaptation layer header of the signal.

Aspect 29: The method of aspect 20, wherein performing the privacy update procedure comprises: receiving, from the network entity, an indication of modified identifier information for at least one of the adaptation layer of the sidelink signaling interface or the adaption layer of the link with the network entity; modifying the configuration information based at least in part on the modified identifier information; communicating, with the remote UE via the sidelink unicast link, to indicate the modified identifier information; and communicating, with the network entity, to indicate that the configuration information for the sidelink signaling interface has been modified at the relay UE and the remote UE based at least in part on communicating with the remote UE to indicate the modified identifier information.

Aspect 30: The method of aspect 29, further comprising: receiving, from the remote UE, a signal that includes a previous identifier, that is modified by the modified identifier information to a modified identifier, in an adaptation layer header of the signal after receiving the indication of the modified identifier information and prior to receiving a signal that includes an indication of the modified identifier; and relaying, to the network entity via an RLC channel, the signal based at least in part on the previous identifier.

Aspect 31: The method of aspect 29: further comprising: receiving, from the remote UE or the network entity, a signal that includes an indication of a modified identifier, indicated in the modified identifier information, in an adaptation layer header of the signal; and refraining from relaying communications using a previous identifier based at least in part on receiving the signal that includes the indication of the modified identifier in the adaptation layer header of the signal.

Aspect 32: A method of wireless communication performed by a network entity, comprising: communicating, with a relay user equipment (UE) and a remote UE, configuration information for an adaptation layer of a sidelink signaling interface between the relay UE and the remote UE, the configuration information including at least one of a remote UE identifier for the remote UE identifying a sidelink unicast link between the remote UE and the relay UE for a relay service, bearer identifier information identifying one or more bearers between the remote UE and a network entity associated with the relay service, radio link control (RLC) channel mapping information, wherein the RLC channel mapping information includes a mapping between a bearer identifier and one or more RLC channels of a sidelink unicast link and one or more RLC channels of a link with the relay UE, or data routing information associated with the relay service; and communicating with the remote UE via the relay UE based at least in part on the configuration information.

Aspect 33: The method of aspect 32, wherein the sidelink signaling interface is a ProSe sidelink (PC5) interface and the link with the relay UE is via a Uu interface.

Aspect 34: The method of any of aspects 32-33, wherein the remote UE identifier corresponds to a unique index assigned to each remote UE, of a plurality of remote UEs, in communication with the relay UE via respective sidelink unicast links.

Aspect 35: The method of any of aspects 32-34, wherein communicating the configuration information comprises: receiving, from the relay UE, an indication of remote UE identifiers for each remote UE, of a plurality of remote UEs, in communication with the relay UE via a radio resource control message.

Aspect 36: The method of any of aspects 32-34, further comprising: assigning remote UE identifiers to each remote UE, of a plurality of remote UEs, in communication with the relay UE.

Aspect 37: The method of aspect 36, wherein assigning remote UE identifiers to each remote UE, of the plurality of remote UEs, in communication with the relay UE comprises: assigning, for a remote UE of the plurality of remote UEs, the remote UE identifier as a cell radio network temporary identifier (C-RNTI) identifying a sidelink unicast link between the remote UE and the relay UE.

Aspect 38: The method of aspect 36, wherein assigning remote UE identifiers to each remote UE, of the plurality of remote UEs, in communication with the relay UE comprises: assigning, for a remote UE of the plurality of remote UEs, a temporary identifier for the remote UE, wherein the temporary identifier is unique among the plurality of remote UEs in communication with the relay UE.

Aspect 39: The method of any of aspects 36-38, further comprising: transmitting, to the remote UE via the relay UE, an indication of the remote UE identifier for the remote UE via a radio resource control message.

Aspect 40: The method of any of aspects 36-39, wherein communicating the configuration information comprises: transmitting, to the relay UE, a relaying configuration via a radio resource control message, wherein the relaying configuration indicates the remote UE identifiers for each remote UE, of the plurality of remote UEs, in communication with the relay UE.

Aspect 41: The method of any of aspects 32-40, further comprising: assigning a bearer identifier for each bearer of the one or more bearers between the remote UE and a network entity associated with the relay service.

Aspect 42: The method of aspect 41, wherein a bearer identifier for a bearer, of the one or more bearers, is same as a data radio bearer (DRB) identifier of a DRB between the remote UE and the network entity or the same as a signaling radio bearer (SRB) identifier of an SRB between the remote UE and the network entity.

Aspect 43: The method of aspect 41, wherein a bearer identifier for a bearer, of the one or more bearers, is a unique identifier associated with the bearer between the remote UE and the network entity to be used with the relay service.

Aspect 44: The method of any of aspects 41-43, further comprising: transmitting, to the remote UE via the relay UE, the bearer identifier information via a radio resource control message, wherein the bearer identifier information indicates: the bearer identifier for each bearer of the one or more bearers between the remote UE and a network entity associated with the relay service, and for each bearer identifier, an indication of a data radio bearer (DRB) or a signaling radio bearer (SRB) associated with the bearer identifier.

Aspect 45: The method of any of aspects 41-44, wherein communicating the configuration information comprises: transmitting, to the relay UE, the bearer identifier information via a radio resource control message, wherein the bearer identifier information indicates: the bearer identifier for each bearer of the one or more bearers between the remote UE and a network entity associated with the relay service, and for each bearer identifier, an indication of a data radio bearer (DRB) or a signaling radio bearer (SRB) associated with the bearer identifier.

Aspect 46: The method of any of aspects 32-45, wherein communicating the configuration information comprises: transmitting, to the relay UE and the remote UE via the relay UE, an indication of a default bearer identifier identifying a signaling radio bearer (SRB) associated with radio resource control messages.

Aspect 47: The method of aspect 46, wherein the SRB associated with radio resource control messages is SRB0.

Aspect 48: The method of any of aspects 32-47, wherein communicating with the remote UE via the relay UE comprises: receiving, from the relay UE, an adaptation layer protocol data unit (PDU); determining a signaling radio bearer (SRB) or data radio bearer (DRB) associated with the remote UE based at least in part on a header of the adaptation layer PDU; removing the header of the adaptation layer PDU; and transferring a New Radio packet data convergence protocol (PDCP) PDU of the adaptation layer PDU to an upper layer.

Aspect 49: The method of any of aspects 32-48, wherein communicating with the remote UE via the relay UE comprises: determining the remote UE identifier of the remote UE associated with a sidelink unicast link for the remote UE; determining a bearer identifier of the remote UE corresponding to a radio access bearer of the remote UE; determining a radio access RLC channel between the relay UE and the network entity corresponding to the bearer identifier; generating an adaptation layer header including at least one of the remote UE identifier, the bearer identifier, or a path identifier; and transmitting, to the relay UE, an adaptation layer protocol data unit (PDU) with the adaptation layer header on the radio access RLC channel between the relay UE and the network entity.

Aspect 50: The method of any of aspects 32-49, further comprising: performing a privacy update procedure with at least one of the remote UE or the relay UE, wherein the privacy update procedure includes updating information included in configuration information.

Aspect 51: The method of aspect 50, wherein performing the privacy update procedure comprises: performing the privacy update procedure according to a periodic schedule.

Aspect 52: The method of any of aspects 50-51, wherein performing the privacy update procedure comprises: detecting a trigger event associated with a privacy update; and performing the privacy update procedure based at least in part on detecting the trigger event.

Aspect 53: The method of any of aspects 50-52, wherein performing the privacy update procedure comprises: modifying the remote UE identifier for the remote UE to a modified remote UE identifier; communicating, with the remote UE via the relay UE, to indicate the modified remote UE identifier; and communicating, with the relay UE, to indicate the modified remote UE identifier.

Aspect 54: The method of any of aspects 50-53, wherein performing the privacy update procedure comprises: modifying a previous RLC channel identifier for the sidelink signaling interface between the relay UE and the remote UE to a modified RLC channel identifier; transmitting, to the relay UE and the remote UE via the relay UE, an indication of the modified RLC channel identifier for the sidelink signaling interface via a radio resource control message; and receiving, from the relay UE, an indication that the RLC channel identifier for the sidelink signaling interface has been modified at the relay UE and the remote UE.

Aspect 55: The method of any of aspects 50-52, wherein performing the privacy update procedure comprises: receiving, from the relay UE, an indication of a modified remote UE identifier for the remote UE; modifying the remote UE identifier for the remote UE to the modified remote UE identifier; and receiving, from the relay UE, an indication that the remote UE identifier has been modified at the relay UE and the remote UE.

Aspect 56: The method of any of aspects 50-55, wherein performing the privacy update procedure comprises: modifying a previous bearer identifier for a bearer between the remote UE and the network entity associated with the relay service to a modified bearer identifier; transmitting, to the relay UE and the remote UE via the relay UE, an indication of the modified bearer identifier for a bearer between the remote UE and a network entity associated with the relay service; and receiving, from the relay UE, an indication that the bearer identifier has been modified at the relay UE and the remote UE.

Aspect 57: The method of aspect 50, wherein performing the privacy update procedure comprises: modifying one or more identifiers for an adaption layer header for the relay service; communicating, with the remote UE via the relay UE, to indicate modified identifier information that indicates the one or more modified identifiers; and communicating, with the relay UE, to indicate the modified identifier information that indicates the one or more modified identifier.

Aspect 58: A method of wireless communication performed by a remote user equipment (UE), comprising: establishing a sidelink unicast link with a relay UE via a sidelink signaling interface; receiving configuration information for an adaptation layer of the sidelink signaling interface, the configuration information including at least one of a remote UE identifier for the remote UE identifying the sidelink unicast link between the remote UE and the relay UE for a relay service, bearer identifier information identifying one or more bearers between the remote UE and a network entity associated with the relay service, or radio link control (RLC) channel mapping information, wherein the RLC channel mapping information includes a mapping between the bearer identifier and one or more RLC channels of the sidelink unicast link and one or more RLC channels of a link with the network entity; and communicating with the network entity via the relay UE based at least in part on the configuration information.

Aspect 59: The method of aspect 58, wherein the sidelink signaling interface is a ProSe sidelink (PC5) interface and the link with the network entity is via a Uu interface.

Aspect 60: The method of any of aspects 58-59, wherein the remote UE identifier corresponds to a unique index assigned to the remote UE.

Aspect 61: The method of any of aspects 58-60, wherein receiving the configuration information comprises: receiving, from the relay UE, an indication of the remote UE identifier for the remote UE.

Aspect 62: The method of any of aspects 58-60, wherein receiving the configuration information comprises: receiving, from the network entity via the relay UE, an indication of the remote UE identifier for the remote UE via a radio resource control message.

Aspect 63: The method of aspect 62, wherein the remote UE identifier is the same as a cell radio network temporary identifier (C-RNTI) identifying the sidelink unicast link between the remote UE and the relay UE.

Aspect 64: The method of aspect 62, wherein the remote UE identifier is a temporary identifier for the remote UE, wherein the temporary identifier is unique among a plurality of remote UEs in communication with the relay UE.

Aspect 65: The method of any of aspects 58-64, further comprising: receiving, from the network entity via the relay UE, the bearer identifier information via a radio resource control message, wherein the bearer identifier information indicates: the bearer identifier for each bearer of the one or more bearers between the remote UE and a network entity associated with the relay service, and for each bearer identifier, an indication of a data radio bearer (DRB) or a signaling radio bearer (SRB) associated with the bearer identifier.

Aspect 66: The method of any of aspects 58-65, wherein receiving the configuration information comprises: receiving, from the network entity via the relay UE, an indication of a default bearer identifier identifying a signaling radio bearer (SRB) associated with radio resource control messages.

Aspect 67: The method of aspect 66, wherein the SRB associated with radio resource control messages is SRB0.

Aspect 68: The method of any of aspects 66-67, further comprising: transmitting, to the network entity via the relay UE, a resource control message including the default bearer identifier identifying the SRB associated with radio resource control messages.

Aspect 69: The method of any of aspects 58-68, wherein communicating with the network entity via the relay UE comprises: receiving, from the relay UE, an adaptation layer protocol data unit (PDU); determining a signaling radio bearer (SRB) or data radio bearer (DRB) associated with the remote UE based at least in part on a header of the adaptation layer PDU; removing the header of the adaptation layer PDU; and transferring a New Radio packet data convergence protocol (PDCP) PDU of the adaptation layer PDU to an upper layer.

Aspect 70: The method of any of aspects 58-69, wherein communicating with the network entity via the relay UE comprises: determining the remote UE identifier of the remote UE associated with the sidelink unicast link for the remote UE; determining a bearer identifier of the remote UE corresponding to a radio access bearer of the remote UE; determining a sidelink RLC channel between the relay UE and the remote UE corresponding to the bearer identifier; generating an adaptation layer header including at least one of the remote UE identifier, the bearer identifier, or a path identifier; and transmitting, to the relay UE, an adaptation layer protocol data unit (PDU) with the adaptation layer header on the sidelink RLC channel between the relay UE and the remote UE.

Aspect 71: The method of any of aspects 58-70, further comprising: performing a privacy update procedure with at least one of the network entity or the relay UE, wherein the privacy update procedure includes updating information included in configuration information.

Aspect 72: The method of aspect 71, wherein performing the privacy update procedure comprises: performing the privacy update procedure according to a periodic schedule.

Aspect 73: The method of any of aspects 71-72, wherein performing the privacy update procedure comprises: detecting a trigger event associated with a privacy update; and performing the privacy update procedure based at least in part on detecting the trigger event.

Aspect 74: The method of any of aspects 71-73, wherein performing the privacy update procedure comprises: receiving, from the network entity via the relay UE, an indication of a modified remote UE identifier; modifying a previous remote UE identifier for the remote UE to a modified remote UE identifier; and communicating, with the relay UE, to indicate that the remote UE identifier has been modified.

Aspect 75: The method of any of aspects 71-73, wherein performing the privacy update procedure comprises: receiving, from the relay UE, an indication of a modified remote UE identifier for the remote UE; modifying the remote UE identifier for the remote UE to the modified remote UE identifier; and transmitting, to the relay UE, an indication that the remote UE identifier has been modified at the remote UE.

Aspect 76: The method of any of aspects 71-75, wherein performing the privacy update procedure comprises: receiving, from the network entity via the relay UE, an indication of a modified bearer identifier for a bearer between the remote UE and a network entity associated with the relay service; modifying a previous bearer identifier for the bearer to the modified bearer identifier; and communicating, with the network entity via the remote UE, using the modified bearer identifier.

Aspect 77: The method of aspect 71, wherein performing the privacy update procedure comprises: receiving, from the network entity via the relay UE or from the relay UE, an indication of modified identifier information indicating one or more modified identifiers for the adaptation layer; modifying the configuration information based at least in part on the modified identifier information; and communicating, with the relay UE, to indicate that the one or more modified identifiers for the adaptation layer been modified at the remote UE.

Aspect 78: An apparatus for wireless communication at a device, comprising a processor; memory coupled with the processor; and instructions stored in the memory and executable by the processor to cause the apparatus to perform the method of one or more aspects of aspects 1-31.

Aspect 79: A device for wireless communication, comprising a memory and one or more processors coupled to the memory, the memory and the one or more processors configured to perform the method of one or more aspects of aspects 1-31.

Aspect 80: An apparatus for wireless communication, comprising at least one means for performing the method of one or more aspects of aspects 1-31.

Aspect 81: A non-transitory computer-readable medium storing code for wireless communication, the code comprising instructions executable by a processor to perform the method of one or more aspects of aspects 1-31.

Aspect 82: A non-transitory computer-readable medium storing a set of instructions for wireless communication, the set of instructions comprising one or more instructions that, when executed by one or more processors of a device, cause the device to perform the method of one or more aspects of aspects 1-31.

Aspect 83: An apparatus for wireless communication at a device, comprising a processor; memory coupled with the processor; and instructions stored in the memory and executable by the processor to cause the apparatus to perform the method of one or more aspects of aspects 32-57.

Aspect 84: A device for wireless communication, comprising a memory and one or more processors coupled to the memory, the memory and the one or more processors configured to perform the method of one or more aspects of aspects 32-57.

Aspect 85: An apparatus for wireless communication, comprising at least one means for performing the method of one or more aspects of aspects 32-57.

Aspect 86: A non-transitory computer-readable medium storing code for wireless communication, the code comprising instructions executable by a processor to perform the method of one or more aspects of aspects 32-57.

Aspect 87: A non-transitory computer-readable medium storing a set of instructions for wireless communication, the set of instructions comprising one or more instructions that, when executed by one or more processors of a device, cause the device to perform the method of one or more aspects of aspects 32-57.

Aspect 88: An apparatus for wireless communication at a device, comprising a processor; memory coupled with the processor; and instructions stored in the memory and executable by the processor to cause the apparatus to perform the method of one or more aspects of aspects 58-77.

Aspect 89: A device for wireless communication, comprising a memory and one or more processors coupled to the memory, the memory and the one or more processors configured to perform the method of one or more aspects of aspects 58-77.

Aspect 90: An apparatus for wireless communication, comprising at least one means for performing the method of one or more aspects of aspects 58-77.

Aspect 91: A non-transitory computer-readable medium storing code for wireless communication, the code comprising instructions executable by a processor to perform the method of one or more aspects of aspects 58-77.

Aspect 92: A non-transitory computer-readable medium storing a set of instructions for wireless communication, the set of instructions comprising one or more instructions that, when executed by one or more processors of a device, cause the device to perform the method of one or more aspects of aspects 58-77.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A relay user equipment (UE) for wireless communication, comprising:
one or more memories; and
one or more processors, coupled to the one or more memories, configured, individually or collectively, to:
establish a sidelink unicast link with a remote UE via a sidelink signaling interface;
receive configuration information for an adaptation layer of the sidelink signaling interface, the configuration information including
a remote UE identifier for the remote UE identifying the sidelink unicast link between the remote UE and the relay UE;
receive an indication of a modified remote UE identifier via radio resource control signaling;
modify the remote UE identifier for the remote UE to the modified remote UE identifier; and relay communications between the remote UE and a network entity based at least in part on the configuration information for the adaptation layer of the sidelink signaling interface and the modified remote UE identifier.

2. The relay UE of claim 1, wherein the sidelink signaling interface is a ProSe sidelink (PC5) interface.

3. The relay UE of claim 1, wherein the one or more processors, to relay communications between the remote UE and the network entity, are configured to:
relay communications between the remote UE and the network entity based at least in part on a sidelink signaling interface adaptation layer header, wherein the sidelink signaling interface adaptation layer header indicates at least one of:
the remote UE identifier of the remote UE,
a bearer identifier of a bearer between the remote UE and the network entity, or
a path identifier.

4. The relay UE of claim 1, wherein the remote UE identifier corresponds to a unique index assigned to each remote UE, of a plurality of remote UEs, in communication with the relay UE via respective sidelink unicast links.

5. The relay UE of claim 1, wherein the one or more processors are further configured to:
assign remote UE identifiers to each remote UE, of a plurality of remote UEs, in communication with the relay UE.

6. The relay UE of claim 1, wherein the one or more processors, to establish the sidelink unicast link with the remote UE, are configured to:
assign the remote UE identifier to the remote UE including a unique index associated with the sidelink unicast link; and
transmit, to the remote UE, an indication of the remote UE identifier via a sidelink signaling interface message.

7. The relay UE of claim 1, wherein the one or more processors are further configured to:
assign a unique index associated with the sidelink unicast link; and
transmit information indicating the unique index to the network entity via a radio resource control message.

8. The relay UE of claim 1, wherein the one or more processors, to receive the configuration information, are configured to:
receive, from the network entity, a relaying configuration indicating at least part of the configuration information.

9. The relay UE of claim 1, wherein the one or more processors, to receive the indication of the remote UE identifier, are configured to:
receive, from the network entity, an indication of remote UE identifiers for each remote UE, of a plurality of remote UEs, in communication with the relay UE.

10. The relay UE of claim 1, wherein the one or more processors, to receive the indication of the remote UE identifier, are configured to:
receive, from the network entity, an indication of a cell radio network temporary identifier (C-RNTI) for each remote UE, of a plurality of remote UEs, in communication with the relay UE.

11. The relay UE of claim 1, wherein the one or more processors, to receive the indication of the remote UE identifier, are configured to:
receive, from the network entity, an indication of a temporary identifier for each remote UE, of a plurality of remote UEs, in communication with the relay UE, wherein the temporary identifier is unique among the plurality of remote UEs in communication with the relay UE.

12. The relay UE of claim 1, wherein the one or more processors, to receive the configuration information, are configured to:
receive, from the network entity, an indication of a default bearer identifier identifying a signaling radio bearer (SRB) associated with radio resource control messages.

13. The relay UE of claim 12, wherein the one or more processors are further configured to:
receive, from the remote UE via the sidelink unicast link, a radio resource control setup request message;
determine that the radio resource control setup request message is to be transmitted using the SRB associated with radio resource control messages based at least in part on the default bearer identifier; and
relay the radio resource control setup request message to the network entity via an RLC channel for the SRB associated with radio resource control messages.

14. The relay UE of claim 13, wherein the one or more processors are further configured to:
receive, from the network entity, a relaying configuration via a radio resource control message indicating a bearer identifier based at least in part on relaying the radio resource control setup request message to the network entity; and
relay the radio resource control message indicating the bearer identifier to the remote UE based at least in part on the relaying configuration.

15. The relay UE of claim 1, wherein the one or more processors, to relay communications between the remote UE and the network entity, are configured to:
receive, from the remote UE via the sidelink unicast link, a packet data convergence protocol (PDCP) packet data unit (PDU) that includes an adaptation layer header that indicates at least one of:
the remote UE identifier associated with the remote UE, or
a bearer identifier;
identify an RLC channel of a link with the network entity based at least in part on the bearer identifier;
generate a Uu PDCP PDU for the link with the network entity that includes an adaptation layer header that indicates at least one of:
the remote UE identifier associated with the remote UE, or
the bearer identifier; and
transmit, to the network entity via the RLC channel, the Uu PDCP PDU for the link with the network entity that includes the adaptation layer header.

16. The relay UE of claim 1, wherein the one or more processors, to relay communications between the remote UE and the network entity, are configured to:
receive, from the network entity, a Uu packet data convergence protocol (PDCP) packet data unit (PDU) that includes an adaptation layer header that indicates at least one of:
the remote UE identifier associated with the remote UE, or
a bearer identifier;
identify an RLC channel of the sidelink unicast link based at least in part on the bearer identifier;
generate a PDCP PDU for the sidelink unicast link that includes an adaptation layer header that indicates at least one of:

the remote UE identifier associated with the remote UE, or the bearer identifier; and transmit, to the remote UE via the RLC channel, the PDCP PDU for the sidelink unicast link that includes the adaptation layer header.

17. The relay UE of claim 1, wherein the one or more processors are further configured to:

perform a privacy update procedure with at least one of the remote UE or the network entity, wherein the privacy update procedure includes updating information included in the configuration information.

18. The relay UE of claim 17, wherein the one or more processors, to perform the privacy update procedure, are configured to:

perform the privacy update procedure according to a periodic schedule.

19. The relay UE of claim 17, wherein the one or more processors, to perform the privacy update procedure, are configured to:

detect a trigger event associated with a privacy update; and perform the privacy update procedure based at least in part on detecting the trigger event.

20. The relay UE of claim 17, wherein the one or more processors, to perform the privacy update procedure, are configured to:

communicate, with the remote UE via the sidelink unicast link, to indicate the modified remote UE identifier.

21. The relay UE of claim 17, wherein the one or more processors, to perform the privacy update procedure, are configured to:

receive, from the network entity, an indication of modified identifier information for at least one of the adaptation layer of the sidelink signaling interface or the adaption layer of a link with the network entity; and modify the configuration information based at least in part on the modified identifier information.

22. The relay UE of claim 1, wherein the configuration information further includes bearer identifier information identifying one or more bearers between the remote UE and a network entity.

23. The relay UE of claim 1, wherein the configuration information further includes radio link control (RLC) channel mapping information, wherein the RLC channel mapping information includes a mapping between a bearer identifier and one or more RLC channels of the sidelink unicast link and one or more RLC channels of a link with the network entity.

24. The relay UE of claim 1, wherein the configuration information further includes data routing information.

25. A network entity for wireless communication, comprising:

one or more memories; and one or more processors, coupled to the one or more memories, configured, individually or collectively, to:

communicate, with a relay user equipment (UE) and a remote UE, configuration information for an adaptation layer of a sidelink signaling interface between the relay UE and the remote UE, the configuration information including a remote UE identifier for the remote UE identifying a sidelink unicast link between the remote UE and the relay UE;

communicate an indication of a modified remote UE identifier via radio resource control signaling;

modify the remote UE identifier for the remote UE to the modified remote UE identifier; and communicate with the remote UE via the relay UE based at least in part on the configuration information and the modified remote UE identifier.

26. The network entity of claim 25, wherein the sidelink signaling interface is a ProSe sidelink (PC5) interface.

27. The network entity of claim 25, wherein the remote UE identifier corresponds to a unique index assigned to each remote UE, of a plurality of remote UEs, in communication with the relay UE via respective sidelink unicast links.

28. The network entity of claim 25, wherein the one or more processors, to communicate the configuration information, are configured to:

receive, from the relay UE, an indication of remote UE identifiers for each remote UE, of a plurality of remote UEs, in communication with the relay UE via a radio resource control message.

29. The network entity of claim 25, wherein the configuration information further includes bearer identifier information identifying one or more bearers between the remote UE and the network entity.

30. The network entity of claim 25, wherein the configuration information further includes radio link control (RLC) channel mapping information.

* * * * *